United States Patent
Kulis et al.

(10) Patent No.: US 8,438,485 B2
(45) Date of Patent: May 7, 2013

(54) SYSTEM, METHOD, AND APPARATUS FOR GENERATING, CUSTOMIZING, DISTRIBUTING, AND PRESENTING AN INTERACTIVE AUDIO PUBLICATION

(75) Inventors: Zachary R. Kulis, Arlington, VA (US); Kirsten B. Kulis, Arlington, VA (US)

(73) Assignee: uNews, LLC, Arlington, VA (US)

( * ) Notice: Subject to any disclaimer, the term of this patent is extended or adjusted under 35 U.S.C. 154(b) by 286 days.

(21) Appl. No.: 12/726,230

(22) Filed: Mar. 17, 2010

(65) Prior Publication Data
US 2010/0241963 A1    Sep. 23, 2010

Related U.S. Application Data

(60) Provisional application No. 61/160,787, filed on Mar. 17, 2009.

(51) Int. Cl.
*G06F 3/16*    (2006.01)

(52) U.S. Cl.
USPC ........................................ 715/727; 704/270.1

(58) Field of Classification Search .................. 715/727; 704/270.1
See application file for complete search history.

(56) References Cited

U.S. PATENT DOCUMENTS

| | | | |
|---|---|---|---|
| 5,924,068 A | 7/1999 | Richard et al. | |
| 6,816,703 B1 * | 11/2004 | Wood et al. | 455/3.04 |
| 2002/0161770 A1 * | 10/2002 | Shapiro et al. | 707/10 |
| 2002/0184648 A1 * | 12/2002 | Delpuch | 725/112 |
| 2003/0093806 A1 * | 5/2003 | Dureau et al. | 725/107 |
| 2004/0117820 A1 * | 6/2004 | Thiemann et al. | 725/37 |
| 2004/0172254 A1 * | 9/2004 | Sharma et al. | 704/270.1 |
| 2005/0182675 A1 * | 8/2005 | Huettner | 705/14 |
| 2006/0085521 A1 * | 4/2006 | Sztybel | 709/219 |
| 2006/0136226 A1 * | 6/2006 | Emam | 704/277 |
| 2006/0168507 A1 * | 7/2006 | Hansen | 715/500.1 |

(Continued)

OTHER PUBLICATIONS

Learn More about BuzzVoice, webpage available at <http://buzzvoice.com/LearnMore.aspx>, Retrieved on Feb. 19, 2010, 6 pages.

(Continued)

*Primary Examiner* — Tuyetlien Tran
(74) *Attorney, Agent, or Firm* — Fiala & Weaver P.L.L.C.

(57) ABSTRACT

Systems, methods, and apparatuses for generating, customizing, distributing, and presenting an interactive audio publication to a user are provided. A plurality of text-based and/or speech-based content items is converted into voice-navigable interactive audio content items that include segmented audio data, embedded visual content, and accompanying metadata. An audio publication is generated by associating one or more audio content items with one or more audio publication sections, and generating metadata that defines the audio publication structure. Assembled audio publications may be used to generate one or more new custom audio publications for a user by utilizing one or more user-defined custom audio publication templates. Audio publications are delivered to a user for presentation on an enabled presentation system. The user is enabled to navigate and interact with the audio publication, using voice commands and/or a button interface, in a manner similar to browsing visually-oriented content.

26 Claims, 28 Drawing Sheets

U.S. PATENT DOCUMENTS

| | | | |
|---|---|---|---|
| 2007/0050184 A1* | 3/2007 | Drucker et al. | 704/3 |
| 2007/0106557 A1* | 5/2007 | Varghese | 705/14 |
| 2007/0112837 A1* | 5/2007 | Houh et al. | 707/102 |
| 2007/0130509 A1* | 6/2007 | Gombert et al. | 715/513 |
| 2007/0198353 A1* | 8/2007 | Behringer et al. | 705/14 |
| 2007/0214485 A1* | 9/2007 | Bodin et al. | 725/101 |
| 2008/0039010 A1* | 2/2008 | Vance et al. | 455/3.06 |
| 2008/0141180 A1* | 6/2008 | Reed et al. | 715/854 |
| 2008/0184132 A1* | 7/2008 | Zato | 715/748 |
| 2008/0189099 A1* | 8/2008 | Friedman et al. | 704/8 |
| 2008/0242280 A1* | 10/2008 | Shapiro et al. | 455/414.3 |
| 2008/0300872 A1* | 12/2008 | Basu et al. | 704/235 |
| 2009/0254345 A1* | 10/2009 | Fleizach et al. | 704/260 |
| 2010/0066684 A1* | 3/2010 | Shahraray et al. | 345/173 |
| 2010/0070872 A1* | 3/2010 | Trujillo | 715/745 |
| 2010/0088582 A1* | 4/2010 | Toyama et al. | 715/201 |
| 2011/0047079 A1* | 2/2011 | Du et al. | 705/57 |

OTHER PUBLICATIONS

Stitcher.com—About Us, webpage available at <http://stitcher.com/about_us.php>, Retreived on Feb. 19, 2010, 2 pages.

Newell, id3v2-chapters-1.0, ID3.org, The Audience is informed, Information Standard, webpage available at <http://www.id3.org/id3v2-chapters-1.0>, Dec. 2, 2005, 6 pages.

Nilsson, id3v2.3.0—ID3.org, The Audience is informed, Informal Standard, webpage available at <http://www.id3.org/id3v2.3.0>, Feb. 3, 1999, 27 pages.

\* cited by examiner

100

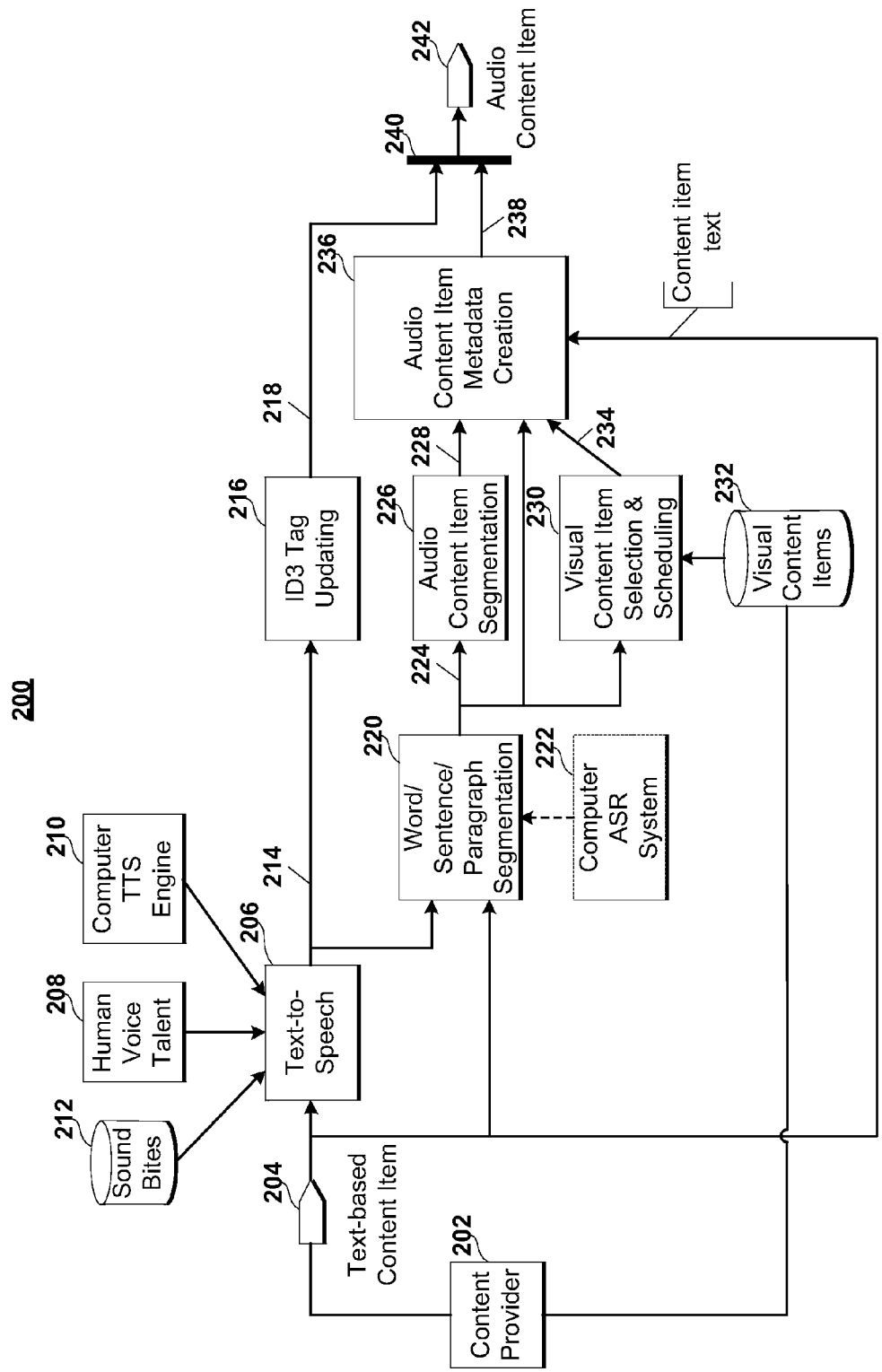

300

350

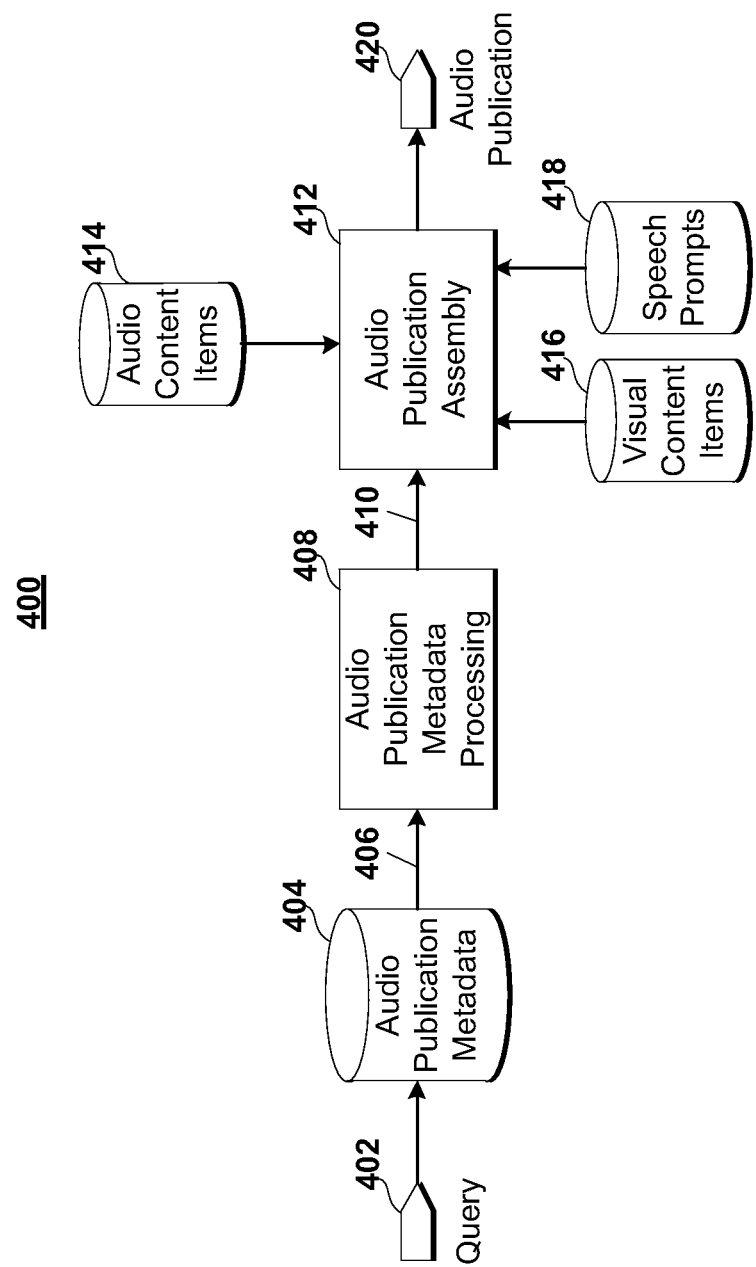

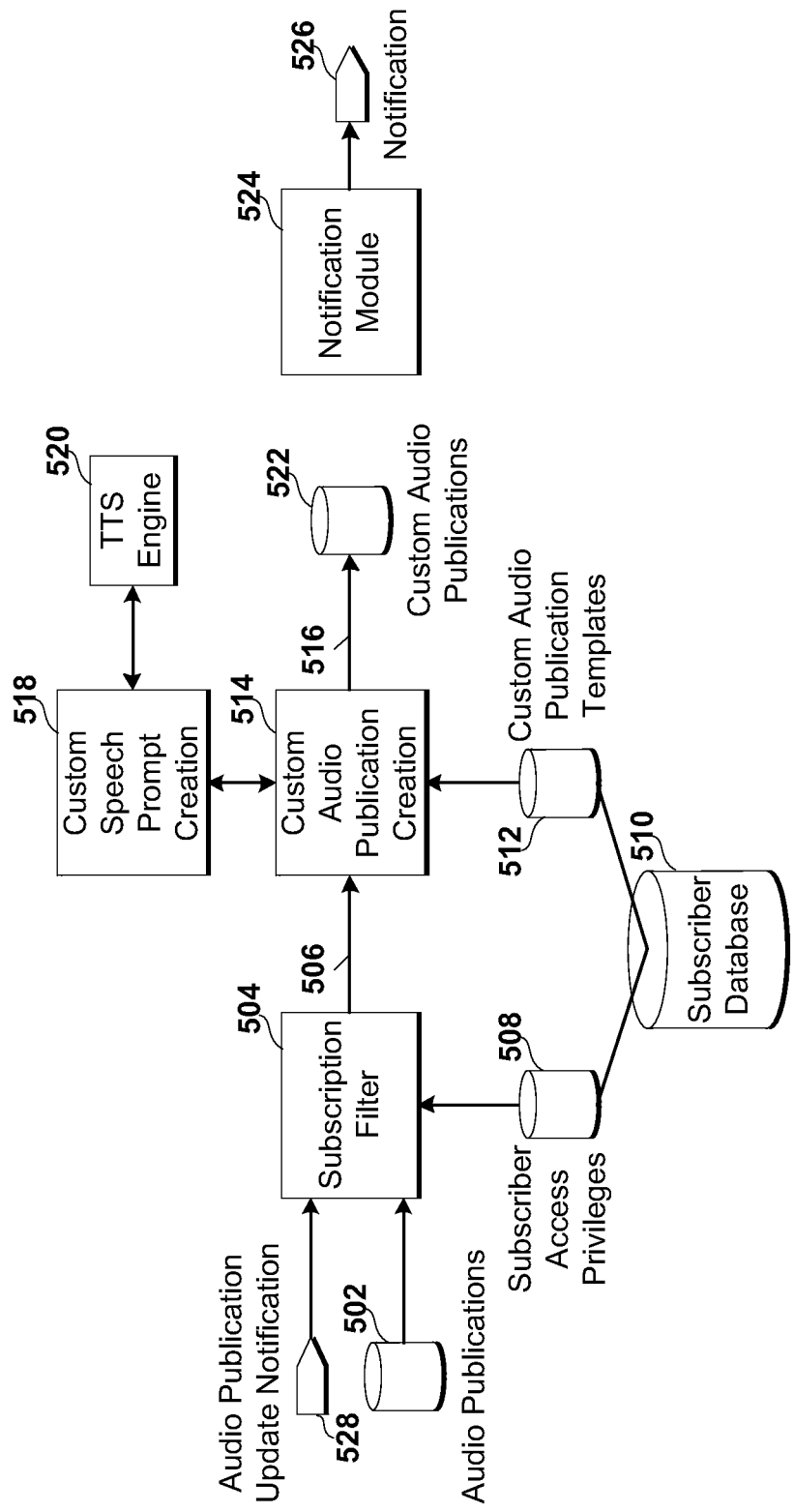

900

1000

1200

1300

1500

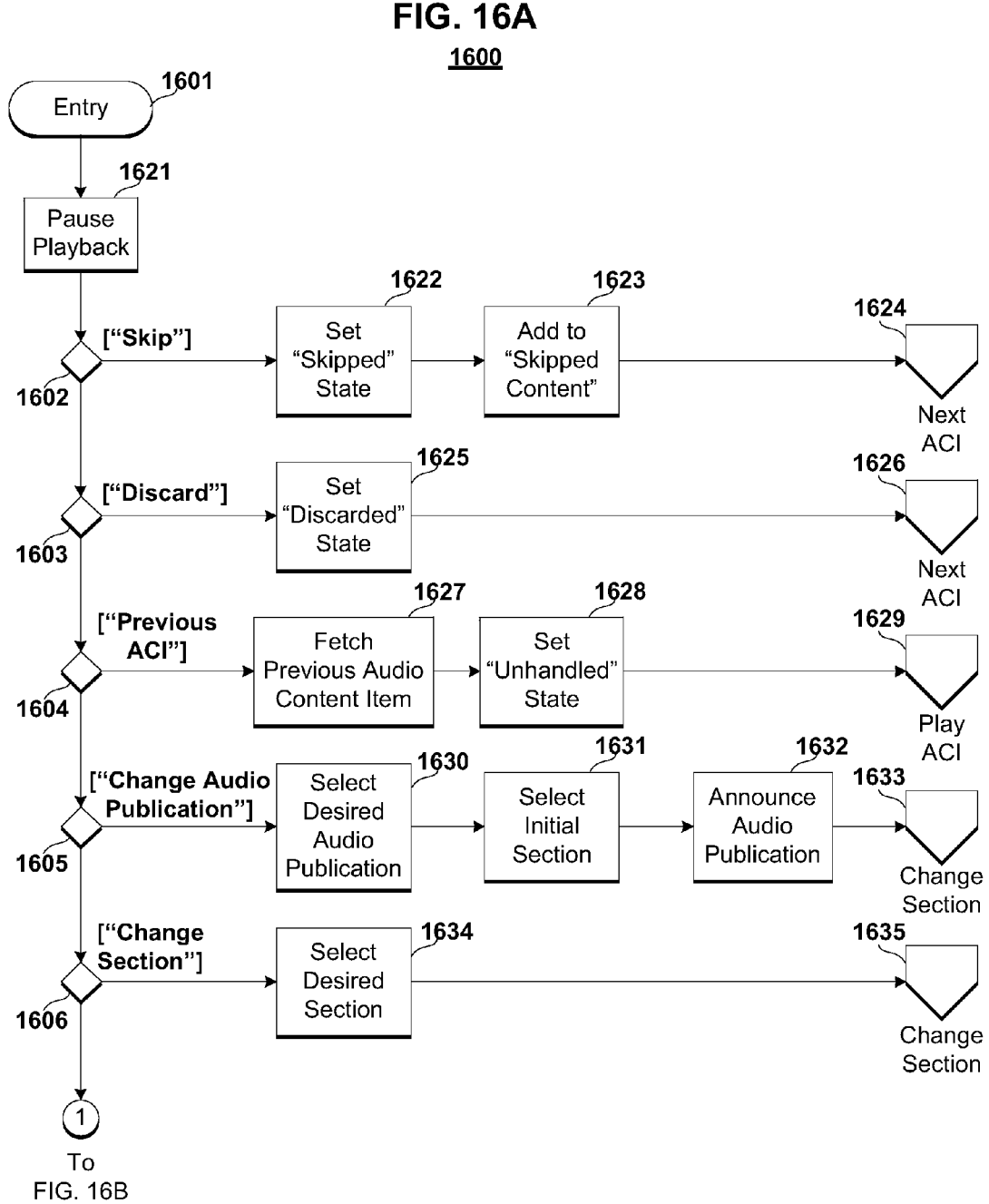

1600

1600

SYSTEM, METHOD, AND APPARATUS FOR GENERATING, CUSTOMIZING, DISTRIBUTING, AND PRESENTING AN INTERACTIVE AUDIO PUBLICATION

This application claims the benefit of U.S. Provisional Application No. 61/160,787, filed on Mar. 17, 2009, which is incorporated by reference herein in its entirety.

BACKGROUND OF THE INVENTION

1. Field of the Invention

The present invention relates to the generation, customization, distribution, and presentation of an interactive audio publication wherein interactive audio content is generated from text-based and speech-based content.

2. Background Art

Individuals are increasingly consuming news on-the-go in many forms. The explosive growth in mobile computing devices such as smart phones, portable media players (PMPs), and netbooks has fueled demand for news content that can be accessed anywhere and anytime. Digital versions of newspapers and news magazines can be downloaded for visual presentation on mobile electronic devices, and daily audio podcasts cover a wide variety of topics.

While visually-oriented online news content offerings are vast, varied, and dynamic, they do not provide busy multitasking individuals with convenient news consumption opportunities. Online newspapers and news magazines, for example, provide coverage on a variety of topics in multiple levels of detail, but due to the visual and "page-based" nature of these media, they cannot be utilized fully or effectively while driving, exercising, or otherwise multitasking.

Audio news content ranges from traditional broadcast radio news programs to prerecorded audio podcasts and live streaming audio feeds that can be presented on mobile computing devices. Audio news content is especially well-suited for consumption while multitasking, but it lacks sufficient interactivity. For example, with broadcast radio, an individual's interactivity is limited to changing the channel. While podcasts and Internet streaming radio offer slightly more interactivity, individuals are still limited to the standard navigation functions (e.g., next/previous track, seek forward/backward, etc.) provided by a media player. Furthermore, navigating an audio podcast using a media player's controls is cumbersome and even dangerous when performing other activities, such as driving.

Recently, the navigability and usability of podcasts has improved. For example, Apple, Inc. created "enhanced podcasts" which combine traditional audio podcasts with embedded chapter information, enabling intra-podcast navigation. Enhanced podcasts also allow visual content to be synchronized for display during podcast presentation. Similarly, the MP3 standard offers "ID3v2 Chapter" tags to enable both intra-audio file navigation and synchronized visual content presentation, although the tags are not widely supported by media players. Despite these enabling technologies, a user must still fumble with media player controls and menus to navigate through enhanced audio content. Furthermore, a standard method for segmenting audio news content does not exist.

Clearly, there is a need for an interactive audio publication system that combines the dynamic qualities of visually-oriented news media with the presentation flexibility of audio news media.

There is also a need for alternative news consumption techniques for the elderly and for individuals with impaired vision. While audio versions of newspapers are available for the visually impaired (e.g., the National Federation of the Blind provides telephone access to audio versions of newspapers created using text-to-speech technology), they support only limited interactivity and have a cumbersome interface that uses a telephone keypad.

Companies such as BuzzVoice and Stitcher currently allow users to customize audio news content for playback via the Web or a portable media player. BuzzVoice uses computerized text-to-speech (TTS) technology to convert text-based content into audio podcasts, while Stitcher allows users to create a playlist of selected audio podcasts that is then streamed to their media player. Both companies focus on customized audio news content, but neither provides a combination of customization and audio content interactivity.

SUMMARY OF THE INVENTION

This Summary is provided to introduce a selection of concepts in a simplified form. The concepts are further described below in the Detailed Description section. This Summary is not intended to identify key features or essential features of the claimed subject matter, nor is it intended to be used to limit the scope of the claimed subject matter.

Methods, systems, and computer program products that enable interactive audio publications and further embodiments are described herein. Systems, methods, and apparatuses are described herein for generating, customizing, distributing, and presenting an interactive audio publication.

In one aspect, an interactive audio publication system includes a creation system, a customization & distribution system, a presentation system, and a subscriber portal. The interactive audio publication system provides solutions for generating, customizing, distributing, and interacting with interactive audio content.

The creation system provides functionality to enable interactive audio publications to be generated for presentation on a presentation system. Text-based and plain speech-based content (e.g., podcasts, radio programs, etc.) are enabled to be transformed into interactive "audio content items." Human voice talent and/or computerized text-to-speech may be employed to convert text-based content to speech. Additionally, navigable audio publications are enabled to be generated by organizing the audio content items into sections. Generated audio publications may be archived and retrieved on-demand using the audio publication Archiving & Retrieval module described herein.

The customization & distribution system generates one or more custom audio publications based on one or more custom audio publication templates generated by a subscriber. The customization & distribution system may handle the distribution of prepared custom audio publications to subscribers for presentation on a presentation system. Custom audio publications may be generated using static assignment rules and/or dynamic search-based criteria. In addition, techniques are described for optionally selecting and scheduling audio and/or visual advertisements for playback and/or display during presentation of an audio publication. Techniques are also described for distributing both new and updated audio publications, with the ability to stream audio publications on-demand.

The subscriber portal enables subscribers to manage their account and profile settings, to configure one or more "custom audio publication templates," to access and share audio content items, and to configure presentation system runtime preferences. Techniques are presented for generating one or more custom audio publication templates that are utilized by the customization & distribution system to generate one or more custom audio publications for each subscriber. In one example, the subscriber portal may be implemented as a Web site with an integrated presentation system.

The presentation system includes a presentation manager and a presentation device. The presentation manager prepares received interactive audio publications for presentation on a particular presentation device. The presentation device presents interactive audio publications dynamically using special metadata that describes the overall structure of the audio publication and the internal structure of each constituent audio content item.

During presentation, subscribers may interact with the presentation device using voice commands and/or an intuitive button interface. The presentation device monitors a subscriber's progress through each audio publication and provides real-time status reporting upon request. Additionally, this aggregate audio publication "state" is shared periodically with the customization & distribution system, enabling novel audio publication customization capabilities, targeted advertisement selection, and the ability to synchronize a plurality of presentation systems.

Additional features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the relevant art(s) to make and use the invention.

FIG. 2A shows a block diagram depicting a system for audio content item generation from text-based content items, according to an example embodiment.

FIG. 4 shows a block diagram depicting an audio publication archiving and retrieval system, according to an example embodiment.

FIG. 5A shows a block diagram depicting an audio publication customization module, according to an example embodiment.

FIGS. 16A-16D show a flowchart depicting a "Handle Command" process, according to an example embodiment.

Figure 1:
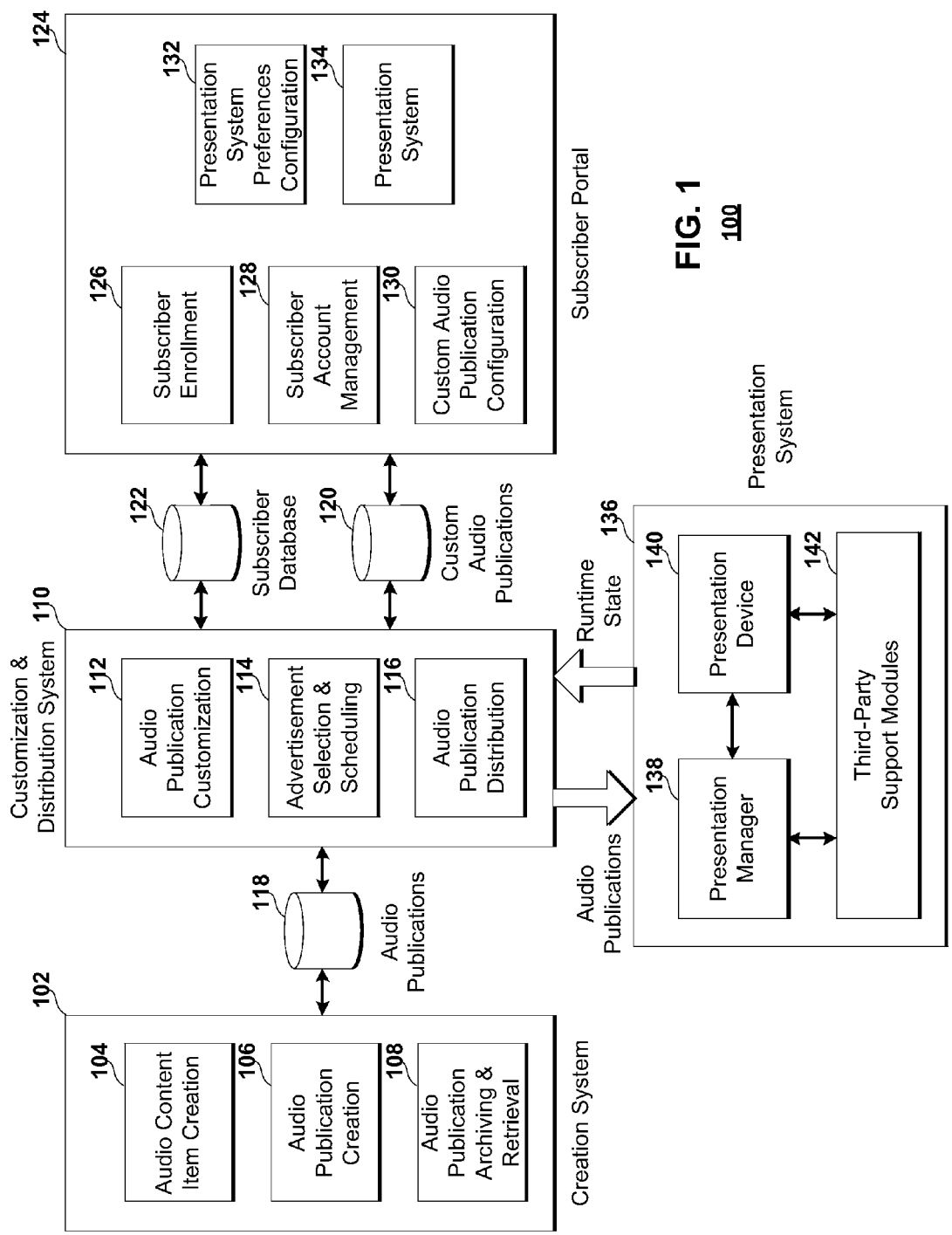
FIG. 1 shows a high-level block diagram of the interactive audio publication system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the relevant art(s) to effect such feature, structure, or characteristic in connection with other embodiments whether or not explicitly described.

Embodiments of an interactive audio publication system are described herein. Such embodiments enable users to navigate quickly and easily through audio publications, scan story title and article headlines rapidly, and adjust the desired levels of presentation detail on-the-fly, without requiring any distracting physical intervention. Furthermore, users are enabled to customize an interactive audio publication to their own unique news source and topic preferences. For instance, FIG. 1 shows a block diagram of an interactive audio publication system 100, according to an example embodiment. As shown in FIG. 1, interactive audio publication system 100 includes a creation system 102, a customization & distribution system 110, a subscriber portal 124, and a presentation system 136, which are subsystems of system 100. System 100 is described as follows.

In embodiments, interactive audio publication system 100 may feature numerous implementation and deployment options. Interactive audio publication system 100 may be implemented in hardware, software, firmware, or any combination thereof. For instance, in an example embodiment, creation system 102, customization & distribution system 110, and subscriber portal 124 may each include one or more software applications that are deployed on a single computer or on a plurality of computers with access to various enterprise resources (e.g., databases 118, 120, and 122, software modules, etc.). In an embodiment, systems 102 and 110 and portal 124 may be deployed on a single computer. In an embodiment, systems 102 and 110 and portal 124 may be co-located or alternatively distributed across one or more geographic areas. Systems 102 and 110 and portal 124, and any enterprise resources utilized by systems 102 and 110 and/or portal 124 may be connected via one or more local area networks (LANs), wide area networks (WANs), virtual private networks (VPNs), and/or interconnect systems. Access rights to various software systems, system modules, and enterprise resources utilized by systems 102 and 110 and/or portal 124 may be configured for each entity involved in the audio publication generation, customization, and distribution processes described herein.

Subscriber portal 124 may be implemented in various ways. For instance, in an embodiment, subscriber portal 124 may be deployed as a Web site with an integrated presentation system (e.g., presentation system 134 shown in FIG. 1). In another embodiment, subscriber portal 124 may be implemented as a module within presentation system 136 (e.g., within a presentation device 140 shown included in presentation system 136 in FIG. 1). In further embodiments, subscriber portal 124 may be implemented in other ways.

Presentation system 136 may be implemented using one or more computing resources configured in various ways. For example, as shown in FIG. 1, presentation system 136 includes a presentation manager 138, a presentation device 140, and one or more third-party support modules 142, which are described in detail further below. In an embodiment, presentation device 140 may be implemented as a standalone hardware device (e.g., a laptop computer, a notebook computer, a smart phone, a handheld computer, a custom hardware device, etc.), an attachable device (e.g., a plug-in device), a software application targeted for a PMP, a smart phone, or other computing platform, or other suitable device mentioned elsewhere herein or otherwise known. Presentation manager 138 may be integrated with presentation device 140, or may alternatively be deployed as a separate application that executes on the same computing resources used by presentation device 140 or on different computing resources. In an embodiment, presentation system 136 may be embedded in a larger system, such as an in-vehicle entertainment system, etc. In an embodiment, presentation manager 138, presentation device 140, and/or third-party support modules 142 may be connected together using standard or proprietary data communications and/or networking technologies including but not limited to USB (universal serial bus), serial, I2C, Ethernet, and the like.

The elements of interactive audio publication system 100 shown in FIG. 1 are described in the following subsections with respect to FIGS. 2A-13. It is noted that in embodiments, same or similarly named features shown in and referenced with regard to FIGS. 1-13, including databases, modules, engines, etc., may be the same feature regardless of whether the same or different reference numerals are used in different figures. For example, an audio content items database having different reference numerals in different figures may be the same audio content item database, in an embodiment. In other embodiments, one or more of the same or similarly named features referenced with regard to FIGS. 1-13 may be separate implementations of the one or more same or similarly named features.

In the context of this document, a "content item" is a fundamental unit of information, based on either speech or written text (e.g., in electronic form, such as online text). A content item that is based on speech, including but not limited to podcasts, radio programs, and other audio files that include speech content, is referred to herein as a "speech-based content item." A content item that is based on written text, including but not limited to newspaper articles, magazine articles, RSS (Really Simple Syndication) text feeds, and the like, is referred to herein as a "text-based content item."

In the context of this document, a "content provider" is an entity that provides one or more text-based and/or speech-based content items.

In the context of this document, a "publisher" is an entity that creates audio publications and "audio content items" from one or more text-based and/or speech-based content items provided by a content provider.

In the context of this document, an "audio content item" is generated from either a text-based or speech-based content item. An audio content item may include audio data containing a spoken representation of the text-based or speech-based content item and metadata that describes the structure of the audio data. In some embodiments, it may be useful to package the audio data in one or more audio files and to encode the audio data according to a standard or proprietary audio encoding technique (e.g., MP3, AAC, etc.). The audio content item metadata may be represented using XML, or an alternative machine-parseable format.

Audio content items may be logically divided into three consecutive non-overlapping "audio segments" called a title segment, a summary segment, and a story body segment. The title segment is an audio segment that announces the audio content item's title, and optionally, the source content item's author and/or date. The summary segment may include one or more of the audio content item's introductory paragraphs. The summary segment may be generated directly from the source content item or alternatively from a content item that is provided separately. In an embodiment, the title segment may be relatively short when compared to the summary segment. In an embodiment, a default summary segment length may be specified in the presentation system runtime preferences (see section D.4). The story body segment includes the remainder of the audio content item (e.g., other than the title segment and summary segment). In some embodiments, it may be advantageous to store the title, summary, and story body segments in separate audio files called "audio content item fragments."

As shown in FIG. 1, presentation system 136 includes a presentation manager 138, a presentation device 140, and one or more third-party support modules 142. Audio content item metadata enables presentation device 140 to perform navigation and interaction functions described in section D. The audio content item metadata may include a plurality of word-based boundary markers (e.g., one or more words that designate the beginning and/or end of each of an audio content item's title, summary, and story body segments), a plurality of time-based boundary markers (e.g., an audio recording timestamp referenced from the beginning of the audio recording, etc.), and/or a plurality of references to one or more files, including but not limited to audio content item fragments, visual content items, and advertisements. For example, time-based boundary markers may be used to designate the location of each word, sentence, and paragraph contained in an audio content item, as measured from the beginning of the audio content item's audio recording. Additionally, time-based and/or word-based boundary markers may be used to define a presentation schedule (i.e., scheduling details) for one or more "visual content items," and/or "advertisements," as defined below. Audio content item metadata may also include the text of a corresponding text-based content item or a transcript of a corresponding speech-based content item, so as to enable various functionalities as described herein (e.g., audio content item searching). In some embodiments, the audio content item metadata may be embedded within the audio data (e.g., using an ID3 tag), or packaged separately.

In the context of this document, a "visual content item" is a file that contains data for visual display. Examples of visual content items include image files (e.g., JPEG, PNG, etc.) and video files (e.g., MPEG, AVI, Flash, etc.). One or more visual content items may be associated with an audio content item and scheduled for display during presentation of the audio content item. Visual content item scheduling details may be stored in the associated audio content item metadata, for example.

In the context of this document, an "advertisement" is an object that may include one or more files containing audio data (e.g., one or more audio files) and/or visual data (e.g., one or more image files, video files, textual information, etc.) that may be optionally distributed with an audio publication and displayed during presentation of an audio content item.

In the context of this document, a "speech prompt" is a spoken representation of an alert, announcement, or other informational fragment (e.g., the audio publication name, a navigation option, a personalized greeting, etc.) that may be played when an audio publication is presented.

In the context of this document, an "interactive audio publication," also referred to as an "audio publication," includes a collection of one or more audio content items that are organized into one or more sections (e.g., Technology, Entertainment, Sports Podcasts, etc.) such that each section contains at least one audio content item. An audio publication may further include metadata that defines a complete audio publication structure. An audio publication may optionally further include one or more visual content items, one or more advertisements, and/or one or more speech prompts. Collectively, these constituent audio publication entities are referred to as "audio publication components."

An audio publication's structure is defined by its metadata. Audio publication metadata defines an ordered list of sections contained within an audio publication and provides association details that map one or more audio content items to one or more sections. Additionally, audio publication metadata may contain advertisement scheduling details (e.g., see section B.3), and speech prompt presentation rules that specify when one or more prerecorded speech prompts are to be played during presentation of an audio publication. Optionally, the audio content item metadata for each constituent audio content item may be embedded within the audio publication metadata. In one embodiment, audio publication metadata is represented using XML, or an alternative machine-parseable format.

In the context of this document, a "subscriber" is an entity that subscribes to one or more audio publications, optionally generates one or more new custom audio publications, and consumes audio publication content via the presentation system embodiments described herein. The term "user" may be used herein to describe an entity that consumes audio publication content via the presentation system embodiments described herein (e.g., is not necessarily a subscriber). It is noted that in some cases where a "subscriber" is referred to herein as performing an act (e.g., consuming content, providing a command, etc.), the "subscriber" may alternatively be a "user." For instance, a "user" may use a presentation device to consume audio publication content without actually subscribing to the audio publication content (e.g., the user may have borrowed a presentation device from a subscriber, etc.).

In the context of this document, a "custom audio publication template" is a collection of subscriber-specified rules and preferences that are used to generate a "custom audio publication." Several example techniques for customizing audio publications are described in section B.2.

A. Example Creation System Embodiments

As shown in FIG. 1, creation system 102 includes an audio content item creation module 104, an audio publication creation module 106, and an audio publication archiving & retrieval module 108.

Creation system 102 is configured to generate audio content items and audio publications 118. There is flexibility regarding the order in which audio content items and audio publications are generated. For example, audio content item generation may occur after the assembly of an encompassing audio publication, in which case audio content item placeholders may be substituted for audio content items within the generated audio publication. Additionally, audio content item generation may occur in a plurality of "assembly stages," such that one or more portions of an audio content item are generated prior to assembly of an encompassing audio publication, and remaining portions are generated later (e.g., immediately prior to presentation by presentation system 136). In an embodiment, portions of creation system 102 may be performed by presentation system 136 (e.g., audio content item generation).

A.1. Example Audio Content Item Generation Embodiments

Figure 2B:
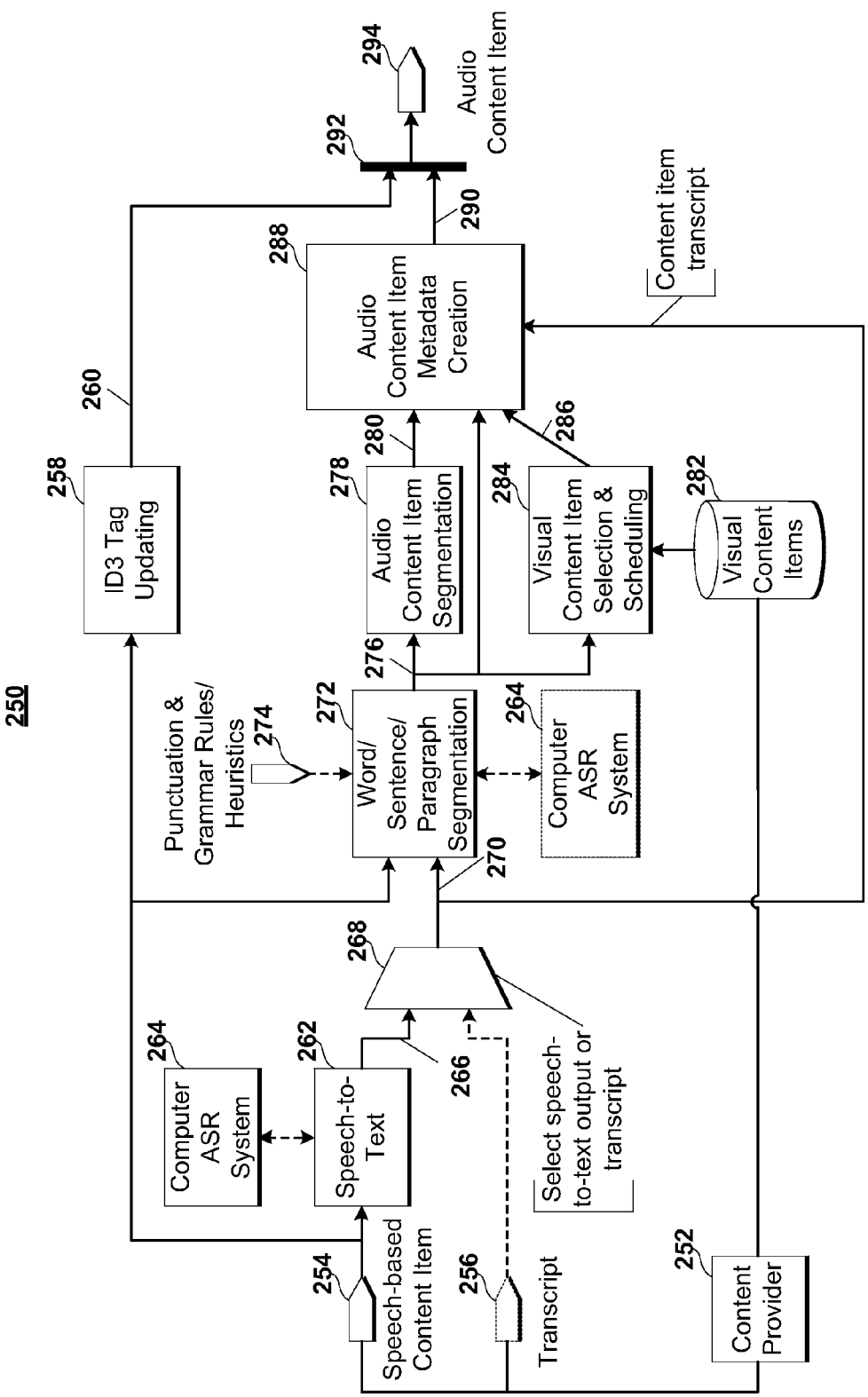
FIG. 2B shows a block diagram depicting a system for audio content item generation from speech-based content items, according to an example embodiment.

Audio content item creation module 104 is configured to generate audio content items. Audio content item creation module 104 may be configured in various ways. For instance, FIGS. 2A and 2B show block diagrams of audio content item creation module 104, according to example embodiments. FIG. 2A depicts a system 200 for generating an audio content item 242 from a text-based content item 204, and FIG. 2B illustrates a system 250 for generating an audio content item 294 from a speech-based content item 254. FIGS. 2A and 2B illustrate exemplary techniques by which audio content items are generated prior to generation of an encompassing audio publication. It is understood that FIGS. 2A and 2B are presented by way of example to assist in understanding the processes involved in generating audio content items, and modifications may be made to these examples to realize further embodiments.

As shown in FIG. 2A, system 200 includes a text-to-speech module 206, an ID3 tag updating module 216, a word/sentence/paragraph segmentation module 220, a computer ASR (automatic speech recognition) system 222, an audio content item segmentation module 226, a visual content item selection & scheduling module 230, an audio content item metadata creation module 236, and a combiner 240. These elements of system 200 are described as follows.

Referring to FIG. 2A, a text-based content item 204 is supplied by a content provider 202. Ancillary data such as the text-based content item publisher, author, date/time, unique identifier, etc., may also be provided with text-based content item 204. Text-based content item 204 is converted to speech by text-to-speech module 206. As indicated in FIG. 2A, text-to-speech module 206 may include one or more of human voice talent 208, computerized text-to-speech (TTS) 210 (e.g., a text-to-speech application), or a combination of both to perform text-to-speech conversion. In addition, prerecorded sound bites 212 may be inserted into the generated audio at desired locations by text-to-speech module 206. For example, sound bites 212 may be utilized for spoken quotations and/or for specific text segments within text-based content item 204. Text-to-speech module 206 generates speech-based audio data 214, which may optionally be encoded (e.g., as digital audio data) and stored in one or more standard audio files (e.g., MP3, AAC, etc.); MP3-encoded audio data is assumed in this document for purposes of illustration.

ID3 tag updating module 216 receives speech-based audio data 214. In an embodiment, ID3 tag updating module 216 updates standard MP3 ID3 tags (i.e., genre, artist, album, song title) (or similar tags defined by an alternative audio format) using the optionally provided content item ancillary data. For example, Table 1 illustrates an example of ID3 tag mapping that may be used for audio content items generated from standard newspaper articles:

TABLE 1

Example of standard ID3 tag mapping for an audio content item generated from a newspaper article.

| ID3 Tag | Information Stored |
| --- | --- |
| Genre | Newspaper Publisher |
| Artist | Text-based Content Item Author |
| Album | Section (e.g., "Editorials") |
| Song Title | Headline |

ID3 tag updating module 216 generates encoded and ID3-tagged audio data 218.

Speech-based audio data 214 is received and processed by segmentation module 220 to locate individual word, sentence, and paragraph boundaries contained therein. Word, sentence, and paragraph segmentation may be performed by segmentation module 220 either manually or automatically. For example, automatic speech recognition (ASR) system 222 may be used to locate the word, sentence, and paragraph boundaries through a process called forced alignment. Additionally, if a TTS (text-to-speech) engine 210 is used to generate speech-based audio data 214 in module 206, the segmentation information may be obtained from TTS engine 210 during the conversion process.

Segmentation module 220 generates a list 224 of timestamps corresponding to the time-based boundaries for each word, sentence, and paragraph contained in speech-based audio data 214. Audio content item segmentation module 226 receives and uses timestamp list 224 and the text of text-based content item 204 to divide speech-based audio data 214 logically into non-overlapping title, summary, and story body segments. Audio content item segmentation module 226 generates a list 228 of timestamps denoting a start time and end time of each audio content item segment. Together, word/sentence/paragraph timestamp list 224 and audio content item segment timestamp list 228 constitute a core audio content item structure and are used by audio content item metadata creation module 236 to generate audio content item metadata 238. As described elsewhere herein, audio content item metadata 238 may include boundary markers (e.g., time-based boundaries, etc.) for the corresponding audio content item, scheduling details for one or more visual content items and/or one or more advertisements associated with the audio content item, the text of the corresponding text-based content item, etc.

Visual content item selection and scheduling module 230 receives timestamp list 224 and one or more visual content items 232, which may be selected and scheduled for display during presentation of audio content item 242. Optionally, one or more visual content items 232 may be provided with text-based content item 204. Visual content items 232 may include photographs, images, artwork, video, and/or other visual-oriented media that can be sequenced for display using timestamp list 224 output from segmentation module 220.

Visual content item selection & scheduling module 230 provides several options for sequencing visual content items 232. A visual content item's initial display time may be associated with a particular word instance within an audio content item, or the display duration may be mapped to a particular text segment. Additionally or alternatively, visual content items 232 may be sequenced automatically such that selected visual content items are distributed uniformly throughout an audio content item.

In one embodiment, a publisher may schedule visual content items 232 using an application included in module 230. For instance, the application may provide a graphical user interface (GUI) enabling the publisher to schedule visual content items 232 with a graphical timeline or by highlighting specific text segments within text-based content item 204. Visual content selection & scheduling module 230 generates visual content item scheduling details 234 (e.g., scheduling information), which include the selected visual content items and a set of timestamps (or word-based boundary markers) designating the presentation start and end times for each selected visual content item. Visual content item scheduling details 234 are received by audio content item metadata creation module 236.

Audio content item metadata creation module 236 automatically generates audio content item metadata 238 using the full text and any ancillary data from text-based content item 204, list 224 of timestamps corresponding to the word/sentence/paragraph boundaries, list 228 of timestamps corresponding to the audio content item segment boundaries, and visual content item scheduling details 234. In one embodiment, audio content item metadata 238 is represented using XML with a clearly defined schema. Optionally, audio content item metadata 238 may be combined with encoded and ID3-tagged audio data 218 by a combiner 240, such as by embedding metadata 238 in an unused ID3 tag. Together, encoded and ID3-tagged audio data 218 and audio content item metadata 238 constitute a newly-generated audio content item 242.

Whereas FIG. 2A depicts system 200, which is configured to generate audio content items from text-based content items, FIG. 2B illustrates system 250, which is configured to generate audio content items from speech-based content items such as podcasts, recorded radio broadcasts, and the like. Speech-based content items may be provided in various forms (e.g., as digital audio data) and formats, such as standard audio files (e.g., MP3, AAC, etc.). MP3 audio files are referred to in this document for ease of illustration. As shown in FIG. 2B, system 250 includes an ID3 tag updating module 258, a speech-to-text module 262, a computer ASR system 264, a transcript selector 268, a word/sentence/paragraph segmentation module 272, an audio content item segmentation module 278, a visual content item scheduling module 284, an audio content item metadata creation module 288, and a combiner 292. These elements of system 250 are described as follows.

Referring to FIG. 2B, a speech-based content item 254 is supplied by a content provider 252. Ancillary data such as the speech-based content item publisher, author, date/time, unique identifier, etc., may also be provided with speech-based content item 254. If ancillary data is provided, ID3 updating module 258 may use the ancillary data to update the ID3 (or equivalent) tags (i.e., genre, artist, album, song title) of speech-based content item 254. The output of ID3 updating module 258 is an encoded (e.g., MP3 encoded) and ID3-tagged audio file 260.

Optionally, a transcript 256 of speech-based content item 254 may be provided. If transcript 256 is not provided, then speech-based content item 254 may be converted to text by speech-to-text module 262, either manually or by an automatic speech recognition (ASR) system 264. Speech-to-text module 262 generates a decoded transcript 266 of speech-based content item 254. Selector 268 selects either transcript 256 (if provided with speech-based content item 254) or decoded transcript 266 if transcript 256 is not available. Segmentation module 272 receives and analyzes speech-based content item 254 and selected transcript 270 to determine word, sentence, and paragraph time-based boundaries in speech based content item 254. For instance, in an embodiment, ASR system 264 may be used by segmentation module 272 to perform the boundary determinations. If ASR system 264 is used to perform the segmentation and transcript 256 is not provided, punctuation and grammar rules/heuristics 274 may be used by segmentation module 272 to identify word, sentence, and paragraph boundaries automatically. Segmentation module 272 generates a list 276 of timestamps corresponding to the time-based boundaries for each word, sentence, and paragraph contained in speech based content item 254.

As shown in FIG. 2B, audio content item segmentation module 278 receives timestamp list 276. Module 278 uses the extracted word, sentence, and paragraphs boundaries indicated in list 276 and selected transcript 270 to divide speech-based content item 254 into the title, summary, and story body segments. Audio content item segmentation module 278 generates a list 280 of timestamps denoting the start and end time of each audio content item segment. Together, timestamp lists 276 and 280 constitute a core audio content item structure and are received and used by audio content item metadata creation module 288 to generate audio content item metadata 290. Audio content item metadata 290 may include any of the audio content item metadata components (i.e., boundary markers, scheduling details, transcripts, etc.) described elsewhere herein.

One or more visual content items 282 may be optionally scheduled for display during presentation of audio content item 294 by visual content item selection & scheduling module 284. Using timestamp list 276 generated by segmentation module 272, visual content selection & scheduling module 284 generates visual content item scheduling details 286, which include the selected visual content items and a set of timestamps designating the presentation start and end times for each selected visual content item. In an embodiment, timestamp lists 276 and 280 and visual content item scheduling details 286 may be used by audio content item metadata creation module 288 to generate audio content item metadata 290 for audio content item 294.

Optionally, audio content item metadata 290 may be combined with encoded and ID3-tagged audio file 260 by combiner 292 (e.g., by embedding metadata 290 in an unused ID3 tag). Together, encoded and ID3-tagged audio file 260 and audio content item metadata 290 form a newly-created audio content item 294.

A.2. Example Audio Publication Generation Embodiments

Figure 3A:
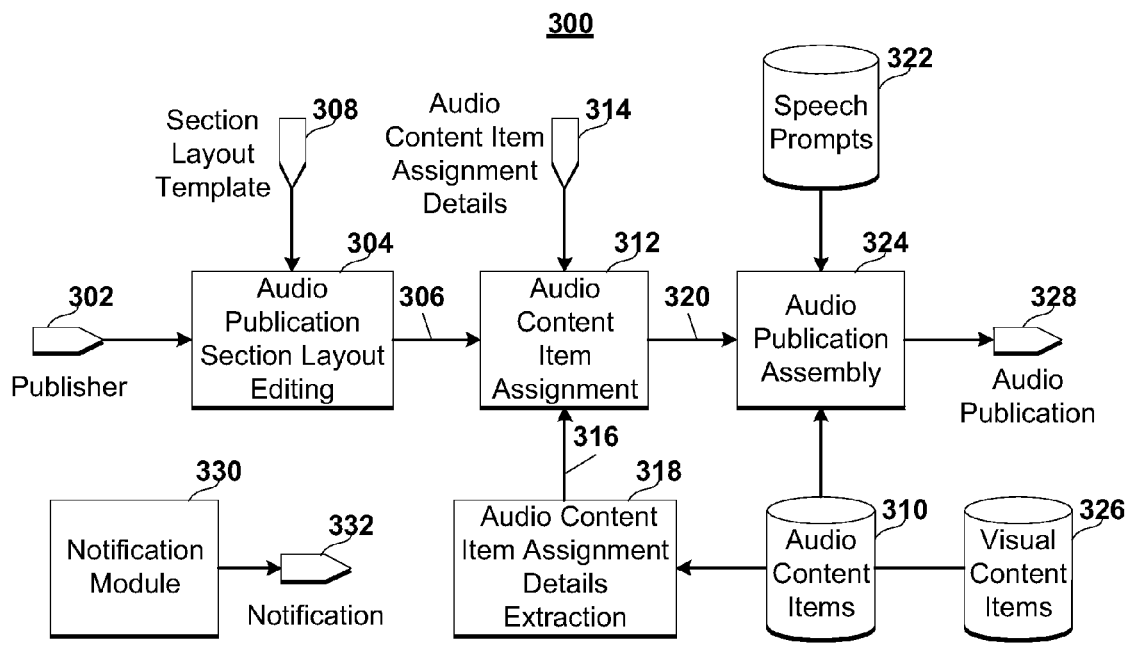
FIG. 3A shows a block diagram depicting a system for managed audio publication generation, according to an example embodiment.
Figure 3B:
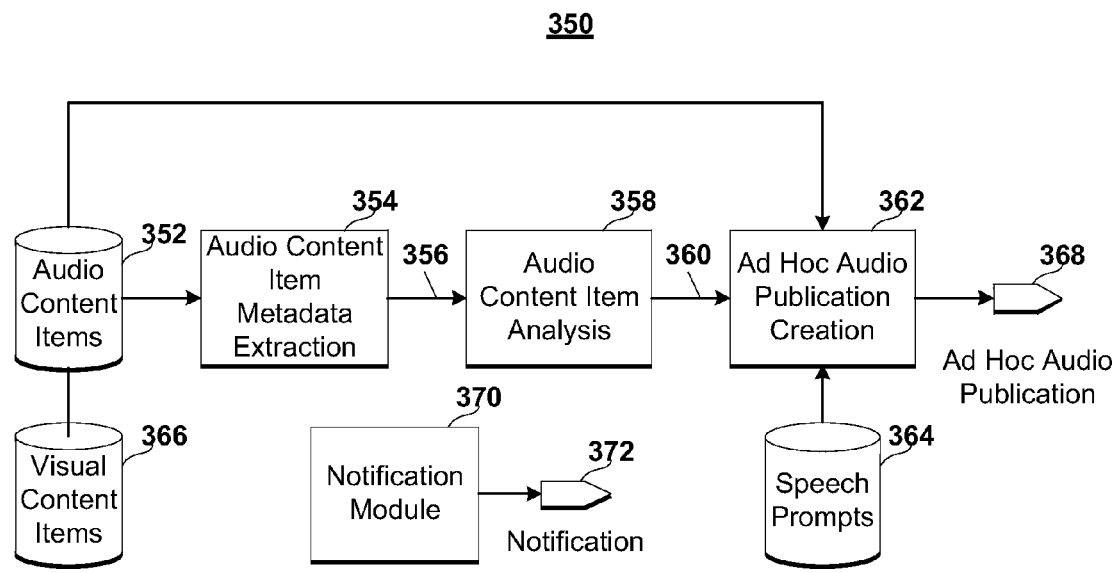
FIG. 3B shows a block diagram depicting a system for automated ad hoc audio publication generation, according to an example embodiment.

Referring back to interactive audio publication system 100 of FIG. 1, audio content items that are generated by audio content item creation module 104 are contained in one or more audio publications. Accordingly, audio publication creation module 106 may be configured for both manual and automated audio publication creation. FIGS. 3A and 3B depict block diagrams of audio publication creation module 106, according to example embodiments. FIG. 3A depicts a system 300 in which a publisher 302 manages the generation of an audio publication 328, and FIG. 3B illustrates a system 350 in which an ad hoc audio publication 368 is generated automatically by a software publisher. In both systems 300 and 350, audio publications are generated by grouping and organizing one or more audio content items into one or more audio publication sections. Systems 300 and 350 are described as follows.

A.3. Example Managed Audio Publication Generation Embodiments

As shown in FIG. 3A, system 300 includes an audio publication section layout editing module 304, an audio content item assignment module 312, an audio content item assignment details extraction module 318, an audio publication assembly module 324, and a notification module 330. These elements of system 300 are described as follows.

Referring to FIG. 3A, an audio publication publisher 302 may use audio publication section layout editing module 304 to generate and/or modify an audio publication section layout 306. An audio publication section layout 306 includes an ordered list of one or more audio publication sections (e.g., a "Front Page" section, a "Business" section, etc.), and optionally, one or more selected speech prompts 322. Optionally, a default audio publication section layout may be provided by section layout template 308. Section layout template 308 may be edited within audio publication section layout editing module 304. For example, publisher 302 may add, delete, rename, and/or reorder sections to generate audio publication section layout 306. Additionally, publisher 302 may select and associate one or more speech prompts 322 with one or more sections indicated in section layout 306. For example, speech prompts may be used during audio publication presentation to announce a selected audio publication section name or the name of the audio publication. Generated audio publication section layout 306 may be saved as a template 308 for future use.

One or more audio content items 310, which may be provided via a database or other source, may be selected by publisher 302 and added to one or more audio publication sections indicated by audio publication section layout 306. Within an audio publication, a single audio content item may be associated with one or more audio publication sections. For example, an audio content item might be associated with both a "Front Page" and a "Business" section.

Audio content item assignment details 314 and/or 316 indicate a mapping of audio content items 310 to one or more audio publication sections defined in audio publication section layout 306 (i.e., the section(s) to which each audio content item is to be added, etc.). Audio content item assignment details 314 may be provided separately by publisher 302. Alternatively, audio content item assignment details 316 may be extracted automatically from selected audio content items 310 by audio content item assignment details extraction module 318. As shown in FIG. 3A, audio content item assignment module 312 receives audio publication section layout 306, and audio content item assignment details 314 and/or audio content item assignment details 316. Using audio content item assignment details 314 and/or 316, audio content item assignment module 312 maps selected audio content items 310 to one or more audio publication sections defined in audio publication section layout 306. Audio content item assignment details 314 and/or 316 may also define a sequential ordering of audio content items within each audio publication section, as determined by publisher 302. In one embodiment, audio content item assignment module 312 may be automated (e.g., may include automated processes). As shown in FIG. 3A, audio content item assignment module 312 generates audio content item sectional assignments 320.

Audio publication assembly module 324 receives audio publication section layout 306 and audio content item sectional assignments 320. Module 324 generates audio publication metadata and assembles an audio publication 328 by including all referenced audio content items 310, visual content items 326, and speech prompts 322 in assembled audio publication 328. In an embodiment, audio publication metadata is generated by module 324 and is included in audio publication 328. For example, the audio publication metadata may be a machine-parseable representation of an audio publication structure and may contain the names and ordering of all constituent sections, the audio content item sectional assignments, the ordering of audio content items within each section, and one or more speech prompt presentation rules. In one embodiment, the audio publication metadata may be represented using XML.

In an embodiment, the audio content item metadata for constituent audio content items 310 may be embedded directly in the audio publication metadata generated by audio publication assembly module 324. Alternatively, the constituent audio content item metadata may be referenced indirectly from within the generated audio publication metadata.

In an embodiment, notification module 330 may issue a notification 332 whenever a new or updated audio publication is assembled by audio publication assembly module 324. Notification 332 may be received by customization & distribution system 110, for example, to trigger the execution of customization processes enabled thereby.

A.4. Example Automated Audio Publication Generation Embodiments

Whereas FIG. 3A depicts system 300, in which audio publication generation is managed by a publisher 302, FIG. 3B depicts system 350, in which one or more ad hoc audio publications 368 may be generated automatically by a software-based publisher (e.g., an automated publisher that generates ad hoc audio publications 368 according to an automated process). An ad hoc audio publication 368 contains one or more audio content items 352 from a selected "content source" (e.g., podcasts, RSS feeds, blogs, and the like) that are organized into a standard set of one or more sections (e.g., World News, Entertainment, etc.).

As shown in FIG. 3B, system 350 includes an audio content item metadata extraction module 354, an audio content item analysis module 358, an ad hoc audio publication creation module 362, and a notification module 370. These elements of system 350 are described as follows.

Referring to FIG. 3B, one or more audio content items 352 are received by automated publisher system 350, possibly via a database or other source. Audio content item metadata extraction module 354 extracts audio content item metadata 356 from the received audio content items 352. Extracted audio content item metadata 356 is received and processed by audio content item analysis module 358 to determine the "content source" and associated section(s) for each received audio content item 352. Module 358 generates a set of analyzed metadata details 360.

Ad hoc audio publication creation module 362 receives analyzed metadata details 360, which include the determined content source and associated sections(s) for each audio content item 352, and generates an ad hoc audio publication 368 for each unique content source. Referenced audio content items 352 are added to each generated ad hoc audio publication 368 by ad hoc audio publication creation module 362. Ad hoc audio publications 368 are named according to the content source of the constituent audio content items (e.g., an ad hoc audio publication called "Podcasts" or "Blogs"). In an embodiment, notification module 370 may issue a notification 372 whenever a new or updated ad hoc audio publication is assembled by ad hoc audio publication creation module 362. Notification 372 may be received by customization & distribution system 110, for example, to trigger the execution of customization processes enabled thereby.

One or more speech prompts 364 may be optionally selected by automated publisher system 350. Speech prompts may be used, for example, during audio publication presentation to announce a selected ad hoc audio publication section name or the name of an ad hoc audio publication 368. If speech prompts 364 are used, module 362 may add speech prompt presentation rules to the generated ad hoc audio publication metadata. Each generated ad hoc audio publication 368 includes audio publication metadata, one or more referenced audio content items 352, and optionally, one or more referenced visual content items 366, and one or more speech prompts 364.

A.5. Example Audio Publication Archiving & Retrieval Embodiments

Referring back to FIG. 1, audio publication archiving & retrieval module 108 enables audio publications 118 to be stored (e.g., in assembled or disassembled form) and optionally reassembled at a later time. For example, an audio publication may be stored as a single object or alternatively in a "disassembled" form, such that the constituent audio publication components and metadata are stored as separate entities. FIG. 4 depicts audio publication archiving & retrieval system 400, according to an example embodiment. Audio publication archiving & retrieval system 400 is an example of audio publication archiving & retrieval module 108 of FIG. 1. As shown in FIG. 4, system 400 includes an audio publication metadata processing module 408, an audio publication assembly module 412, and a plurality of databases 404, 414, 416, and 418 that store audio publication components generated in modules 104 and 106 (of FIG. 1). Databases 404, 414, 416, and 418 are depicted as separate databases for ease of illustration and may be realized as one or more combined or separate physical databases. These elements of system 400 are described as follows.

Referring to FIG. 4, a query 402 for a particular audio publication 420 is received by system 400. For example, query 402 may be received from a publisher, a subscriber (via presentation system 136 or subscriber portal 124), or from customization & distribution system 110 of FIG. 1. Audio publication metadata 406 corresponding to query 402 is retrieved from audio publication metadata database 404 by audio publication metadata processing module 408. Audio publication metadata processing module 408 parses audio publication metadata 406 and generates audio publication assembly directives 410, which are received by audio publication assembly module 412. Audio publication assembly directives 410 may include SQL (structured query language) statements and/or other code used to retrieve stored audio publication components and to assemble an audio publication, for example.

Audio publication assembly module 412 receives and utilizes audio publication assembly directives 410 to retrieve audio content items, visual content items, and speech prompts (e.g., "audio publication components") referenced in audio publication metadata 406. For example, as shown in FIG. 4, module 412 may request and receive one or more audio content items stored in audio content items database 414, may request and receive one or more visual content items stored in visual content items database 416, and/or may request and receive one or more speech prompts stored in speech prompts database 418. The received audio publication components are assembled by audio publication assembly module 412 to generate a requested audio publication 420. Assembled audio publication 420 may then be stored and/or transmitted to the entity or system that initiated the query.

B. Example Customization & Distribution System Embodiments

Referring to FIG. 1, customization & distribution system 110 transforms audio publications 118 into subscriber-defined custom audio publications 120, manages subscriber access to custom audio publications 120, and ensures timely delivery of custom audio publications 120 to a subscriber's presentation system. Customization & distribution system 110 includes an audio publication customization module 112, an optional advertisement selection & scheduling module 114, and an audio publication distribution module 116. Audio publications are provided to customization & distribution system 110 by audio publications database 118. For example, as described above, customization & distribution system 110 may generate queries to audio publication archiving & retrieval module 108 for audio publications. Custom audio publications generated according to one or more audio publication customization techniques may be stored in custom audio publications database 120. Additionally, subscriber details including current subscription information, audio content item presentation history, advertisement presentation history, and/or one or more custom audio publication templates, etc., may be stored in subscriber database 122.

B.1. Example Audio Publication Customization Embodiments

Audio publication customization module 112 enables custom audio publications 120 to be generated. FIG. 5A depicts an audio publication customization system 500, according to an example embodiment. Audio publication customization system 500 is an example embodiment of audio publication customization module 112 of FIG. 1. As shown in FIG. 5A, system 500 includes a subscription filter 504, a custom audio publication creation module 514, a custom speech prompt creation module 518, a TTS (text-to-speech) engine 520, and a notification module 524. These elements of system 520 are described as follows.

Referring to FIG. 5A, subscription filter 504 is configured to limit a subscriber's access to a subset of available source audio publications 502 according to a subscriber's access privileges 508, which may be stored in subscriber database 510 (e.g., subscriber database 122 of FIG. 1). Filtered audio publications 506 are provided to custom audio publication creation module 514, which dynamically generates one or more new custom audio publications according to one or more subscriber-defined custom audio publication templates 512 stored in subscriber database 510. If custom audio publication templates 512 are not provided, filtered audio publications 506 may pass through custom audio publication creation module 514 unmodified. As shown in FIG. 5A, custom audio publication creation module 514 generates custom and/or pass-through audio publications 516. Audio publications 516 may be stored in custom audio publications database 522 (e.g., custom audio publications database 120 of FIG. 1). Additionally, notification module 524 may send a notification 526 to audio publication distribution module 116 (FIG. 1) whenever one or more new and/or updated audio publications 516 are generated and are available for distribution to a subscriber (see section B.4).

Optionally, custom speech prompt creation module 518 may generate one or more speech prompts for audio publications 516 generated by custom audio publication creation module 514. Custom speech prompt creation module 518 may use computerized TTS (text-to-speech) engine 520 to generate one or more speech prompts automatically. As described elsewhere herein, speech prompts may be generated for each custom audio publication name and for each custom audio publication section, for example. If custom speech prompt creation module 518 generates speech prompts, custom audio publication creation module 514 may be configured to modify/update the audio publication metadata of a corresponding audio publication 516 to include the speech prompt presentation rules, as described elsewhere herein.

Audio publication customization system 500 may also be configured to generate updated audio publications 516 whenever corresponding source audio publications 502 are updated. For example, subscription filter 504 may receive an update notification 528 (e.g., from audio publication creation module 106) when one or more source audio publications 502 are updated. Furthermore, audio publication customization system 500 may be configured to execute upon receipt of update notification 528 such that only the new audio content items contained in source audio publications 502 are processed.

B.2. Example Custom Audio Publication Generation Embodiments

Figure 5B:
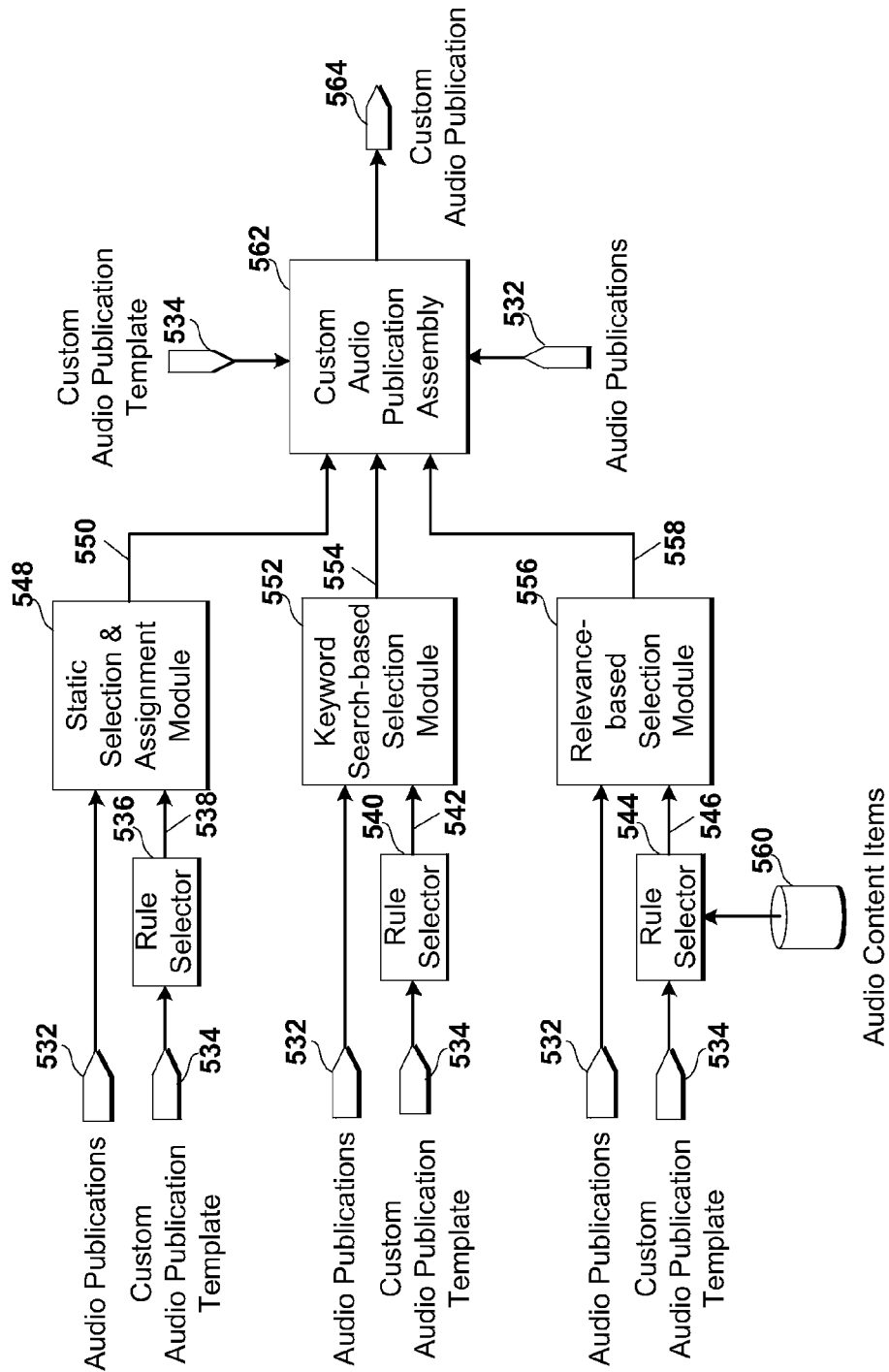
FIG. 5B shows a block diagram depicting a custom audio publication creation module, according to an example embodiment.

Custom audio publication creation module 514 of FIG. 5A enables one or more custom audio publications 516 to be generated by selecting audio content items from one or more source audio publications 502. FIG. 5B shows a block diagram of a system 530, which is an example of custom audio publication module 514 according to an example embodiment. System 530 is configured to select audio content items from source audio publications 532 and to generate one or more new custom audio publications 564. As shown in FIG. 5B, system 530 includes a static selection & assignment module 548, a keyword search-based selection module 552, a relevance-based selection module 556, rule selector modules 536, 540, and 544, and a custom audio publication assembly module 562. These elements of system 530 are described as follows.

Referring to FIG. 5B, source audio publications 532 and a subscriber-defined custom audio publication template 534 are received by system 530. Rule selector 536 selects one or more subscriber-defined static selection and assignment rules 538 from custom audio publication template 534, if such rules are present. Static selection & assignment module 548 uses static selection & assignment rules 538 to assign one or more audio content items contained in at least one source audio publication 532 to one or more sections contained within custom audio publication 564. Static selection & assignment rules 538 explicitly map one or more audio content items contained in source audio publications 532 to one or more custom audio publication sections defined by a subscriber. For example, static selection & assignment rules 538 may be used to rename, reorder, or discard sections contained in a source audio publication 532. Additionally, static selection & assignment rules 538 may be used to select one or more audio content items from source audio publications 532 according to time-based selection criteria (e.g., audio content items that were created within the past week). Static selection & assignment rules 538 may further be used to combine audio content items from a plurality of source audio publications 532 into a single custom section within custom audio publication 564. Static selection & assignment module 548 generates a set of assignment details 550 that are received by custom audio publication assembly module 562. Assignment details 550 include the audio content item sectional assignments generated according to rules 538 for audio publications 532.

Custom audio publication creation module 530 also enables audio content items to be selected dynamically according to subscriber-defined keyword search-based rules. For example, keyword search-based selection module 552 enables audio content items contained in one or more source audio publications 532 to be selected according to a provided keyword search expression. Rule selector 540 selects keyword search-based assignment rules 542 from customization template 534, if such rules are present. One or more keyword search-based rules 542, each including a keyword search expression and a corresponding custom section, may be defined in custom audio publication template 534. Keyword search-based selection module 552 receives keyword search-based assignment rules 542 and source audio publications 532, and selects matching audio content items as described below.

Figure 5C:
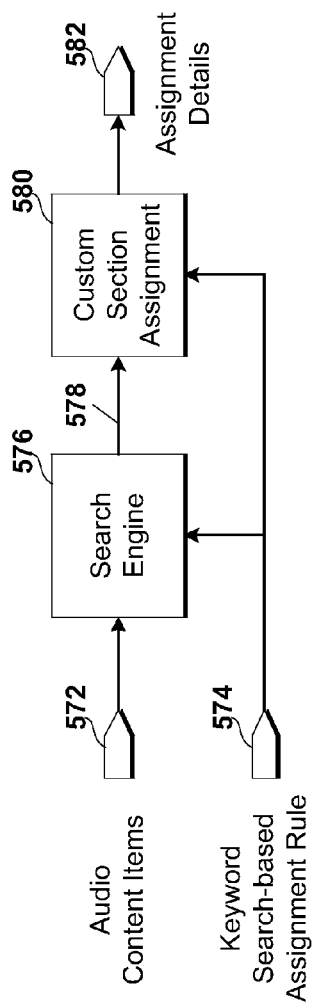
FIG. 5C shows a block diagram depicting a keyword search-based audio content item selection module, according to an example embodiment.

FIG. 5C shows a block diagram of a system 570, according to an example embodiment. System 570 is an example of keyword-search based selection module 552. System 570 includes a search engine 576 and a custom section assignment module 580. Audio content items 572 and a keyword search-based assignment rule 574 are received by system 570. Keyword search-based assignment rule 574 includes a keyword search expression and a custom section to which matching audio content items 578 are added. Search engine 576 selects audio content items 572 that match the keyword search expression provided in keyword search-based assignment rule 574. Matching audio content items 578 are output by search engine 576 and received by custom section assignment module 580. Custom section assignment module 580 generates assignment details 582 which map matching audio content items 578 to the custom section defined in keyword search expression assignment rule 574. Referring to FIG. 5B, assignment details 582 of FIG. 5C are received by custom audio publication assembly module 562 as assignment details 554.

Referring to FIG. 5B, custom audio publication creation module 530 enables audio content items contained in source audio publications 532 to be selected based on content relevance. As described in section D.2, presentation system 136 enables subscribers to "track" audio content items of interest. Audio content item tracking enables subscribers to follow developments in selected audio content item content over a given period of time (e.g., a day, a week, etc.). Rule selector 544 selects previously "tracked" audio content items 546 from audio content item database 560 according to information contained in custom audio publication template 534. Source audio publications 532 and one or more previously "tracked" audio content items 546 are received by relevance-based selection module 556. Relevance-based selection module 556 selects new audio content items from source audio publications 532 based on relevance to previously "tracked" audio content items 546 as described below.

Figure 5D:
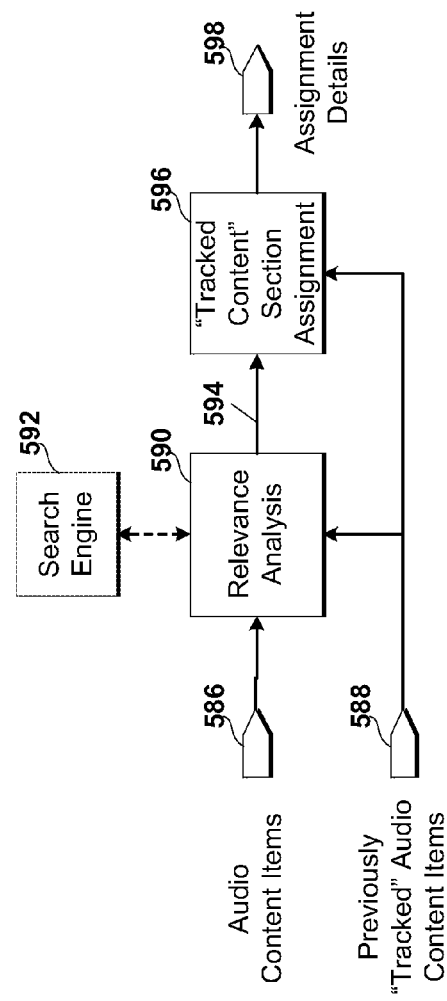
FIG. 5D shows a block diagram depicting a relevance-based audio content item selection module, according to an example embodiment.

FIG. 5D shows a block diagram of a system 584, according to an example embodiment. System 584 is an example of relevance-based search module 556 of FIG. 5C. System 584 includes a relevance analysis module 590, an optional search engine 592, and a "Tracked Content" section assignment module 596. New audio content items 586 and previously "tracked" audio content items 588 are received by relevance analysis module 590. Relevance analysis module 590 analyzes audio content items 586 for relevance to previously "tracked" audio content items 588, possibly by using a relevance search engine 592. Optionally, relevance analysis, module 590 may be assisted by additional information. For example, a publisher may incorporate references in an audio content item's metadata to one or more related audio content items. Audio content items 586 scoring a high relevance match to one or more previously "tracked" audio content items 588 are output by relevance-based selection module 590 as relevant audio content items 594. "Tracked Content" section assignment module 596 receives relevant audio content items 594 and generates assignment details 598 which map the relevant audio content items 594 to the "Tracked Content" custom audio publication section. Referring to FIG. 5B, assignment details 598 are received by custom audio publication assembly module 562 as assignment details 558.

As shown in FIG. 5B, assignment details 550, 554, and 558, custom audio publication template 534, and source audio publications 532 are received by custom audio publication assembly module 562, and custom audio publication assembly module 562 generates custom audio publication 564. Assignment details 550, 554, and 558 map one or more selected audio content items contained in source audio publications 532 to one or more custom sections within custom audio publication 564. Custom audio publication assembly module 562 assembles custom audio publication 564 by including referenced audio content items (and visual content items) from source audio publications 532 in one or more custom audio publication sections, as defined by assignment details 550, 554, and 558. Additionally, custom audio publication template 534 is used to provide a subscriber's desired ordering of custom sections within custom audio publication 564.

B.3. Example Advertisement Selection & Scheduling Embodiments

Referring to FIG. 1, advertisement selection & scheduling module 114 may be included in interactive audio publication system 100 to select and schedule audio and visual advertisements for playback and/or display during presentation of an audio publication. Additionally, module 114 enables targeted advertisement selection by providing access to subscriber data such as audio content item presentation history, advertisement presentation history, custom audio publication templates, tracked audio content items, etc.

Within interactive audio publication system 100, a subscriber's audio content item and advertisement presentation history, including audio content items previously "tagged" or "tracked" by the subscriber, and advertisements previously "tagged" by the subscriber (see section D.2) is collected and retained in subscriber database 122. By reviewing a subscriber's audio content item and advertisement presentation history, a publisher or other advertisement selection entity may select targeted advertisements for presentation. Additionally, an analysis of a subscriber's audio content item and advertisement presentation history may be performed to select diverse and non-repetitive advertisements. Furthermore, a subscriber's advertisement presentation history serves as a useful reporting tool, enabling publishers and advertisers to determine the exact number of subscribers to whom an advertisement was presented and to gauge the overall effectiveness of an advertisement.

Figure 6A:
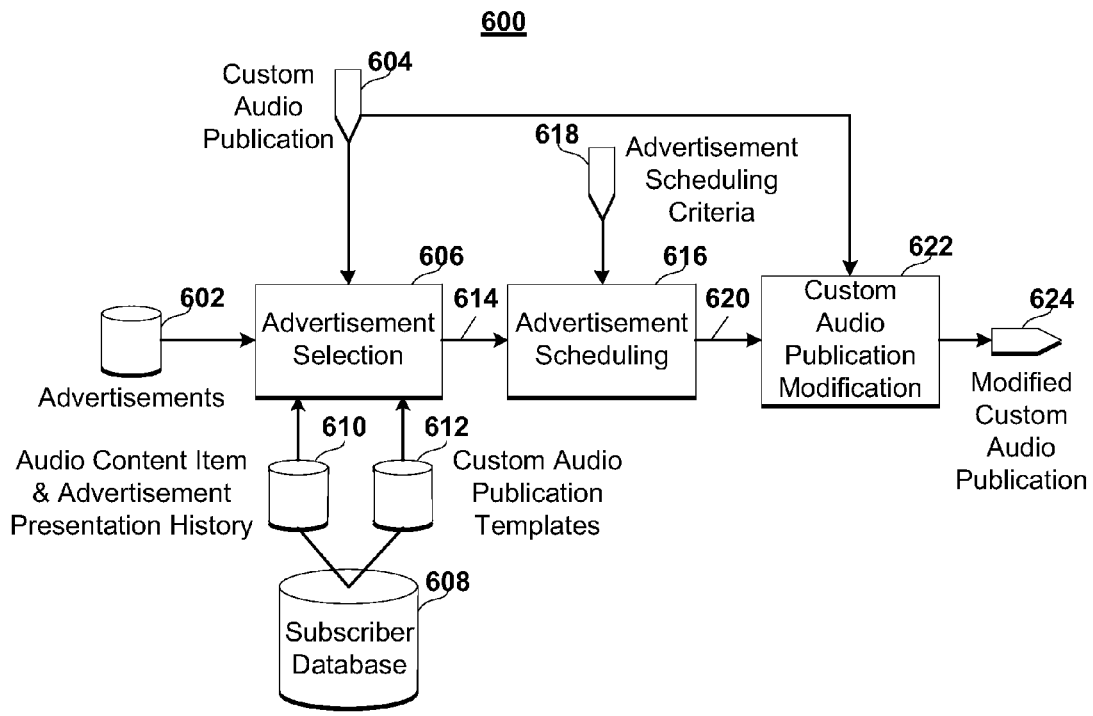
FIG. 6A shows a block diagram that depicts a system for advertisement selection and scheduling in which advertisements are selected and scheduled prior to audio publication delivery and presentation, according to an example embodiment.
Figure 6B:
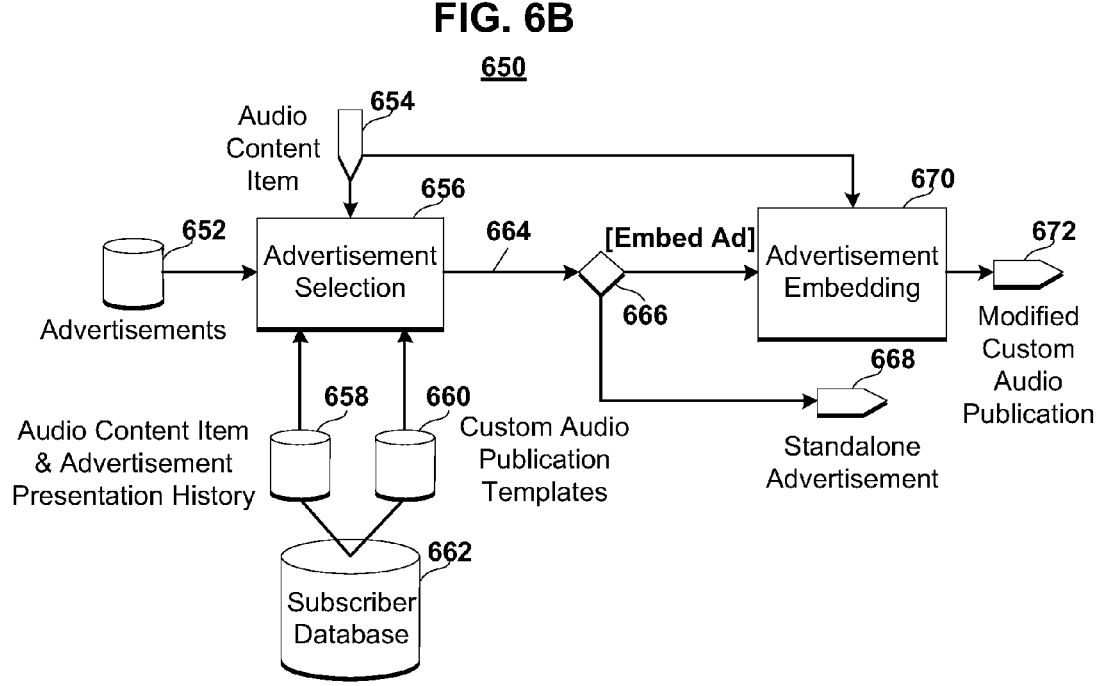
FIG. 6B shows a block diagram that depicts a system for advertisement selection and scheduling in which advertisements are selected and scheduled as audio content items are streamed on-demand, according to an example embodiment.

FIGS. 6A and 6B depict example system embodiments of advertisement selection & scheduling module 114. For instance, FIG. 6A depicts a system 600 that is configured to select and schedule advertisements after one or more custom audio publications have been generated by audio publication customization module 112. FIG. 6B depicts a system 650 configured to perform advertisement selection and scheduling automatically as audio content items are streamed to presentation system 136 on-demand.

Referring to FIG. 6A, system 600 includes an advertisement selection module 606, an advertisement scheduling module 616, and a custom audio publication modification module 622. These elements of system 600 are described as follows.

Referring to FIG. 6A, audio and/or visual advertisements 602 (e.g., contained in a database) are received by advertisement selection module 606. Advertisement selection module 606 may be configured to select advertisements 602 that are targeted to a subscriber's interests, for example. For instance, advertisement selection module 606 may be enabled to perform targeted advertisement selection by analyzing a newly-generated custom audio publication 604 or by utilizing various subscriber-centric data stored in subscriber database 608 (e.g., subscriber database 122 of FIG. 1). Additionally, a subscriber's audio content item and advertisement presentation history 610, which may indicate previously "tracked" audio content items and previously "tagged" audio content items and advertisements, may be utilized by advertisement selection module 606 during advertisement selection. Still further, one or more of a subscriber's custom audio publication templates 612 (which may indicate the subscriber's interests, etc.) may be used by advertisement selection module 606 to assist in advertisement selection. Advertisement selection module 606 outputs a set of selected advertisements 614.

Advertisement scheduling module 616 receives and schedules selected advertisements 614 according to advertisement scheduling criteria 618. Advertisement scheduling criteria 618 may indicate various advertising scheduling factors, including a scheduling order, a scheduling timing, etc. For example, according to criteria 618, selected advertisements 614 may be ordered sequentially (e.g., according to the price paid for the advertisement by an advertiser), scheduled for presentation during playback of a specific audio content item or section, or scheduled using more general criteria (e.g., after a set number of minutes, after a set number of presented audio content items, etc.). Selected advertisements 614 may be scheduled for presentation at the beginning or end of any audio content item segment (i.e., the title, summary, or story body). Advertisement scheduling module 616 generates advertisement scheduling details 620 for selected advertisements 614, which includes the set of selected advertisements 614 and advertisement scheduling information. Custom audio publication modification module 622 receives advertisement scheduling details 620 and custom audio publication 604. Custom audio publication modification module 622 generates modified custom audio publication 624 as a modified form of custom audio publication 604 that includes advertisements. Custom audio publication modification module 622 inserts advertisement scheduling details 620 in the custom audio publication metadata of custom audio publication 604, and includes any referenced advertisements 614 to generate modified custom audio publication 624.

Referring to FIG. 6B, system 650 is configured to select advertisements on-demand as audio content items 654 are delivered to a subscriber for presentation. System 650 includes an advertisement selection module 656 and an advertisement embedding module 670. These elements of system 650 are described as follows.

When a subscriber selects an audio content item 654, advertisement selection module 656 may select an advertisement for presentation from a plurality of available advertisements 652 (e.g., contained in a database). As shown in FIG. 6B, advertisement selection module 656 receives audio content item 654, advertisements 652, advertisement presentation history 658, and custom audio publication templates 660. In addition to the requested audio content item 654, a subscriber's audio content item and advertisement presentation history 658 as well as any available custom audio publication templates 660 may be used by advertisement selection module 656 for targeted advertisement selection as described previously. As shown in FIG. 6B, advertisement embedding module 670 receives selected advertisement 664 and audio content item 654. If advertisement selection module 656 selects an advertisement for presentation, indicated by selected advertisement scheduling details 664 in FIG. 6B, the selected advertisement may be embedded within audio content item 654 by advertisement embedding module 670, or alternatively output as a standalone advertisement 668. If the selected advertisement (indicated by advertisement scheduling details 664) is embedded within audio content item 654, advertisement embedding module 670 modifies/updates the metadata of audio content item 654 using advertisement scheduling details 664 (e.g., to indicate the length of the advertisement, when the advertisement is to be presented, etc.). Advertisement embedding module 670 generates modified audio content item 672, which contains the selected advertisement and advertisement scheduling details 664.

B.4. Example Audio Publication Distribution Embodiments

Figure 7A:
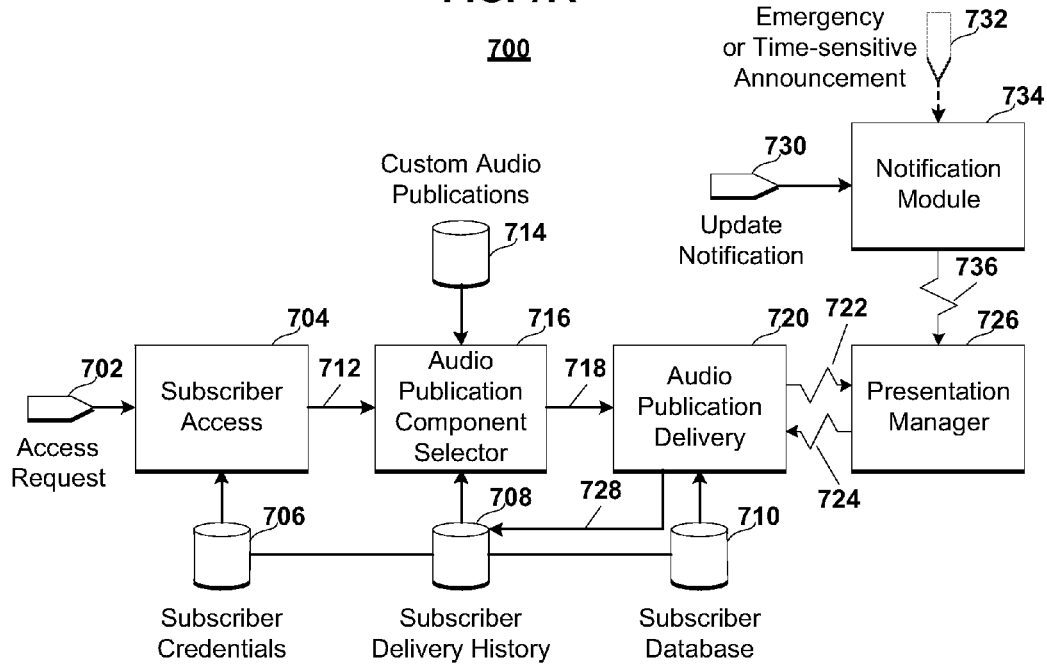
FIG. 7A shows a block diagram depicting an audio publication distribution module, according to an example embodiment.

Referring to FIG. 1, in addition to performing audio publication customization and advertisement selection and scheduling, customization & distribution system 110 also manages the distribution of custom audio publications 120 to subscribers via audio publication distribution module 116. FIG. 7A shows a block diagram of a system 700, which is an example embodiment of audio publication distribution module 116. As shown in FIG. 7A, system 700 includes a subscriber access module 704, an audio publication component selector 716, an audio publication delivery module 720, a notification module 734, and a presentation manager 726. These elements of FIG. 7A are described as follows.

Referring to FIG. 7A, one or more custom audio publications 714 are transferred to a subscriber's presentation system via a data communications network, such as the Internet. Any standard or proprietary data communication protocol (e.g., FTP, HTTP, RSS/Atom, etc.), wired or wireless, may be used to transfer audio publication components (i.e., audio publication metadata, audio content items, visual content items, speech prompts, and advertisements) included in custom audio publications 714 to a subscriber's presentation system. If a subscriber's presentation system supports wireless networking, selected audio publication components may be delivered to a subscriber using a wireless data communications network.

The transfer of custom audio publications 714 may be initiated manually by a subscriber or automatically by presentation manager 726 (e.g., according to a schedule). In either case, access to distribution module 116 is managed by subscriber access module 704, which verifies a subscriber's credentials 706 stored in subscriber database 710 (e.g., subscriber database 122 of FIG. 1), after an access request 702 is received by subscriber access module 704. For instance, access request 702 may be received from presentation manager 726, and may indicate desired audio publications and/or audio publication components, a delivery type, and/or further information. Optionally, notification module 734 may send a notification 736 to a subscriber or to presentation manager 726 when new and/or updated audio publications 714 are available. For example, notification module 734 may receive an update notification 730 from audio publication customization module 500, shown in FIG. 5A, when new and/or updated audio publications 714 are available. Additionally, notification module 734 enables an emergency or other time-sensitive announcement 732 (contained in a special audio publication) to be pushed to a subscriber for immediate presentation.

Audio publications 714 may be downloaded by presentation manager 726 in their entirety for offline presentation, or alternatively streamed to presentation manager 726 via a data communications network for presentation on-demand. For on-demand delivery, an audio publication's metadata is initially transferred to a subscriber's presentation manager 726; other audio publication components are streamed to the subscriber on-demand as the audio publication is presented.

Following a successful login by presentation manager 726 to system 700 via subscriber access module 704, subscriber access module 704 generates a delivery request 712, which includes a requested delivery type—"complete" or "on-demand"—and optionally, a set of requested audio publication components. As shown in FIG. 7A, audio publication component selector 716 receives delivery request 712 and custom audio publications 714. If a complete delivery is requested, audio publication component selector module 716 retrieves a subscriber's delivery history 708 and selects a set of audio publication components to transfer from available audio publications 714. In an embodiment, audio publication components not previously delivered to presentation manager 726 are selected by audio publication component selector 716 for delivery. Alternatively, if delivery request 712 is on-demand, the specific audio publication component(s) requested in delivery request 712 are selected by module 716 for delivery to presentation manager 726. As shown in FIG. 7A, module 716 outputs selected audio publication components 718.

Selected audio publication components 718 are received by audio publication delivery module 720. Audio publication delivery module 720 processes and transmits selected audio publication components 718 (e.g., as described with regard to FIG. 7B) to presentation manager 726 (e.g., over a communications network) as transmitted audio publication components 722. Presentation manager 726 is an example of presentation manager 138 of FIG. 1. Presentation manager 726 receives transmitted audio publication components 722 and processes them accordingly (see section D.8). In addition, presentation manager 726 transmits a runtime state 724 to audio publication delivery module 720, which processes runtime state 724 as described below. Following a successful delivery of selected audio publication components 718 to presentation manager 726, audio publication delivery module 720 generates delivery details 728 and updates the subscriber's audio publication component delivery history 708 with delivery details 728.

Figure 7B:
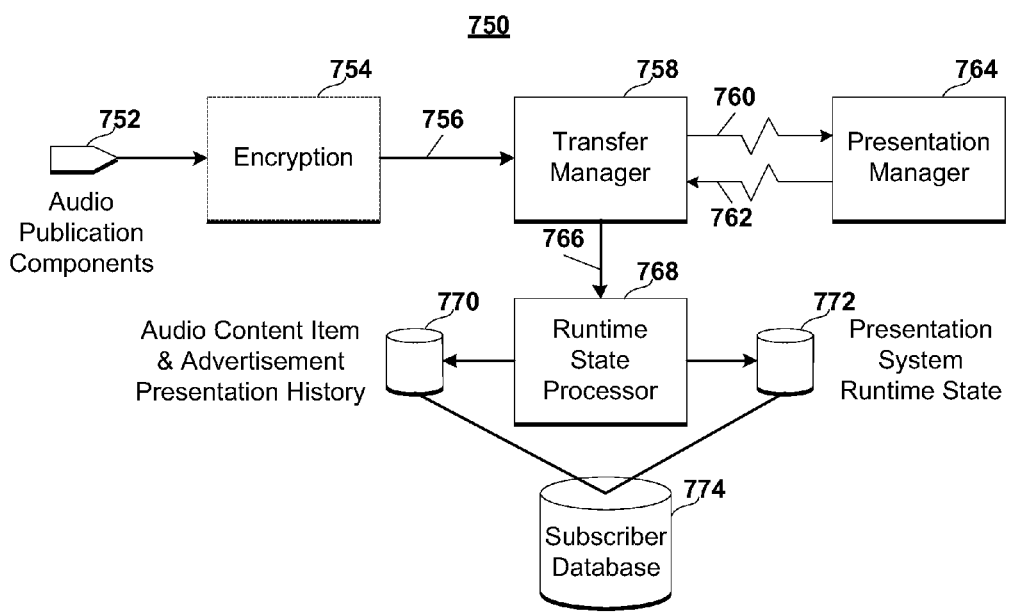
FIG. 7B shows a block diagram depicting an audio publication delivery module, according to an example embodiment.

FIG. 7B shows a block diagram of a system 750, according to an example embodiment. System 750 is an example of audio publication delivery module 720 of FIG. 7A. Referring to FIG. 7B, system 750 includes an encryption module 754, a transfer manager 758, a runtime state processor 768, and a presentation manager 764. These elements of system 750 are described as follows.

Audio publication components 752 (e.g., selected audio publication components 718 of FIG. 7A) to be delivered to a subscriber are received by system 750. In an embodiment, a subset or all of audio publication components 752 may be received and encrypted by encryption module 754 (e.g., using public/private key encryption). Encryption module 754 generates encrypted audio publication components 756, which are received by transfer manager 758. Transfer manager 758 transmits encrypted audio components 760 to connected presentation manager 764 (e.g., presentation manager 726 of FIG. 7A) over a data communications network (see section D.8). In addition, presentation manager 764 transmits runtime state 762 to transfer manager 758 (see section D.2). Received runtime state 762 is transmitted to runtime state processor 768 as runtime state 766, and runtime state processor 768 updates the subscriber's audio content item and advertisement presentation history 770 (e.g., contained in subscriber database 774), to include all audio content items marked "tracked," and all audio content items and advertisements marked "tagged." Additionally, received runtime state 766 may be stored in presentation system runtime state database 772 (e.g., contained in subscriber database 774).

C. Example Subscriber Portal Embodiments

Referring to FIG. 1, subscriber portal 124 enables subscribers to manage their subscription account, to configure custom audio publication templates, and to configure presentation system runtime preferences. subscriber portal 124 includes a subscriber enrollment module 126, a subscriber account management module 128, a custom audio publication configuration module 130, a presentation system preferences configuration module 132, and an optional presentation system 134. As shown in FIG. 1, subscriber portal 124 is coupled to custom audio publications database 120 and subscriber database 122.

Figure 8:
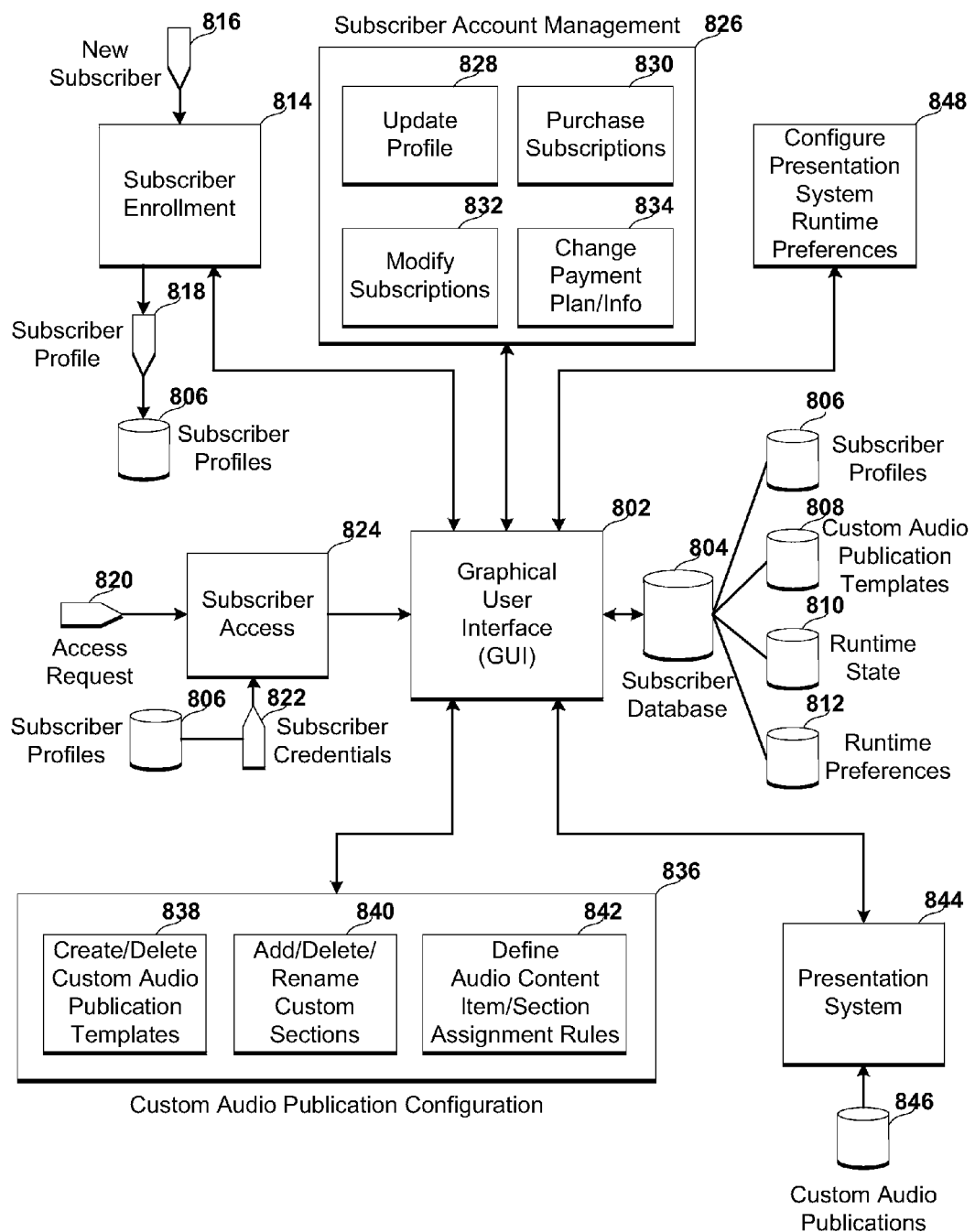
FIG. 8 shows a block diagram depicting a subscriber portal, according to an example embodiment.

FIG. 8 shows a block diagram of a system 800, according to an example embodiment. System 800 is an example of subscriber portal 124 of FIG. 1. System 800 may be configured in several ways, and multiple embodiments of system 800 may coexist within interactive audio publication system 100. For instance, system 800 is shown in FIG. 8 as a graphical user interface (GUI). In one embodiment, system 800 may be implemented as an Internet Web site that may be accessed using a Web browser. Such a Web-based embodiment may optionally include a presentation system 844 to enable audio publication presentation via the Web. In another embodiment, system 800 may be implemented within presentation system 136 and accessed at runtime via presentation device 140. As shown in FIG. 8, system 800 includes a GUI 802, a subscriber access module 824, a subscriber enrollment module 814, a subscriber account management module 826, a custom audio publication configuration module 836, a presentation system runtime preferences configuration module 848, and an optional presentation system 844.

Referring to FIG. 8, GUI 802 provides a visual interface to system 800, which may include a plurality of menus, controls, and/or views backed by data contained in subscriber database 804 (e.g., subscriber database 122). Subscribers interact with GUI 802 to generate and modify data stored in subscriber database 804, which may include subscriber profiles 806, custom audio publication templates 808, presentation system runtime state data 810, and presentation system runtime preferences 812, for example.

New subscriber enrollment is handled by subscriber enrollment module 814. A new subscriber 816 may interact with GUI 802 and/or subscriber enrollment module 814 to generate a subscriber profile 818, which may be stored in subscriber profiles database 806. Subscriber profile 818 may include a unique username and password used to identify and authenticate new subscriber 816 during subsequent access requests to system 800. Subscriber profile 818 may additionally contain a subscriber's audio publication subscription information, payment information, email address, home address, phone number, age, gender, and/or other pertinent information.

A registered subscriber may gain access to system 800 by issuing an access request 820 received by subscriber access module 824, and supplying valid access credentials to subscriber access module 824. Subscriber access module 824 validates the provided access credentials by comparing them to subscriber access credentials 822 stored in subscriber profiles database 806. Following a successful validation of supplied access credentials, GUI 802 may render and present one or more textual and/or graphical components, enabling the subscriber to perform a plurality of tasks. Examples of such tasks are described in turn below.

As shown in FIG. 8, GUI 802 is coupled to each of subscriber enrollment module 814, subscriber access module 824, subscriber account management module 826, custom audio publication configuration module 836, presentation system 844, and presentation system runtime preferences configuration module 848. In an embodiment, via GUI 802, subscriber account management module 826 may enable current subscribers to manage their subscription account. As shown in FIG. 8, subscriber account management module 826 may include an update profile module 828, a purchase subscriptions module 830, a modify subscriptions module 832, and a change payment plan/information module 834. For example, subscribers may update their current profile using profile update module 828, may purchase subscriptions to audio publications using purchase subscriptions module 830, may modify their current audio publication subscriptions using modify subscriptions module 832, and/or may change payment plan/information using change payment plan/information module 834.

In an embodiment, via GUI 802, custom audio publication configuration module 836 provides a set of graphical views and controls enabling subscribers to generate and modify one or more custom audio publication templates 808. As shown in FIG. 8, custom audio publication configuration module 836 may include a create/delete custom audio publication templates module 838, an add/delete/rename custom sections module 840, and a define audio content item/section assignment rules module 842. For instance, subscribers may be enabled to generate or delete custom audio publication templates 808 using create/delete custom audio publication templates module 838; add, delete, or rename custom sections within a selected custom audio publication template 808 using add/delete/rename custom sections module 840; and/or define audio content item assignment rules for each custom section using define audio content item/section assignment rules module 842, possibly by using graphical "drag-and-drop" operations or other techniques to map selected audio content items to one or more custom sections (see section B.2). One or more updated custom audio publication templates 808 are stored in subscriber database 804.

In an embodiment, system 800 may include an integrated presentation system 844. For example, a Web-based embodiment of system 800 may contain a presentation system 844 enabling audio publications to be presented via a standard Web browser, possibly with the assistance of a plug-in (e.g., an ActiveX control or a Java Applet). Within presentation system 844, custom audio publications may be accessed directly from custom audio publications database 846 (e.g., database 120 of FIG. 1). Additionally, presentation system 844 may access, update, and store its runtime state 810 in subscriber database 804. Runtime state 810 may also be enabled to be synchronized with a subscriber's other presentation system 136 during audio publication delivery (see section B.4). Optionally, a subscriber may manually initiate runtime state synchronization between presentation system 844 and one or more of a subscriber's other presentation systems 136.

In an embodiment, via GUI 802, subscribers can access presentation system runtime preferences configuration module 848 to view and configure presentation system runtime preferences 812 (see section D.4) for one or more presentation systems 136 and integrated presentation system 844. Runtime preferences 812 may be stored in subscriber database 804, enabling full restoration to a subscriber's presentation system(s) 136, if necessary.

D. Example Audio Publication Presentation System Embodiments

Referring to FIG. 1, presentation system 136 enables a presentation of interactive audio publications to a subscriber. Presentation system 136 includes a presentation manager 138, a presentation device 140, and optional third-party support modules 142. When present, third-party support modules 142 may include portable media players (PMPs) and software and/or drivers needed to interface with PMPs. Various embodiments of presentation system 136 are possible. For example, presentation device 140 may be implemented as a standalone hardware device (e.g., a laptop computer, a notebook computer, a smart phone, a handheld computer, a custom hardware device, etc.), an attachable device (e.g., a plug-in device), a software application targeted for a PMP, a smart phone, or other computing platform, or as any other suitable device mentioned elsewhere herein or otherwise known. Additionally, presentation manager 138 may be integrated with presentation device 140, or it may alternatively be deployed as a separate application, such as an application to be executed on a subscriber's personal computer. In another embodiment, presentation system 136 may be embedded in a larger system, such as an in-vehicle entertainment system, etc.

D.1. Example Presentation System Runtime Mode Embodiments

In an embodiment, a presentation system may include three runtime modes—a "title mode," a "summary mode," and a "full story mode"—that may be alternately selected by a subscriber at runtime. Both of the title and summary modes enable subscribers to peruse an interactive audio publication relatively quickly and efficiently, while the full story mode provides subscribers with an increased level of content detail.

In the title mode, only the title segment for each audio content item is presented by default. Similarly, in the summary mode, only the title and summary segments are presented by default. In the title and summary modes, in an embodiment, a subscriber has to specifically request presentation of the audio content item segment(s) that are not presented by default. Conversely, in full story mode, each audio content item is presented in its entirety, unless a subscriber specifically preempts playback of an audio content item. These modes are summarized below in Table 2.

TABLE 2

Presentation device runtime modes.

| Runtime Mode | Description |
| --- | --- |
| Title Mode | Useful for quickly browsing audio content item titles |
| | Only the audio content item title segment presented by default |
| | Subscriber must request presentation of the summary and story body segments |
| Summary Mode | Useful for browsing through audio publications |
| | Only the audio content item title and summary segments presented by default |
| | Subscriber must request presentation of the story body segment |
| Full Story Mode | Audio content items played in their entirety |
| | Subscriber must preempt playback of an audio content item |

In one embodiment, a desired summary segment length may be specified in the presentation system runtime preferences (see section D.4). For example, the desired summary segment length might be set by a certain number of introductory audio content item paragraphs.

D.2. Example Presentation System Runtime State Embodiments

During audio publication presentation, presentation system 136 maintains the complete state of each of a subscriber's audio publications, including the state of each audio content item and the state of each advertisement contained within the audio publications. The collective state that includes all audio publication states is called the presentation system runtime state.

An audio content item may be assigned to one of four states: "unhandled," "played," "skipped," and "discarded." Initially, each audio content item is in the unhandled state. An audio content item remains in the unhandled state until either its presentation completes normally (whereupon it enters the played state), or a subscriber preempts complete playback by navigating to another audio content item, section, or audio publication. If the subscriber preempts playback, but indicates a desire to resume playback at a later time, then the audio content item enters the skipped state. Otherwise, the audio content item enters the discarded state.

Additionally, an audio content item has two independent non-mutually exclusive status flags—"tracked" and "tagged"—that may be optionally set or cleared by a subscriber via presentation system 136. Setting an audio content item's tracked flag indicates that the audio content item should be considered by audio publication customization module 112 when searching for relevant content during audio publication customization (see section B.2). Audio content item tracking enables subscribers to follow developments in selected topics of interest and to discover new audio content items with relevant story content, as described further below.

Audio content item "tagging" is a mechanism for marking audio content items so that they may be "post-processed" by a subscriber (e.g., shared with other subscribers, saved permanently to their account, etc.). Subscribers can access and post-process tagged audio content items from subscriber portal 124, or possibly, directly from presentation device 140 (depending on the capabilities of the presentation device 140 embodiment). The audio content item states and status flags are summarized below in Table 3 and Table 4 respectively.

TABLE 3

Audio content item states.

| State | Description |
| --- | --- |
| Unhandled | A subscriber has not yet interacted with the audio content item |
| Played | The audio content item has been presented in its entirety |
| Skipped | The audio content item has been skipped temporarily; presentation may be resumed at a later time |
| Discarded | The audio content item has been discarded; presentation cannot be resumed at a later time |

TABLE 4

Audio content item status flags.

| Status Flag | Description |
| --- | --- |
| Tracked | The audio content item will be considered by audio publication customization module 112 when searching for relevant content |
| Tagged | The audio content item is marked for "post-processing" by a subscriber |

An advertisement may be in one of two states: "not played" and "played." Additionally, an advertisement has a "tagged" flag that may be set by a subscriber during presentation of the advertisement. Tagging an advertisement enables a subscriber to review the advertisement at a later time, possibly via presentation device 140 or subscriber portal 124. In one embodiment, tagging an advertisement may cause an email to be sent automatically to a subscriber's email address that is stored in their profile. For example, the email may contain a Web hyperlink to the advertisement, a digital media file containing the advertisement, or an alternative presentation of the advertisement including at least one of text, images, and/or audio.

A current presentation system runtime state may be transmitted to customization & distribution system 110 during audio publication distribution and may be stored in subscriber database 122. Optionally, the stored runtime state may be used to synchronize a plurality of presentation systems 136 that is tied to the same subscriber account. Runtime state synchronization enables the active presentation system to be changed (e.g., the subscriber may have more than one presentation system in their possession) during audio publication presentation and ensures that there are no discontinuities or inconsistencies when presentation is resumed on the new presentation system.

The runtime state also enables presentation system 136 to monitor a subscriber's progress through each audio publication. A subscriber can obtain real-time status reports indicating, for example, the number of unhandled or skipped audio content items in a section, the time required to present the remaining audio content items in a section (based on the current runtime mode), or the percentage of audio content items that have been handled (i.e., either played, skipped, or discarded). Reports may be delivered aurally, possibly by using a combination of prerecorded speech prompts and computerized text-to-speech, or alternatively delivered as text-based notifications.

D.3. Example Presentation System Subscriber Interface Embodiments

Subscribers may interact with presented audio publications using either a graphical user interface, a button interface (e.g., one or more buttons or a keyboard), a thumb wheel, a roller ball, a stick pointer, etc., and/or by using corresponding voice commands. The button interface may include either physical or virtual buttons. A virtual button interface may be realized, for example, by presenting button icons on a touch screen.

In an embodiment, a built-in speech recognition module enables true hands-free navigation of audio publications using an intuitive voice control interface. The voice control interface enables subscribers to interact with audio publications safely while driving, exercising, or multitasking. With speech recognition enabled, subscribers can navigate audio publications by issuing short voice commands. If desired, voice commands may be prefaced by a special trigger command (e.g., "reader" or the product's brand name) for better recognition accuracy in noisy environments.

Presentation system 136 defines several commands (shown in Table 6 further below) to facilitate interaction with audio publications. Commands may be categorized by function into four broad categories, such as "navigation," "control," "customization," and "help." Subscribers may navigate though audio publications and audio content items using navigation commands, manage audio content item presentation with control commands, customize audio publications and runtime preferences with customization commands, and obtain help using help commands.

Commands may be received from a subscriber at any point while presentation system 136 is active. Not all commands must be active at all times; disabled commands may be ignored by presentation system 136. Alternatively, a short message may be played indicating the reason why a command could not be completed. For example, to ensure uninterrupted presentation of an advertisement, a majority of commands may be disabled while an advertisement is presented.

D.4. Example Presentation System Runtime Preferences Embodiments

Presentation system 136 provides several runtime preferences for customizing audio publication presentation. Examples of runtime preferences are shown below in Table 5.

TABLE 5

Exemplary presentation system runtime preferences.

(1) Default runtime mode (title, summary, or full story mode)
(2) Desired summary length (e.g., as a number of introductory paragraphs)
(3) Enable/disable helpful speech prompts
(4) Enable/disable greeting Separate runtime preferences for a plurality of subscribers may be stored on presentation device 140, enabling a plurality of subscribers to share a presentation device. Preferences may be set via presentation device 140 (using the button interface, voice control interface, or other interface) or subscriber portal 124. If the voice control interface is used, the preferences may be set interactively via a sequence of guided speech prompts.

Presentation system 136 may also feature helpful speech prompts that may be selectively enabled or disabled in the runtime preferences. If enabled, various speech prompts may be played at key interaction points to assist subscribers as they become familiar with the presentation system command set and user interface. Additionally, an optional greeting may be selectively enabled or disabled in the runtime preferences, so that the greeting is played (or not played) when presentation device 140 is powered-on. An example greeting might greet a subscriber by name and announce the current date and time.

D.5. Example Audio Content Item Searching Embodiments

Presentation system 136 may be configured to enable subscribers to search for audio content items that satisfy a particular keyword search expression. Depending on the particular presentation system embodiment and whether a network connection is available, the search may be performed either locally or remotely, possibly by using search engine 576 (FIG. 5C) provided by customization & distribution system 110. The search scope may be restricted to the set of audio content items currently present on presentation system 136 or broadened to include a full set of audio content items accessible by a subscriber (e.g., according to their subscription). Alternatively, the search scope may be maximized to include all available audio content items, although access to one or more of the matching audio content items may require a subscription upgrade.

A keyword search expression may be dictated (e.g., by voice) or typed (e.g., by keyboard) if the presentation system embodiment provides a text entry interface. If the keyword search expression is dictated, speech recognition may either be performed locally on presentation device 140 by a speech recognition module (e.g., as described below with respect to FIG. 10), or remotely by a separate speech recognition system. In the latter case, recorded audio comprising the keyword search expression may be transmitted directly to a remote speech recognition system, or alternatively preprocessed by presentation device 140 prior to transmission (e.g., to decrease the amount of data transmitted to the speech recognition system).

D.6. Example Visual Content Item Presentation

As discussed in section A.1, one or more visual content items may be scheduled for display during presentation of an audio content item. If presentation device 140 provides a visual display interface, visual content items may be presented according to scheduling details contained in an associated audio content item's metadata. In addition, a subscriber may alternately switch between an automatic presentation of visual content items and a manual browsing mode, in which the subscriber may freely browse available visual content items using voice commands or the button interface provided by presentation device 140.

D.7. Example Audio Publication Built-in Sections

As described elsewhere herein, audio publications may include one or more sections, such that each section contains at least one audio content item. In an embodiment, interactive audio publication system 100 may provide three additional sections within each custom audio publication: "Tracked Content," "Skipped Content," and "Search Results."

The "Tracked Content" section is compiled automatically during audio publication customization as new audio content items are analyzed for relevance with previously "tracked"

audio content items (see section B.2). New audio content items scoring a high relevance match with one or more previously "tracked" audio content items are added automatically to the "Tracked Content" section, enabling subscribers to follow developments in selected topics of interest.

The "Skipped Content" section maintains a list of all audio content items that have been skipped temporarily during presentation of an audio publication. A subscriber may navigate to the "Skipped Content" section to access and replay any previously skipped audio content items.

The "Search Results" section is populated with the results from the most recent audio content item search (see section D.5) performed by a subscriber. The audio content items added to the "Search Results" section may be limited to those that are available for immediate presentation (e.g., based on the subscriber's subscriptions).

D.8. Example Presentation Manager Embodiments

Figure 9:
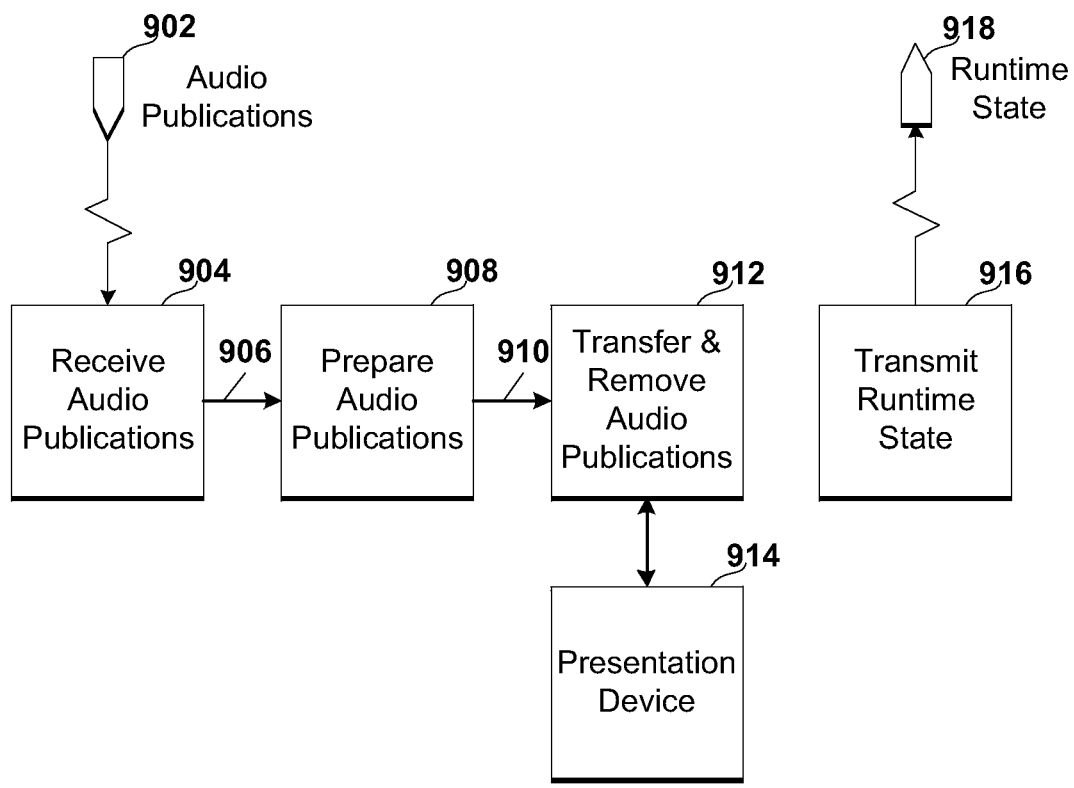
FIG. 9 shows a block diagram of a presentation manager, according to an example embodiment.

As shown in FIG. 1, presentation manager 138 interfaces with presentation device 140 and audio publication distribution module 116. FIG. 9 shows a block diagram of a system 900, according to an example embodiment. System 900 is an example of presentation manager 138 of FIG. 1. As shown in FIG. 9, system 900 includes a receive audio publications module 904, a prepare audio publications module 908, a transfer and remove audio publications module 912, and a transmit runtime state module 916. As shown in FIG. 9, a presentation device 914 (e.g., presentation device 140 of FIG. 1) is coupled to transfer and remove audio publications module 912.

Referring to FIG. 9, presentation manager 900 may be configured to access audio publication distribution module 116 of FIG. 1 in any manner, including automatically according to a daily schedule, or in response to a notification from audio publication distribution module 116 indicating that one or more new and/or updated audio publications are available for download. Alternatively, a subscriber may manually initiate audio publication delivery. As described in section B.4, audio publication components (i.e., audio publication metadata, audio content items, visual content items, speech prompts, and advertisements) may be downloaded by presentation manager 900 either in bulk, or alternatively streamed on-demand as they are needed for presentation.

Following a successful login to audio publication distribution module 116 by presentation manager 900, receive audio publications module 904 issues a request for either an entire interactive audio publication (complete download) or alternatively, for one or more audio publication components needed for imminent presentation (e.g., for on-demand delivery). At the same time, presentation system runtime state 918 may be transmitted by transmit runtime state module 916 to distribution module 116. As discussed in section D.2, presentation system runtime state 918 collectively includes the state of each of a subscriber's audio publications and enables the active presentation system to be changed during audio publication presentation. Additionally, runtime state 918 may be used to update a subscriber's audio content item and advertisement presentation history, and may be utilized for targeted advertising as described in section B.3.

New and/or updated audio publications 902 (or individual audio publication components) are received by module 904. Received audio publications 906 (or audio publication components) are prepared for presentation on presentation device 914 by module 908. Module 908 may be configured to support audio publication presentation on any number of implementations of presentation device 914. For example, a plug-in presentation device implementation may depend on a connected PMP for audio playback and visual display functionalities. In addition, the PMP may prevent access to its file system, thereby disallowing presentation device 914 from reading audio content item metadata and audio publication metadata directly from disk. To bypass this limitation, module 908 may split each audio content item into separate audio content item fragments, as described herein. Additionally, at least a portion of the information contained in the audio content item and audio publication metadata may be retained by employing a file naming convention that encodes portions of the metadata in the audio content item fragment filenames, and by utilizing separate audio file playlists corresponding to the individual audio publication sections. Such preprocessing may enable presentation device 914 to recreate the audio content item and audio publication metadata by parsing the playlists and the audio content item fragment filenames.

In another possible embodiment of presentation manager 900, audio publications may be adapted for playback on standard PMPs (i.e., without presentation device 914). In such an embodiment, audio content item audio data may be packaged into separate audio files. Using audio publication metadata, module 908 may organize the audio files into separate playlists corresponding to the individual audio publication sections. Additionally, advertisements may be inserted into a subset of the audio files according to advertisement scheduling details contained in the audio publication metadata. Furthermore, visual content items may be embedded in the album artwork ID3 tag (or equivalent tag) of associated audio files for display during playback.

Prepared audio publications 910 (or audio publication components) are transferred by module 912 to presentation device 914. In addition, old audio publications may be removed automatically from presentation device 914 by module 912 according to a subscriber's presentation system runtime preferences or if presentation device 914 has limited storage capacity. Various techniques for transferring audio publication components to/from presentation device 914 may be used by module 912. In one embodiment, audio publication components may be stored in a database that is shared between presentation manager 900 and presentation device 914. Alternatively, for PMP-based embodiments, PMP management software (or another third-party module 142) may be used to transfer prepared audio publications 910 and remove old audio publications to/from presentation device 914.

D.9. Example Presentation Device Embodiments

Referring to FIG. 1, presentation device 140 provides a core user interaction experience with interactive audio publications. Presentation device 140 receives audio publications from presentation manager 138 and presents them to a subscriber interactively. For example, a subscriber may be enabled to listen to one or more audio publications using presentation device 140. Presentation device 140 may include or be coupled to one or more speakers to enable the subscriber to hear the audio publication. For instance, headphones may be coupled to presentation device 140 to enable the subscriber to listen to the audio publication, including listening to the audio publication in situations where the subscriber desires to be more discreet (e.g., when listening to the audio publication at work or in another public place, such as a store, a restaurant, an airplane, or while using public transportation, etc.). If an audio publication includes video, the subscriber may be enabled by presentation device 140 to view the video (e.g., on a display of presentation device 140). If the audio publication includes advertisements, presentation device 140 may enable the advertisements to be played (for an audio advertisement) and/or displayed (for a video advertisement) to the subscriber. One or more audio publications may be stored on presentation device 140 at any time, and the active audio publication may be changed as desired by the subscriber at runtime.

Figure 10:
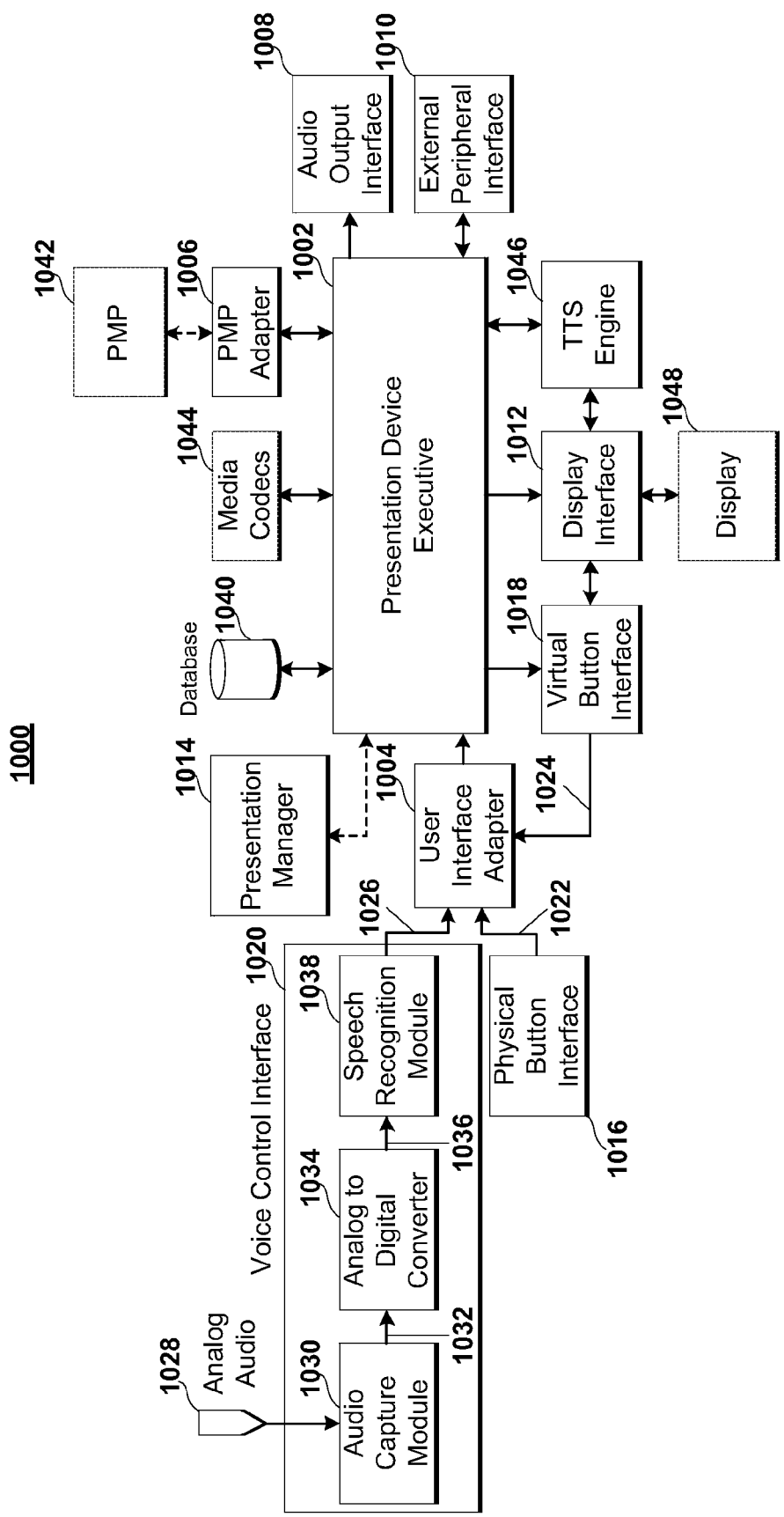
FIG. 10 shows a block diagram of a presentation device, according to an example embodiment.

FIG. 10 shows a block diagram of a system 1000, according to an example embodiment. System 1000 is an example of presentation device 140 of FIG. 1. System 1000 includes a plurality of modules that may be implemented using hardware, software, or a combination of hardware, software, and/or firmware. As shown in FIG. 10, system 1000 includes a presentation device executive logic 1002, a user interface adapter 1004, a PMP adapter 1006, an audio output interface 1008, an external peripheral interface 1010, a display interface 1012, a physical button interface 1016, a virtual button interface 1018, a voice control interface 1020, a database 1040, an optional PMP 1042, optional media codecs 1044, a TTS (text-to-speech) engine 1046, and an optional display 1048. Voice control interface 1020 includes an audio capture module 1030, an analog to digital converter 1034, and a speech recognition module 1038. These elements of system 1000 are described as follows.

Referring to FIG. 10, in an embodiment, presentation device executive logic 1002 is logic (e.g., an application, one or more processors and/or circuits, etc.) that manages a plurality of connected components. Presentation device executive logic 1002 provides a core application logic and control and uses "interface/adapter" modules 1004, 1006, 1008, 1010, and 1012 to interface with supporting modules, thereby facilitating alternative presentation device embodiments.

Presentation device 1000 uses presentation manager 1014 (see section D.8) to handle all aspects of audio publication preparation, transfer, and removal to/from presentation device 1000. Depending on a particular presentation system embodiment, presentation device executive logic 1002 may interface either directly or indirectly with presentation manager 1014. In an indirect interface configuration, one or more third-party support modules 142 (FIG. 1) (e.g., a PMP, PMP management software, etc.) may provide a bridge between presentation device executive logic 1002 and presentation manager 1014.

Subscribers may interact with presentation device 1000 via a button interface (optionally a physical button interface 1016 or a virtual button interface 1018) and/or a voice control interface 1020. Any of the available interfaces may be used to enter commands to presentation device 1000, and commands may be received from a subscriber at any time. A subscriber command 1022, 1024, or 1026 that is entered using physical button interface 1016, virtual button interface 1018, or voice control interface 1020 respectively, is received by presentation device executive logic 1002 via user interface adapter 1004. User interface adapter 1004 enables presentation device executive logic 1002 to execute independently of the actual control interface utilized by a subscriber.

Voice control interface 1020 may be selectively enabled or disabled as necessary. If voice control interface 1020 is enabled, voice commands (examples are included in Table 6 further below) may be used to control presentation device executive logic 1002. Analog audio 1028 is captured by audio capture module 1030 using a microphone or a microphone array. Audio capture module 1030 generates captured audio signal 1032. Captured audio signal 1032 is converted to digital audio samples 1036 by analog to digital converter 1034. Generated digital audio samples 1036 are received by speech recognition module 1038, which is described below.

Figure 11:
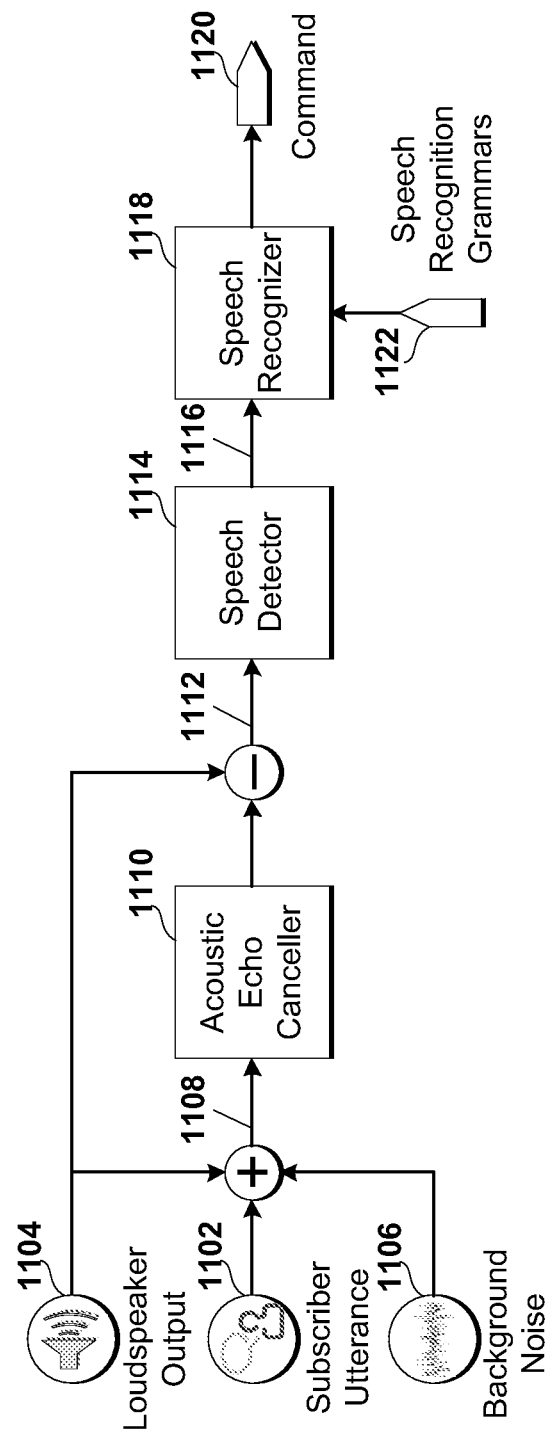
FIG. 11 shows a block diagram depicting a presentation device speech recognition module, according to an example embodiment.

FIG. 11 shows a block diagram of a system 1100, according to an example embodiment. System 1100 is an example of speech recognition module 1038 of FIG. 10. System 1100 includes an acoustic echo canceller 1110, a speech detector 1114, and a speech recognizer 1118. These elements of system 1100 are described as follows. An input audio signal 1108 may contain one or more of the following audio components: a subscriber utterance (i.e., a possible voice command) 1102, loudspeaker output 1104 as an audio content item is played, and background noise 1106. Acoustic echo canceller 1110 receives input audio signal 1108, removes loudspeaker output 1104 from input audio signal 1108, and outputs echo-suppressed audio signal 1112. Speech detector 1114 receives echo-suppressed audio signal 1112 and discriminates between speech and background noise 1106, enabling only speech signals to pass through. In one embodiment, speech detector 1114 is an algorithm (e.g., an application) that performs speech detection automatically. Alternatively, speech detector 1114 may be a push-to-talk button, enabling speech detection to be performed manually by a subscriber. Speech detector 1114 outputs speech audio signal 1116, which may contain some background noise 1106.

Speech recognizer 1118 receives and processes audio speech signal 1116 to identify a possible spoken command 1120. A plurality of speech recognition grammars 1122 may be used by speech recognizer 1118 to restrict the set of acceptable voice commands based on a current state of presentation device executive logic 1002, for example. Additionally, speech recognition grammars 1122 may be used to improve recognition accuracy, to decrease computational requirements, and to clarify misunderstood (or low-confidence) commands through an interactive dialog using speech prompts. If subscriber utterance 1102 contains a voice command, a corresponding decoded voice command 1120 is output from system 1100.

Referring to FIG. 10, audio publication components are received by presentation device executive logic 1002 from presentation manager 1014, or alternatively via a third-party module 142, such as a PMP 1042. Presentation device executive logic 1002 parses and transforms received audio publication metadata into an equivalent representation that may be stored in database 1040. Database 1040 may also maintain the local presentation system runtime state (see section D.2) and may also store the presentation system runtime preferences (see section D.4).

In an embodiment, audio and/or video decoding and playback may be performed using a third-party module 142 such as a PMP 1042, or alternatively, using media codecs 1044, audio output interface 1008, and/or display interface 1012. In PMP-based embodiments, presentation device executive logic 1002 interfaces with a connected PMP 1042 through PMP adapter 1006, which may be an interface that enables a variety of PMPs 1042 to be used with presentation device executive logic 1002.

Presentation device executive logic 1002 may use audio output interface 1008 and TTS (text-to-speech) engine 1046 to generate speech prompts and status reports at runtime, as described above, and to provide audible help.

In certain embodiments, presentation device 1000 may have access to an external display 1048 (or touch screen) which may be used to present images, videos, and possibly a virtual button interface 1018. If display 1048 is available, presentation device executive logic 1002 interfaces with display 1048 though display interface 1012. If display 1048 is a touch screen, a virtual button interface 1018 may be provided to render buttons and controls on display 1048 and to process user input in the form of screen touches and gestures.

In some embodiments, presentation device 1000 may enable interfacing with external hardware devices. For example, external peripheral interface 1010 may enable presentation device 1000 to be controlled remotely and/or to receive firmware upgrades from a connected computer. Hardware peripheral interface 1010 may also provide connections to route audio to headphones or external speakers, and to receive audio via an external microphone.

D.10. Further Example Presentation Device Embodiments

Figure 12:
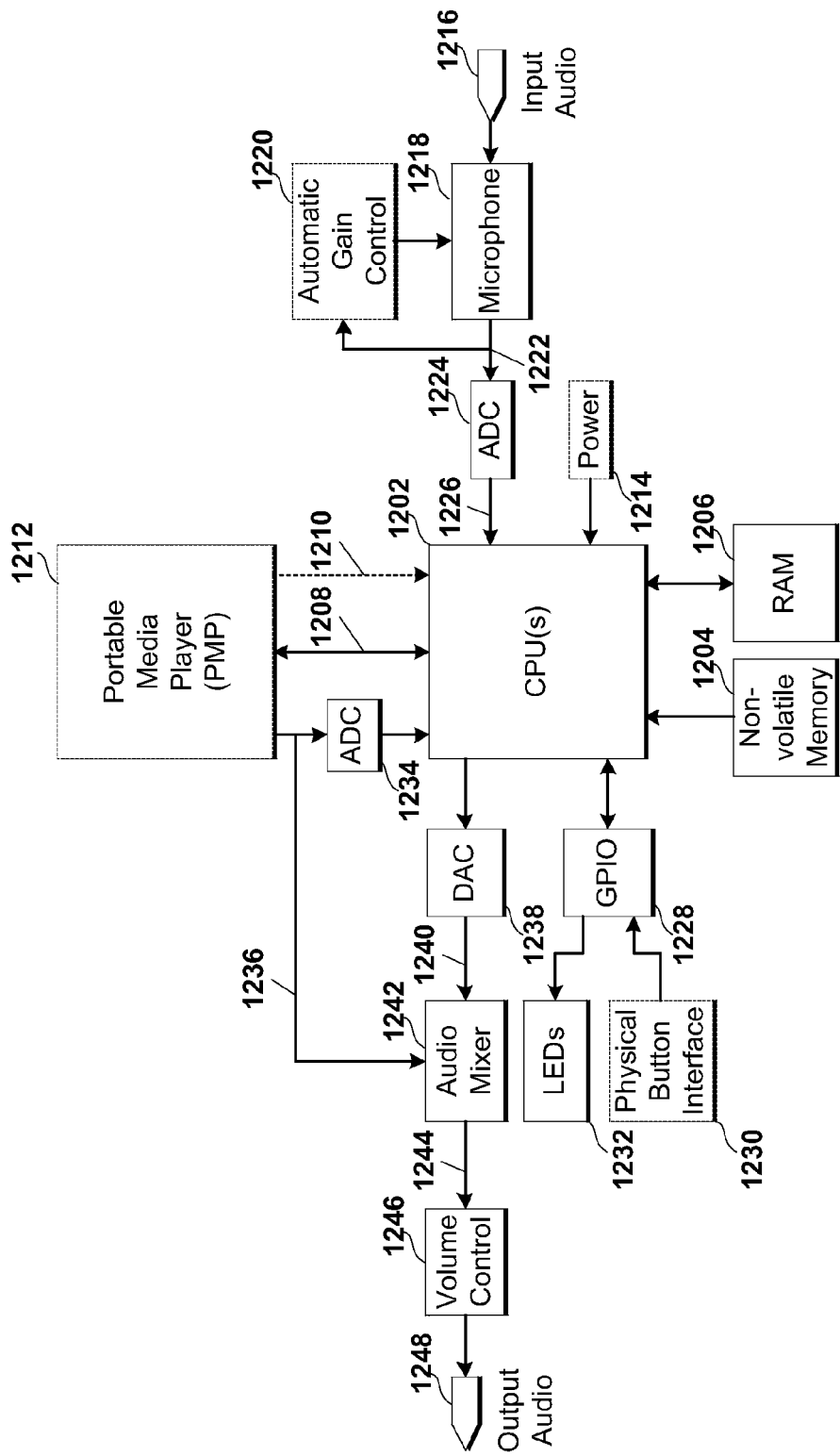
FIG. 12 shows a block diagram depicting an example presentation device, according to an embodiment.

FIG. 12 depicts a block diagram of a system 1200, according to an example embodiment. System 1200 shows a block diagram of an example of presentation device 140 of FIG. 1. As shown in FIG. 12, system 1200 includes one or more CPU(s) 1202, a non-volatile memory 1204, a RAM (random access memory) 1206, an optional PMP (portable media player) 1212, a power source 1214, a microphone 1218, an analog-to-digital converter 1224, an automatic gain control 1220, a processor GPIO (general purpose input/output) 1228, a physical button interface 1230, one or more LEDs (light emitting diodes) 1232, an analog-to-digital converter 1234, a digital-to-analog converter 1238, an audio mixer 1242, and a volume control 1246. Although not shown in FIG. 12, system 1200 may include a body or casing in which the elements shown in FIG. 12 are incorporated and/or enclosed. These elements of system 1200 are described as follows.

System 1200 includes one or more CPUs 1202 that may be capable of running an operating system (e.g., embedded Linux, etc.). Non-volatile memory 1204 (e.g., flash memory, ROM, etc.) may be used to store prerecorded speech prompts and default runtime preferences, and RAM 1206 may provide working memory for presentation device executive logic 1002 (FIG. 10). System 1200 may receive power 1210 from optionally connected PMP 1212 via bus 1210, or from another internal or external power source 1214. Example power sources include an internal rechargeable battery or an external DC supply (e.g., a cigarette lighter). CPU(s) 1202 interfaces with optional PMP 1212 via a data communications interface 1208, which may be USB, serial, or another interface type.

Input analog audio signal 1216 is captured by microphone 1218 (or a microphone array). Optionally, automatic gain control 1220 may be used to control the gain of microphone 1218 so as to maximize a dynamic range of input analog audio signal 1216 while avoiding clipping. Microphone 1218 outputs captured audio signal 1222. Captured audio signal 1222 is converted to a digital signal 1226 by analog-to-digital converter (ADC) 1224. Processor GPIO 1228 (general purpose input/output) may be used by CPU(s) 1202 to receive control commands from physical button interface 1230. Processor GPIO 1228 may also be used by CPU(s) 1202 to control one or more system status LEDs 1232.

When present, optional PMP 1212 may provide audio and/or video decoding and playback functionalities (e.g., when such decoding and playback functionalities are not handled by CPU(s) 1202 and/or other portions of system 1200 other than PMP 1212). Optionally, analog-to-digital converter (ADC) 1234 may be used to sample analog audio signal 1236 output from PMP 1212, enabling cancellation of audio signal 1236 to be performed using a standard DSP (digital signal processing) algorithm. Prerecorded speech prompts and dynamically generated text-to-speech audio output by CPU(s) 1202 may be played using digital-to-analog converter (DAC) 1238. Audio mixer 1242 combines audio signal 1236 output from optional PMP 1212 with audio signal 1240 output by DAC 1238 to generate mixed audio signal 1244. Volume control 1246 applies an amplification gain to mixed audio signal 1244 yielding output audio signal 1248.

D.11. Exemplary Plug-in Presentation Device Embodiments

Figure 13:
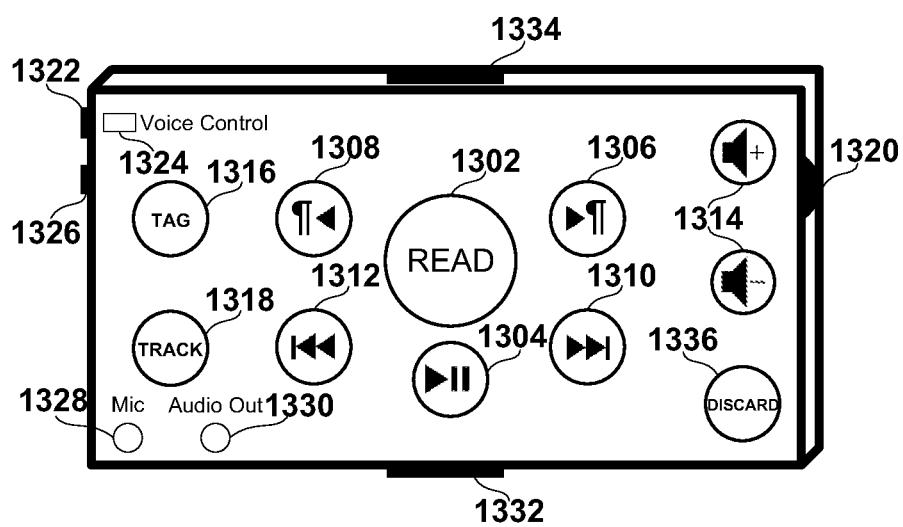
FIG. 13 shows an illustration of an exemplary plug-in presentation device, according to an embodiment.

In embodiments, system 1200 may be implemented directly in a mobile device, such as a PMP, a smart phone, a laptop computer, or other such device mentioned elsewhere herein or otherwise known. In another embodiment, system 1200 may be implemented in an attachable device (e.g., a plug-in module or device) that may be coupled (e.g., plugged-in) to another device or system to enable the functionality described herein, possibly by using one or more functionalities provided by the other device or system (e.g., digital audio and/or video decoding and playback/display, speech recognition, etc.). For instance, FIG. 13 depicts a view of a plug-in device 1300, according to an example embodiment. Plug-in device 1300 is an example embodiment of presentation device 140, and in embodiments, may include some or all of the features of system 1200 of FIG. 12. Plug-in device 1300 is configured to interface with a mobile device (e.g., a PMP) that may enable digital audio playback and/or video display functionalities. For example, system 1300 may be plugged into an interface (e.g., a connector) of the mobile device.

Referring to FIG. 13, plug-in device 1300 includes a plurality of control interfaces positioned on a rectangular body. As shown in FIG. 13, plug-in device 1300 includes a "read" button 1302, a play/pause button 1304, a next paragraph button 1306, a previous paragraph button 1308, a next audio content item button 1310, a previous audio content item button 1312, a volume up/down button 1314, a tag button 1316, a track button 1318, a discard button 1336, a clickable scroll wheel 1320, a toggle button 1322, and a preferences modify button 1326. The control interfaces shown in FIG. 13 for plug-in device 1300 are provided for purposes of illustration. Additional, fewer, and/or alternative control interfaces that provide corresponding functionality may be present in plug-in device 1300 in embodiments. Furthermore, although control interfaces are shown in FIG. 13 in the form of buttons and a scroll wheel, each control interface may have any other form, virtual or physical, as described herein or otherwise known. Furthermore, the control interfaces of plug-in device 1300 may be positioned on plug-in device 1300 in any arrangement. The control interfaces are described as follows.

As shown in the example of FIG. 13, "read" button 1302, play/pause button 1304, next paragraph button 1306, previous paragraph button 1308, next audio content item button 1310, previous audio content item button 1312, volume up/down button 1314, tag button 1316, and track button 1318 are located on a common planar surface of the body of plug-in device 1300. "Read" button 1302 may be pressed by a subscriber in title or summary mode (see section D.1) to request playback of an audio content item's summary or story body segment. As shown in the example of FIG. 13, read button 1302 is larger than other buttons of plug-in device 1300 and is centrally located on the planar surface. Play/pause button 1304 enables a user to play or pause a currently selected audio content item. Next paragraph button 1306 enables a user to advance to a next paragraph of a currently selected audio content item. Previous paragraph button 1308 enables a user to go to an earlier paragraph of a currently selected audio content item. Next audio content item button 1310 enables a user to advance to a next audio content item (e.g., in the current audio publication section). Previous audio content item button 1312 enables a user to go to a previous audio content item. Volume up/down button 1314 enables a user to increase or decrease the audio volume of audio played by plug-in device 1300. Tag button 1316 enables audio content item and advertisement tagging, track button 1318 enables audio content item tracking, and discard button 1336 allows a currently selected audio content item to be permanently discarded as described in section D.2.

Clickable scroll wheel 1320 is located on a first edge (e.g., a right side edge in FIG. 13) of the body of plug-in device 1300. Clickable scroll wheel 1320 may provide multiple functions. For example, clickable scroll wheel 1320 may be configured to enable navigation among a plurality of audio publications and/or a plurality of audio publication sections, to enable the presentation system runtime preferences to be modified, and/or to enable a PMP's graphical display to be interacted with, if applicable. Toggle button 1322 is located on a second edge (e.g., a left side edge in FIG. 13) of the body of plug-in device 1300. Toggle button 1322 alternately enables/disables a voice control interface. Preferences modify button 1326 is located on a second edge (e.g., a left side edge in FIG. 13) of plug-in device 1300. Preferences modify button 1326 may be pressed to activate a mode enabling the runtime preferences to be modified.

As shown in FIG. 13, the body of plug-in device 1300 includes further features, including an LED 1324, an audio input jack 1328, an audio output jack 1330, a hardware peripheral port 1332, and a connector 1334. LED 1324, audio input jack 1328, and audio output jack 1330 are each located on the planar surface of the body of plug-in device 1300. LED 1324 may be configured to emit light when the voice control interface is enabled. An external microphone or microphone array may be connected to plug-in device 1300 via audio input jack 1328, enabling plug-in device 1300 to be controlled using voice commands. Audio output jack 1330 enables audio to be routed externally to a pair of headphones or external speakers. Hardware peripheral port 1332 is located on a third edge (e.g., a bottom side edge in FIG. 13) of plug-in device 1300. Hardware peripheral port 1332 may be present to provide serial and USB connectivity, which may enable plug-in device 1300 to be controlled remotely and/or to receive firmware updates. Connector 1334 is located on a fourth edge (e.g., a top side edge in FIG. 13) of plug-in device 1300. Connector 1334 enables plug-in device 1300 to interface with a connected mobile device. For example, connector 1334 may enable plug-in device 1300 to be connected to an industry standard or proprietary interface of an electronic device such as a laptop computer, a tablet computer, a portable music player (e.g., an Apple® iPod®), a smart phone (e.g., an Apple® iPhone®), a phone that incorporates the Google Android™ platform, a RIM Blackberry® device), other mobile computer, etc.

D.12. Presentation Device Executive Main Process

Figure 14A:
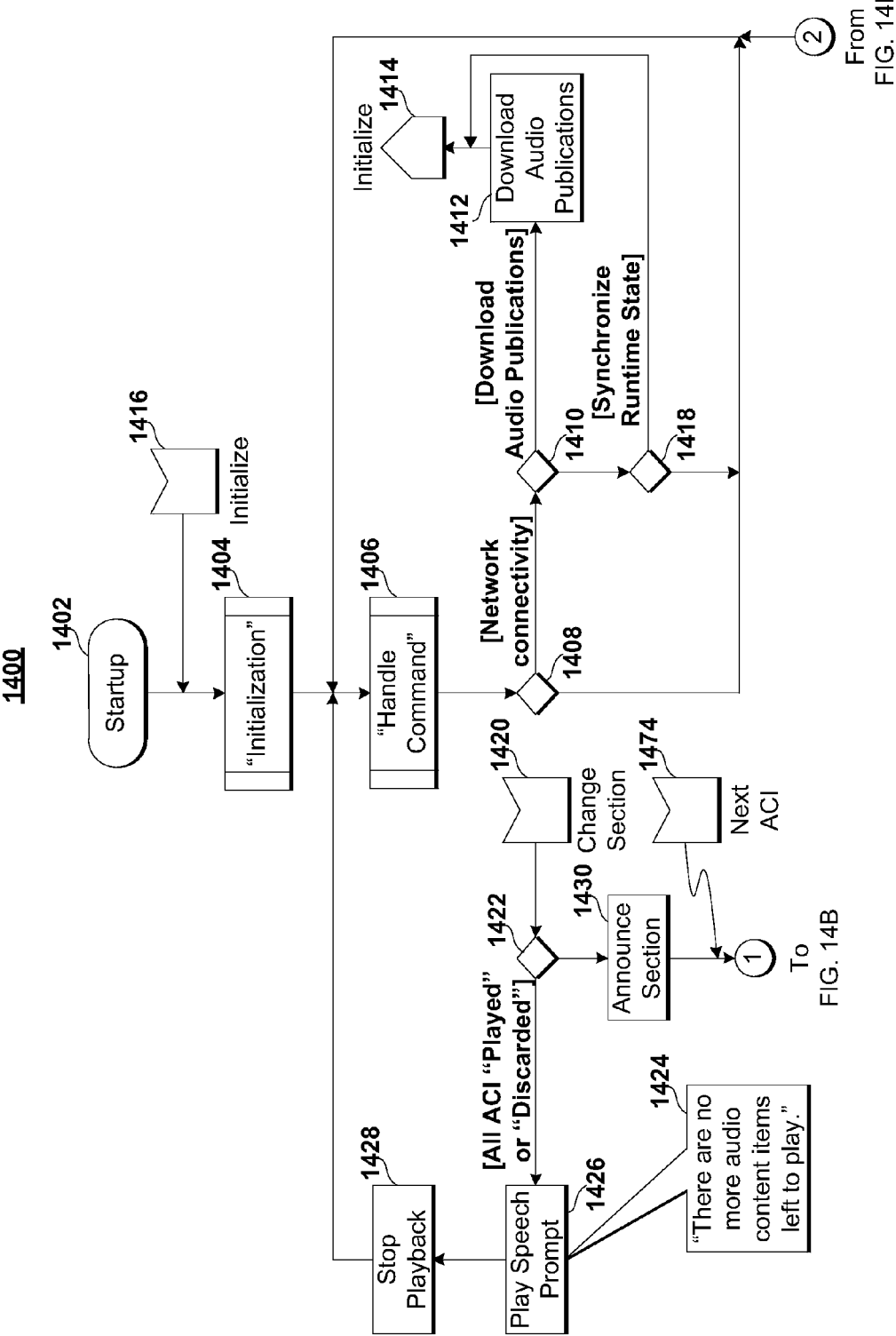
FIGS. 14A and 14B show a flowchart depicting a presentation device main process, according to an example embodiment.

The presentation devices described herein may operate in various ways to perform their functions. For instance, FIGS. 14A-19 depict example processes that may be performed by presentation device executive logic 1002 (FIG. 10) or other controlling logic of a presentation device. Throughout the referenced figures, the abbreviation "ACI" is used to denote "audio content item." FIGS. 14A-14B are described as follows, and FIGS. 15-19 are described in subsequent sections.

Figure 14B:
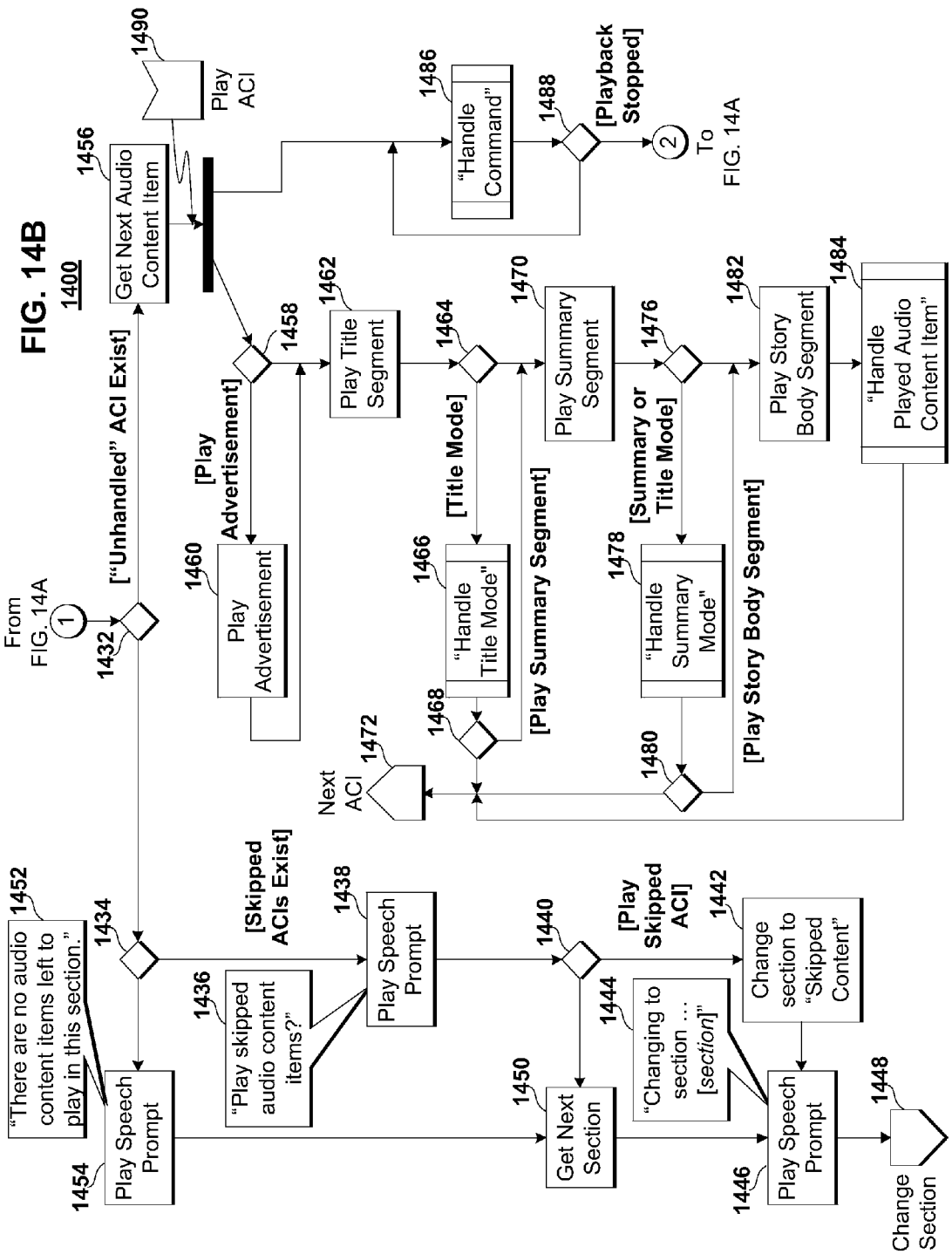

FIGS. 14A-14B depict a flowchart 1400 for a process for playing audio publications, according to an example embodiment. Flowchart 1400 may be performed by presentation device executive logic 1002 of FIG. 10, for example. Further structural and operational embodiments will be apparent to persons skilled in the relevant art(s) based on the discussion regarding flowchart 1400. Note that the steps of flowchart 1400 need not necessarily be performed in the order shown in FIGS. 14A-14B. Furthermore, in embodiments, each of the steps of flowchart 1400 (and of further flowcharts described herein) may be performable by one or more sub-steps, depending on the particular implementation. Flowchart 1400 is described as follows.

Figure 15:
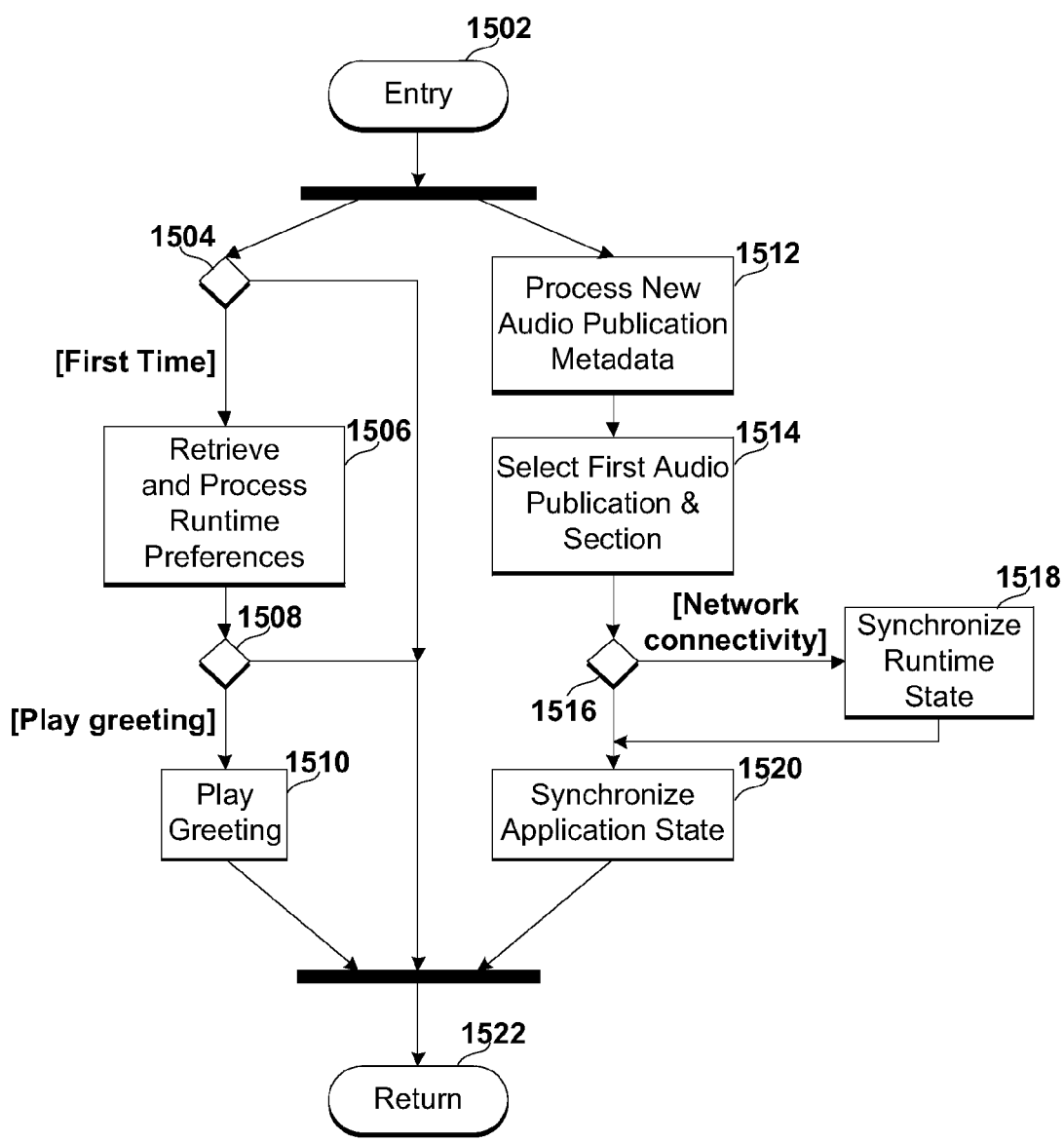
FIG. 15 shows a flowchart depicting an "Initialization" process, according to an example embodiment.

Referring to FIG. 14A, at step 1402, an application is started. For example, the application may be presentation device executive logic 1002. After step 1402, flowchart 1400 enters "Initialization" process 1404, an example of which is shown in FIG. 15 and described in section D.13. According to process 1404, presentation device executive logic 1002 may be initialized. After process 1404, flowchart 1400 enters a "Handle Command" process 1406, an example of which is shown in FIGS. 16A-16D and described in section D.14, where a subscriber-issued command is awaited. According to process 1404, one or more commands that may be received by presentation device executive logic 1002 may be processed.

If no commands are received in "Handle Command" process 1406, in decision block 1408, a check for network connectivity is performed. If network connectivity for the presentation device is determined to be present, decision blocks 1410 and 1418 may determine whether additional commands have been received from a subscriber. For example, decision block 1410 determines whether to perform a complete download of available audio publications. If it is determined that available audio publications are to be downloaded, a complete audio publication download may be performed in step 1412, and flowchart 1400 proceeds to "Initialization" process 1404 (as indicated by an exit point 1414 to entry point 1416 path in FIG. 14A). Decision block 1418 determines whether the presentation system runtime state should be synchronized. If it is determined that the presentation system runtime state should be synchronized, flowchart 1400 proceeds to "Initialization" process 1404 (as indicated by exit point 1414 to entry point 1416 path). If it is determined at decision blocks 1410 and 1418 that neither of the commands are received from a subscriber, or if there is determined to be no network connectivity at decision block 1408, operation proceeds to "Handle Command" process 1406.

If a "resume" command is received in "Handle Command" process 1406, and this is a first "resume" command issued following application startup in step 1402, then operation proceeds from "Handle Command" process 1406 to decision block 1422 (via "Change Section" entry point 1420). Decision block 1422 performs a preliminary determination of whether all downloaded audio content items have been played or discarded. If there are no remaining audio content item to play, operation proceeds to step 1426. In step 1426, a speech prompt 1424 is played to the subscriber, playback is stopped in step 1428, and operation proceeds back to "Handle Command" process 1406 to await additional commands. If it is determined that there are remaining audio content items to play at decision block 1422, operation proceeds to step 1430. In step 1430, the current section name is announced to the subscriber, such as by using a prerecorded speech prompt or generated text-to-speech.

Operation proceeds from step 1430 to decision block 1432 (shown in FIG. 14B). Decision block 1432 determines whether the current section contains any unhandled audio content items. If there are no remaining unhandled audio content items in the current section, operation proceeds to decision block 1434. Decision block 1434 determines whether there are any audio content items in the current section that have been skipped. If decision block 1434 determines that there is at least one skipped audio content item, operation proceeds to step 1438. In step 1438, speech prompt 1436 is played to the subscriber to ask whether the skipped audio content item(s) should be played, and operation proceeds to decision block 1440. In decision block 1440, it is determined whether the subscriber indicates that the skipped audio content item(s) should be played. If so, operation proceeds to step 1442, and if not, operation proceeds to step 1450. In step 1442, the current section is switched to "Skipped Content," and operation proceeds to step 1446. In step 1446, a speech prompt 1444 is played to the subscriber to announce that the section is changing, and operation proceeds to "Change Section" entry point 1420 (FIG. 14A) via exit point 1448. In step 1450, a next audio publication section with at least one unhandled or skipped audio content item is selected, and operation proceeds to step 1446. If it is determined at decision block 1434 that there are no skipped audio content items, operation proceeds to step 1454. In step 1454, a speech prompt 1452 is played to the subscriber announcing that there are no audio content items left to play in the current section, and operation proceeds to step 1450.

If it is determined in decision block 1432 that the current section contains at least one unhandled audio content item, operation proceeds to step 1456. In step 1456, a next unhandled audio content item in the current section is retrieved, and operation branches into two concurrent paths. A first execution path (e.g., left-hand in FIG. 14B) handles audio content item and advertisement presentation, while a second execution path (e.g., right-hand in FIG. 14B) awaits and processes interaction commands (e.g., see Table 6 further below).

According to the first execution path, operation proceeds to a decision block 1458. At decision block 1458, it is determined whether an advertisement is to be presented. Such determination may be made based on advertisement scheduling details which may be present in the audio publication metadata of the currently selected audio publication. If an advertisement is to be presented, operation proceeds to step 1460. In step 1460, the selected advertisement is presented and a subset of the subscriber commands (e.g., see Table 6) may optionally be disabled. As described in section B.3, advertisements may be scheduled for presentation at the beginning and/or the end of a selected audio content item segment. Thus, decision block 1458 and step 1460 may be located and/or repeated together in a variety of positions along the left-hand execution path of flowchart 1400. Decision block 1458 and step 1460 are indicated in FIG. 14 in corresponding locations for illustrative purposes.

Figure 17:
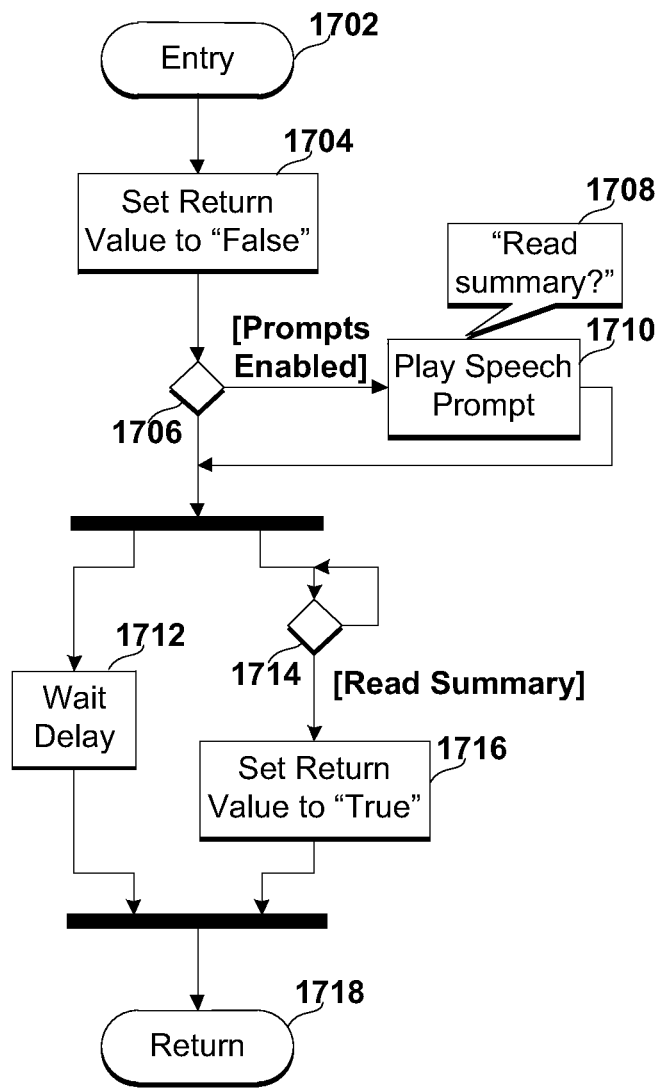
FIG. 17 shows a flowchart depicting a "Handle Title Mode" process, according to an example embodiment.

Following presentation of an advertisement in step 1460, or if decision block 1458 determines that no advertisement is to be presented, in step 1462, the current audio content item's title segment is played. When playback of the title segment has completed, operation proceeds to decision block 1464. In decision block 1464, the current runtime mode (see section D.1) is queried to determine whether the "title mode" is selected. If title mode is selected, operation proceeds to "Handle Title Mode" process 1466, an example of which is shown in FIG. 17 and described in section D.15. In "Handle Title Mode" process 1466, it is determined whether the current audio content item's summary segment is to be played. Decision block 1468 evaluates the return value of process 1466 and determines whether playback of the summary segment is to commence by proceeding to step 1470, or whether the next audio content item is to be retrieved by proceeding to "Next ACI" entry point 1474 (shown in FIG. 14A) via exit point 1472. If decision block 1464 determines that title mode is not selected, operation proceeds to step 1470. In step 1470, the summary segment is played automatically.

Figure 18:
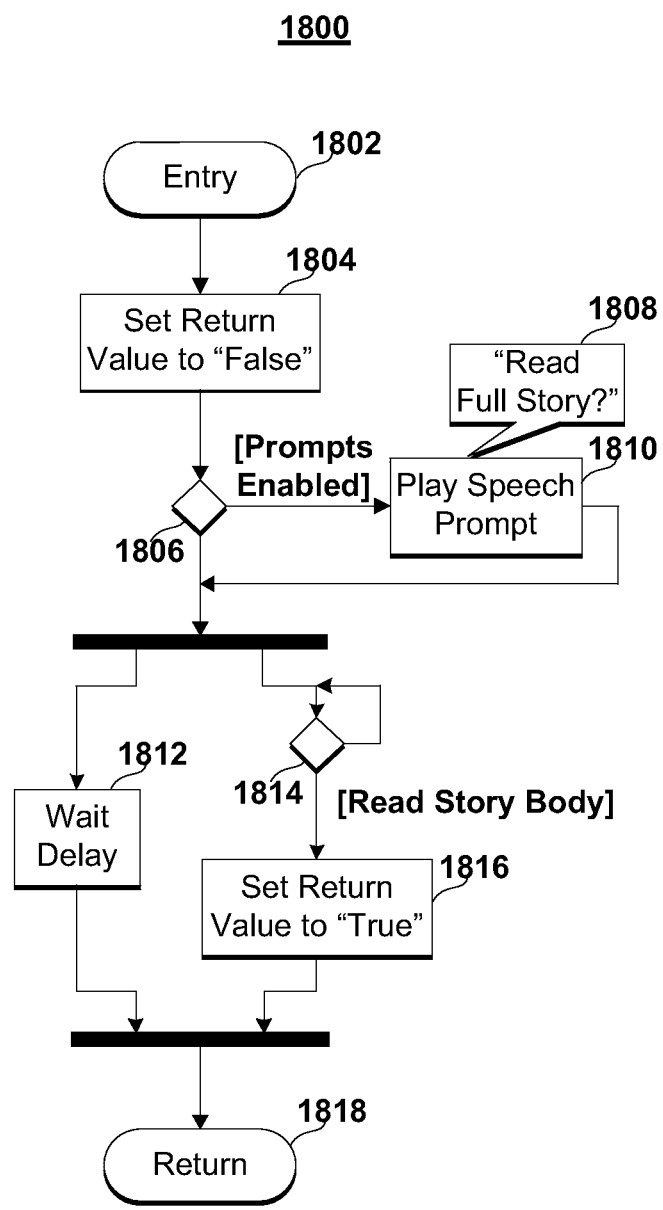
FIG. 18 shows a flowchart depicting a "Handle Summary Mode" process, according to an example embodiment.

Upon completion of the summary segment in step 1470, operation proceeds to decision block 1476. At decision block 1476, it is determined whether the current runtime mode is either "summary mode" or "title mode." If summary mode or title mode is selected, then operation proceeds to a "Handle Summary Mode" process 1478, an example of which is shown in FIG. 18 and described in section D.16. In "Handle Summary Mode" process 1478, it is determined whether the current audio content item's story body segment is to be played. Decision block 1480 evaluates the return value of process 1478 and determines whether playback of the story body segment is to commence by proceeding to step 1482, or whether the next audio content item is to be retrieved by proceeding to decision block 1432 (via exit point 1472 to "Next ACI" entry point 1474, shown in FIG. 14A). If decision block 1476 determines that neither summary mode nor title mode is selected, the story body segment is played automatically in step 1482.

Figure 19:
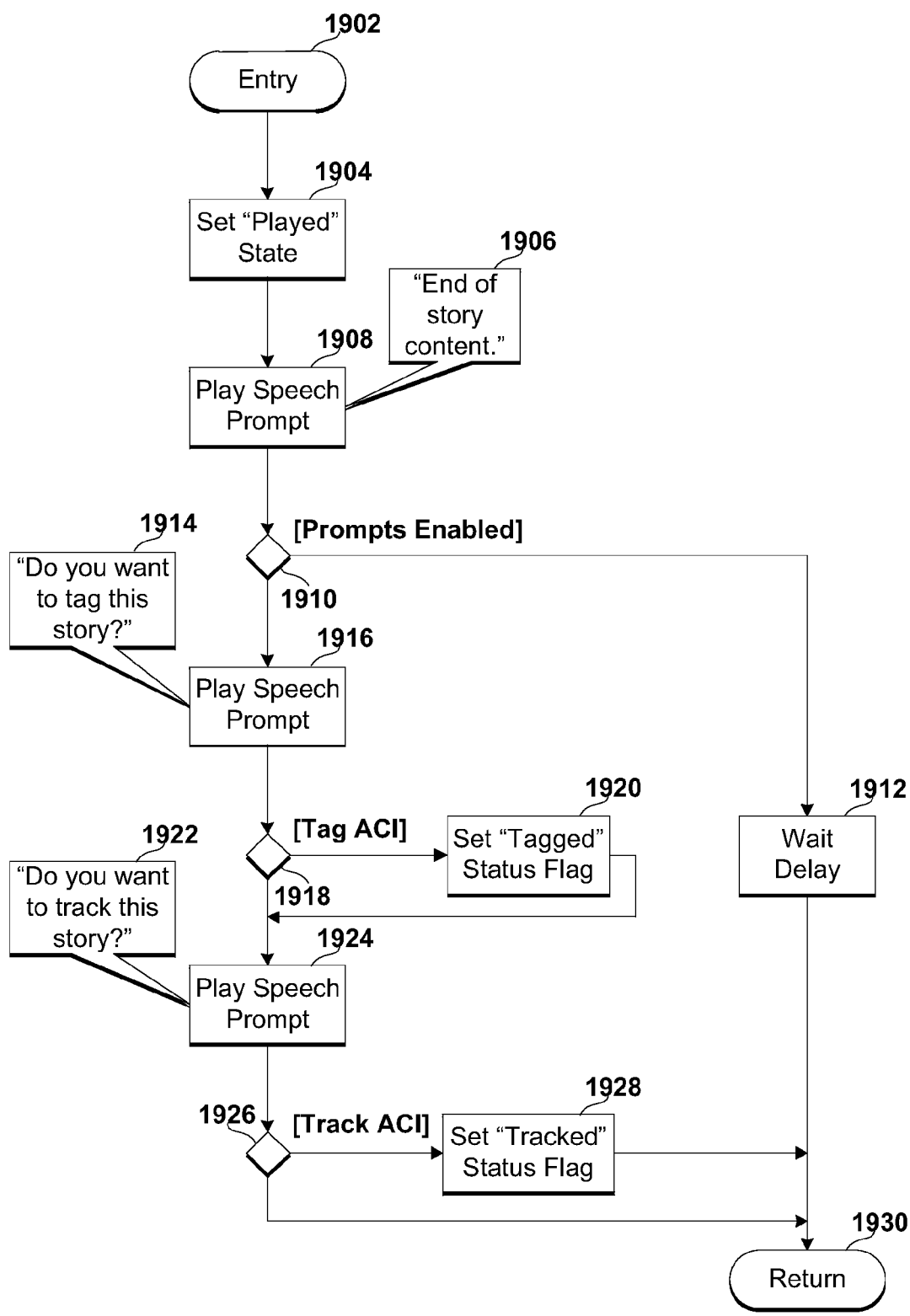
FIG. 19 shows a flowchart depicting a "Handle Played Audio Content Item" process, according to an example embodiment.

If the current runtime mode is "full story mode," neither "Handle Title Mode" process 1466 nor "Handle Summary Mode" process 1478 executes, and the title, summary, and story body audio content item segments are played consecutively in steps 1462, 1470, and 1482 respectively. Upon completion of the story body segment in step 1482, operation proceeds to "Handle Played Audio Content Item" process 1484, an example of which is shown in FIG. 19 and described in section D.17. Operation proceeds from process 1484 to decision block 1432 (via exit point 1472 to "Next ACI" entry point 1474, shown in FIG. 14A) to retrieve a next audio content item for presentation.

According to the second execution path, a "Handle Command" process 1486 handles any commands that are entered using button interfaces 1016 and 1018, voice control interface 1020 (see section D.3 and Table 6), and/or another suitable interface. Operation remains in "Handle Command" process 1486 until a valid command is received and processed, or playback is stopped (or paused), as determined by decision block 1488. In decision block 1488, if it is determined that playback is stopped (or paused), operation proceeds back to "Handle Command" process 1406 (FIG. 14A) to await additional commands.

D.13. Presentation Device Executive "Initialization" Process

FIG. 15 depicts a flowchart 1500 for an example "Initialization" process, according to an example embodiment. Flowchart 1500 may be performed by presentation device executive logic 1002 of FIG. 10, for example. In an embodiment, flowchart 1500 may be performed in process 1404 of flowchart 1400 (FIG. 14A). Following entry at step 1502, flowchart 1500 branches into two concurrent paths. Along a first (e.g., left-hand in FIG. 15) execution path, operation proceeds to decision block 1504, and along a second (e.g., right-hand in FIG. 15) execution path, operation proceeds to step 1512. In decision block 1504, it is determined whether this is the first execution of flowchart 1500 following completion of step 1402 in flowchart 1400. If it is determined not to be the first execution of flowchart 1500 (e.g., flowchart 1500 was entered via entry point 1416), the left-hand execution path terminates, and at step 1522, operation proceeds back to flowchart 1400. If it is determined to be the first execution of flowchart 1500, operation proceeds to step 1506. In step 1506, runtime preferences (see section D.4) are retrieved and processed, and operation proceeds to decision block 1508. In decision block 1508, it is determined whether a greeting is to be played to the subscriber. If a greeting is determined to be played, operation proceeds to step 1510. In step 1510, a greeting is played to the subscriber. If a greeting is determined not to be played, operation proceeds to step 1522.

In parallel, along the right-hand execution path, at step 1512, new and/or updated audio publication metadata is retrieved from presentation manager 138 or a connected third-party module 142 and is processed. Operation proceeds from step 1512 to step 1514. In step 1514, a first section of a first audio publication provided by presentation manager 138 or the connected third-party module 142 is selected for presentation, and operation proceeds to decision block 1516. In decision block 1516, it is determined whether network connectivity exists. If network connectivity is determined to be present, operation proceeds to step 1518, and otherwise proceeds to step 1520. In step 1518, the local presentation system runtime state (see section D.2) is synchronized with the runtime state stored remotely in subscriber database 122, and operation proceeds to step 1520. In step 1520, the current application runtime state (e.g., the presentation device executive logic 1002 runtime state) is initialized to the current presentation system runtime state, which may cause a new section and/or audio publication to be selected. Operation proceeds from step 1520 to step 1522. Flowchart 1500 returns to flowchart 1400 at step 1522, after both of the first and second execution paths of flowchart 1500 have completed and rejoined.

D.14. Presentation Device Executive "Handle Command" Process

FIGS. 16A-16D depict a flowchart 1600 for an example "Handle Command" process, according to an example embodiment. Flowchart 1600 may be performed by presentation device executive logic 1002 of FIG. 10, for example. In an embodiment, flowchart 1600 may be performed in processes 1406 and 1486 of flowchart 1400 (FIGS. 14A-14B). Flowchart 1600 is entered at entry step 1601. Subsequent to entry step 1601, a valid received command (e.g., see Table 6 below) is determined by evaluating decision blocks 1602-1619. Each of decision blocks 1602-1619 corresponds to a particular command that may be received. If a valid command is received, the corresponding branch node is selected, and the command is processed. After the command has been processed, operation proceeds either to step 1620 (FIG. 16D), from which flowchart 1600 returns to flowchart 1400, or proceeds to a particular exit point (e.g., one of exit points 1624, 1626, 1629, 1633, 1635, 1649, or 1666), from which flowchart 1600 returns to flowchart 1400 at a corresponding entry point.

Throughout this section, it is assumed that an audio content item is playing to a subscriber when flowchart 1600 is entered at entry step 1601. Operation proceeds from entry step 1601 to step 1621. In step 1621, playback of the current audio content item may be paused. At this point, a subscriber-issued command may be received and processed according to flowchart 1600. If a command is received from the subscriber and no audio content item is playing, step 1621 may be skipped. Operation proceeds from step 1621 to decision blocks 1602-1619, which determine whether a command corresponding to one of decision blocks 1602-1619 has been issued. When a command corresponding to one of decision blocks 1602-1619 is determined to be received, the command is processed as described below. If such a command is not determined to be received, operation proceeds to step 1620.

Skip 1602: A skip command may be determined to be received at decision block 1602. In such case, operation proceeds to step 1622. In step 1622, the audio content item enters the "skipped" state, and in step 1623, the audio content item is added to the "Skipped Content" section (see section D.7). Operation proceeds to "Next ACI" exit point 1624, and flowchart 1400 is reentered at decision block 1432 (by proceeding from "Next ACI" exit point 1624 of FIG. 16A to "Next ACI" entry point 1474 of FIG. 14A).

Discard 1603: A discard command may be determined to be received at decision block 1603. In such case, operation proceeds to step 1625. In step 1625, the audio content item enters the "discarded" state. Operation proceeds to exit point 1626, and flowchart 1400 is reentered at decision block 1432 (by proceeding from next ACI exit point 1626 of FIG. 16A to "Next ACI" entry point 1474 of FIG. 14A).

Previous Audio Content Item 1604: A previous audio content item command may be determined to be received at decision block 1604. In such case, operation proceeds to step 1627. In step 1627, the previously "played," "skipped," or "discarded" audio content item is fetched, and in step 1628, the audio content item state is initialized to the "unhandled" state. Operation proceeds to exit point 1629, and flowchart 1400 is reentered to begin the first and second execution paths subsequent to step 1456 (by proceeding from "Play ACI" exit point 1629 of FIG. 16A to "Play ACI" entry point 1490 of FIG. 14B).

Change Audio Publication 1605: A change audio publication command may be determined to be received at decision block 1605. In such case, operation proceeds to step 1630. In step 1630, a subscriber's desired audio publication is selected. In step 1631, the first section of the selected audio publication with at least one unhandled or skipped audio content item is selected. In step 1632, the selected audio publication is announced to the subscriber. Operation proceeds to "Change Section" exit point 1633, and flowchart 1400 is reentered at decision block 1422 (by proceeding from "Change Section" exit point 1633 of FIG. 16A to "Change Section" entry point 1420 of FIG. 14A).

Change Section 1606: A change section command may be determined to be received at decision block 1606. In such case, operation proceeds to step 1634. In step 1634, a subscriber's desired audio publication section is selected. Operation proceeds to "Change Section" exit point 1635, and flowchart 1400 is reentered at decision block 1422 (by proceeding from "Change Section" exit point 1635 of FIG. 16A to "Change Section" entry point 1420 of FIG. 14A).

Figure 16B:
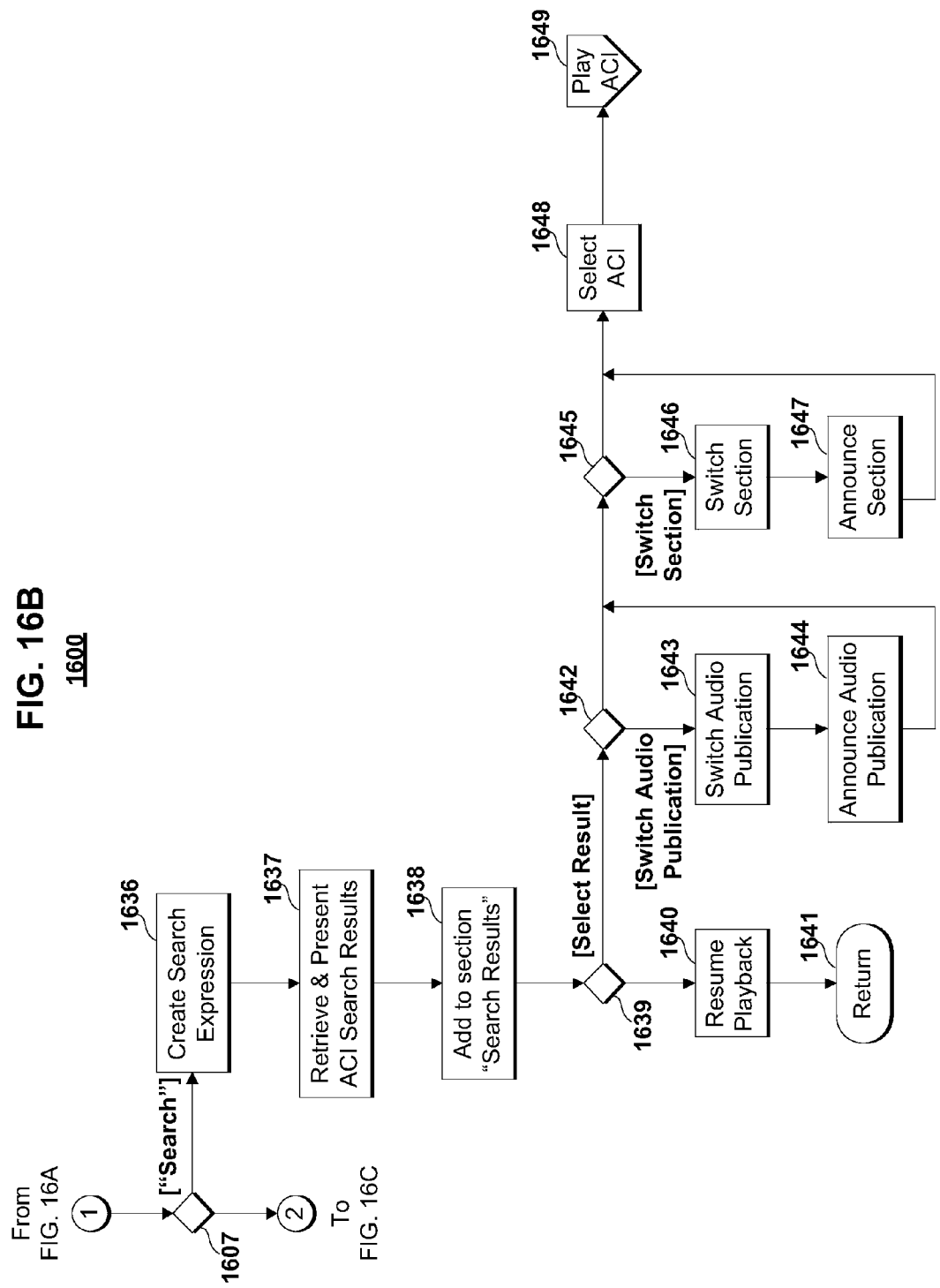

Search 1607: A search command may be determined to be received at decision block 1607 (FIG. 16B). In such case, operation proceeds to step 1636. In step 1636, a search expression is entered/generated by a subscriber, such as by voice control interface 1020; by directly entering text (see section D.5), etc., and operation proceeds to step 1637. In step 1637, search results containing any matching audio content items are retrieved and presented to the user of the presentation device either aurally (e.g., by using text-to-speech engine 1046), textually, or in both formats, and step 1638 is performed. In step 1638, matching audio content items that are available for immediate presentation are added to the "Search Results" audio publication section (see section D.7). Operation proceeds from step 1638 to decision block 1639. In decision block 1639, it is determined whether any of the matching audio content items retrieved in step 1637 are selected by the subscriber. If it is determined that none of the search results retrieved in step 1637 are selected by the subscriber, or if no audio content items matched the search expression created in step 1636, playback of the current audio content item is resumed in step 1640. Following step 1640, flowchart 1600 returns to flowchart 1400 from step 1641. If it is determined in decision block 1639 that an audio content item search result is selected by the subscriber, operation proceeds to decision block 1642. In decision block 1642 it is determined whether the current audio publication is to be switched/changed. If it is determined that the current audio publication needs to be switched, operation proceeds to step 1643, and if not, operation proceeds to decision block 1645. In step 1643, a new audio publication is selected, and in step 1644, the new audio publication is announced to the subscriber. Operation proceeds from step 1644 to decision block 1645. In decision block 1645, it is determined whether the current section is to be switched/changed. If it is determined that the current section is to be switched, operation proceeds to step 1646, and if not, operation proceeds to step 1648. In step 1646, a new section is selected, and in step 1647, the new section is announced to the subscriber. Operation proceeds from step 1647 to step 1648. In step 1648, the current audio content item is switched to the selected audio content item search result. Operation proceeds to exit point 1649, and flowchart 1400 is reentered to begin the first and second execution paths subsequent to step 1456 (by proceeding from "Play ACI" exit point 1649 of FIG. 16B to "Play ACI" entry point 1490 of FIG. 14B).

Figure 16C:
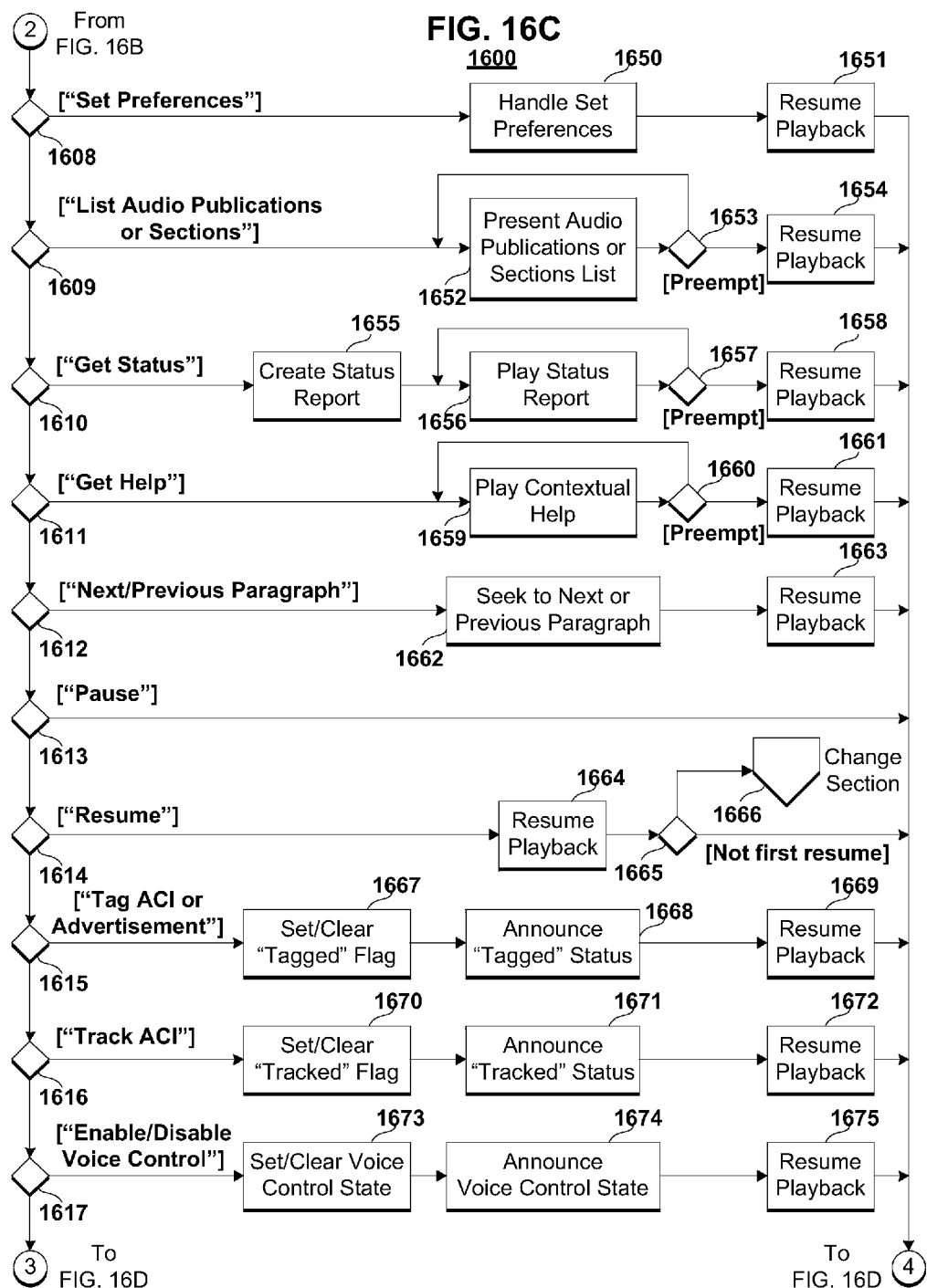

Set Preferences 1608: A set preferences command may be determined to be received at decision block 1608 (FIG. 16C). In such case, operation proceeds to step 1650. In step 1650, the presentation system runtime preferences may be handled (see section D.4), such as by presenting a sequence of speech prompts to a subscriber, by using a graphical menu interface (if supported by presentation device 140), and/or using another technique. After the runtime preferences have been set by a subscriber in step 1650, operation proceeds to step 1651. In step 1651, playback of the current audio content item is resumed, and operation proceeds to step 1620.

List Audio Publications or Sections 1609: A list audio publications or sections command may be determined to be received at decision block 1609. In such case, operation proceeds to step 1652. In step 1652, depending on the received command, either a list of the available audio publications (for a received list audio publications command) or a list of the audio publication sections contained in the current audio publication (for a received list sections command) is announced to a subscriber, such as by using prerecorded speech prompts, electronic text-to-speech (e.g., using text-to-speech engine 1046), or another technique. Optionally, the list of audio publications or sections may be presented visually, if supported by presentation device 140. Operation proceeds to decision block 1653. In decision block 1653, a subscriber is enabled to preempt (e.g., pause, restart, and/or presentation of the listing announcement. After playback of the listing announcement has completed in step 1652, playback of the current audio content item is resumed in step 1654, and operation proceeds to step 1620.

Get Status 1610: A get status command may be determined to be received at decision block 1610. In such case, operation proceeds to step 1655. In step 1655, a status report is generated, and in step 1656, the status report is played to a subscriber, such as by using electronic text-to-speech (e.g., using text-to-speech engine 1046). Optionally, the status report may be presented visually, if supported by presentation device 140. Operation proceeds to a decision block 1657. In decision block 1657, a subscriber is enabled to preempt playback of the status report. When playback of the status report has completed in step 1656, playback of the current audio content item is resumed in step 1658, and operation proceeds to step 1620.

Get Help 1611: A get help command may be determined to be received at decision block 1611. In such case, operation proceeds to step 1659. In step 1659, contextual help is presented to a subscriber (e.g., in the form of a dialog), such as by using prerecorded speech prompts or electronic text-to-speech (e.g., using text-to-speech engine 1046). Optionally, help may be presented visually, if supported by presentation device 140. Operation proceeds to decision block 1660. In decision block 1660, a subscriber is enabled to preempt playback of the contextual help. When playback of the contextual help has completed in step 1659, playback of the current audio content item is resumed in step 1661, and operation proceeds to step 1620.

Next/Previous Paragraph 1612: A next/previous paragraph command may be determined to be received at decision block 1612. In such case, operation proceeds to step 1662. In step 1662, depending on the command issued, playback either skips forward to a next paragraph or backward to the beginning of a previous (or the current) paragraph within the current audio content item. Playback of the current audio content item is resumed in step 1663, and operation proceeds to step 1620.

Pause 1613: A pause command may be determined to be received at decision block 1613. Because audio content item playback is paused in step 1621, operation proceeds to step 1620.

Resume 1614: A resume command may be determined to be received at decision block 1614. In such case, operation proceeds to step 1664. In step 1664, playback of the current audio content item is resumed, and operation proceeds to a decision block 1665. In decision block 1665, it is determined whether this is the first "resume" command received from the subscriber since application startup at step 1402 (FIG. 14A). If it is determined to be the first resume command, operation proceeds to exit point 1666, and flowchart 1400 is reentered at decision block 1422 (by proceeding from "Change Section" exit point 1666 of FIG. 16C to "Change Section" entry point 1420 of FIG. 14A). If it is determined not to be the first resume command, operation proceeds to step 1620.

Tag Audio Content Item or Advertisement 1615: A tag audio content item or advertisement command may be determined to be received at decision block 1615. In such case, operation proceeds to step 1667. In step 1667, the audio content item's or advertisement's "tagged" status flag is alternately set or cleared, and in step 1668, a speech prompt is played to confirm the current "tagged" status. Playback of the current audio content item (or advertisement) is resumed in step 1669, and operation proceeds to step 1620.

Track Audio Content Item 1616: A track audio content item command may be determined to be received at decision block 1616. In such case, operation proceeds to step 1670. In step 1670, the audio content item's "tracked" status flag is alternately set or cleared, and in step 1671, a speech prompt is played to confirm the current "tracked" status. Playback of the current audio content item is resumed in step 1672, and operation proceeds to step 1620.

Enable/Disable Voice Control 1617: An enable/disable voice control command may be determined to be received at decision block 1617. In such case, operation proceeds to step 1673. In step 1673, voice control is alternately enabled or disabled, and in step 1674, a speech prompt is played to the subscriber to confirm the current voice control state. Playback of the current audio content item is resumed in step 1675, and operation proceeds to step 1620.

Figure 16D:
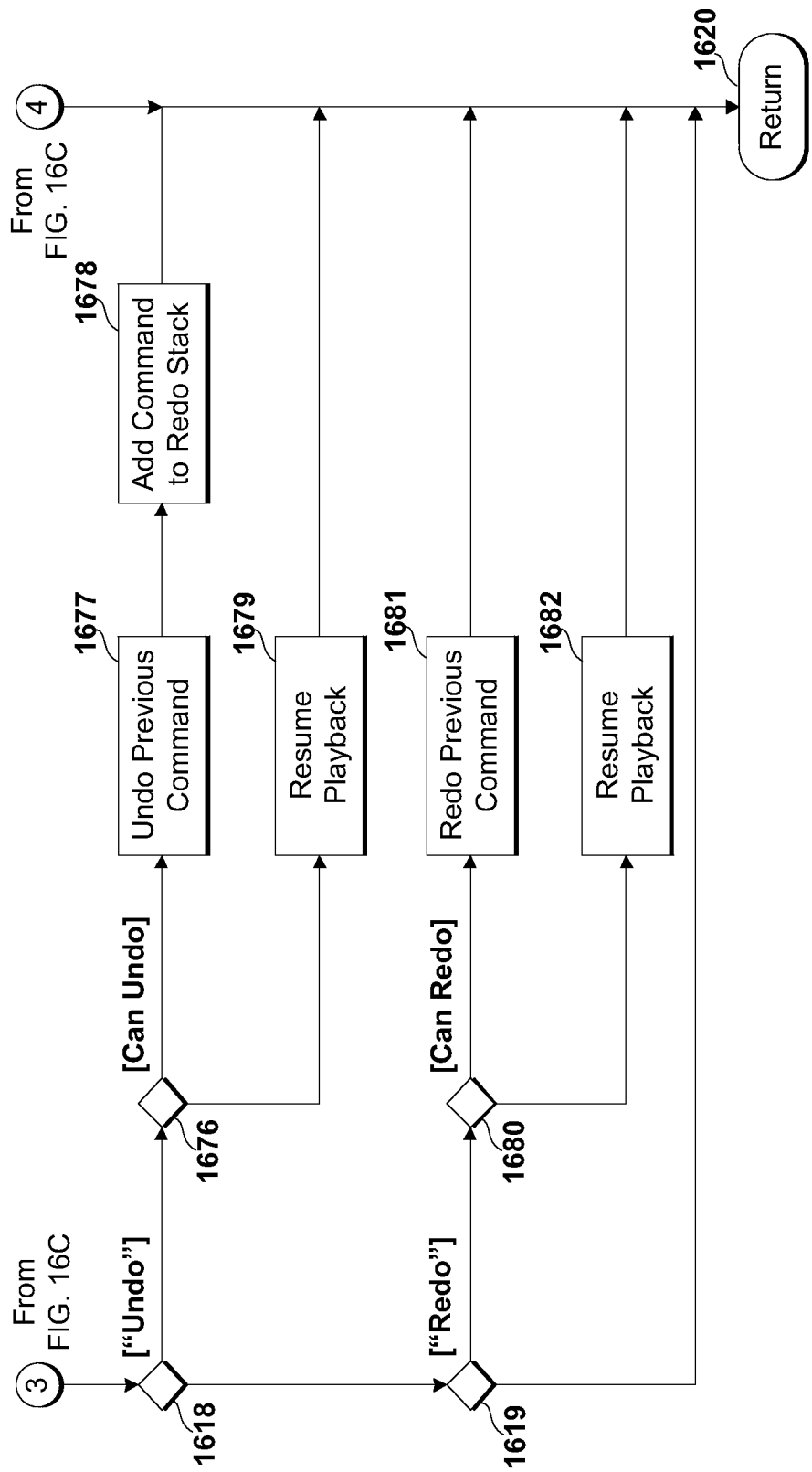

Undo 1618: An undo command may be determined to be received at decision block 1618 (FIG. 16D). In such case, operation proceeds to decision block 1676. Decision block 1676 determines whether the previous completed command can be undone. If it is determined that the previously completed command can be undone, operation proceeds to step 1677, and if not, operation proceeds to step 1679. In step 1677, the previous completed command is undone, and operation proceeds to step 1678. In step 1678, the undone command is added to a redo stack, and operation proceeds to step 1620. In step 1679, playback of the current audio content item is resumed, and operation proceeds to step 1620.

Redo 1619: A redo command may be determined to be received at decision block 1619. In such case, operation proceeds to decision block 1680. Decision block 1680 determines whether there are any previously undone commands that can be redone. If it is determined that there are previously undone commands that can be redone, operation proceeds to step 1681, and if not, operation proceeds to step 1682. In step 1681, the last undone command is redone, and operation proceeds to step 1620. In step 1682, playback of the current audio content item is resumed, and operation proceeds to step 1620.

D.15. Presentation Device Executive "Handle Title Mode" Process

FIG. 17 depicts a flowchart 1700 for an example "Handle Title Mode" process, according to an example embodiment. Flowchart 1700 may be performed by presentation device executive logic 1002 of FIG. 10, for example. In an embodiment, flowchart 1700 may be performed in process 1466 of flowchart 1400 (FIG. 14B). Flowchart 1700 may be entered when title mode (see section D.1) is active and the title segment of an audio content item has finished being played by the presentation device (see FIG. 14). A value returned by flowchart 1700 indicates whether the summary segment of the audio content item is to be played. For example, if the return value is "true," playback of the summary segment is enabled. If the return value is "false," playback of the summary segment is not enabled.

Flowchart 1700 is entered at entry step 1702, and operation proceeds to a step 1704. In step 1704, the return value for flowchart 1700 is initialized to "false," and operation proceeds to decision block 1706. In decision block 1706, it is determined whether speech prompts are enabled in the runtime preferences. If it is determined that speech prompts are enabled, operation proceeds to step 1710, and if not, operation proceeds to first and second execution branches, which are performed concurrently. In step 1710, speech prompt 1708 is played to ask the subscriber whether the summary segment should be played, and operation proceeds to the first and second execution branches.

In the first (e.g., left-hand in FIG. 17) execution path, step 1712 is performed, which temporarily suspends execution of the execution path for a predetermined period of time (e.g., 1-2 seconds) and enables a "Play More" command to be received from a subscriber. After the wait delay has expired, operation proceeds to step 1718. In the second (e.g., right-hand in FIG. 17) execution path, decision block 1714 is performed, where the "Play More" command is awaited. When decision block 1714 determines that the "Play More" command is received, operation proceeds to step 1716. In step 1716, the return value of flowchart 1700 is set to "true," and operation proceeds to step 1718. If decision block 1714 determines that the "Play More" command is not received by the time the wait delay of step 1712 expires, execution of the right-hand execution path terminates, and operation proceeds from step 1718 back to flowchart 1400.

D.16. Presentation Device Executive "Handle Summary Mode" Process

FIG. 18 depicts a flowchart 1800 for an example "Handle Summary Mode" process, according to an example embodiment. Flowchart 1800 may be performed by presentation device executive logic 1002 of FIG. 10, for example. In an embodiment, flowchart 1800 may be performed in process 1478 of flowchart 1400 (FIG. 14B). Flowchart 1800 may be performed when either title mode or summary mode is active and a summary segment of an audio content item has finished playing (see FIG. 14B). A value returned by flowchart 1800 indicates whether the story body segment of the audio content item is to be played. For example, if the return value is "true," playback of the story body segment is enabled. If the return value is "false," playback of the story body segment is not enabled.

Flowchart 1800 is entered at entry step 1802, and operation proceeds to step 1804. In step 1804, the return value of flowchart 1800 is initialized to "false," and operation proceeds to decision block 1806. In decision block 1806, it is determined whether speech prompts are enabled in the runtime preferences. If it is determined that speech prompts are enabled in the runtime preferences, operation proceeds to step 1810, and if not, operation proceeds to first and second execution branches, which are performed concurrently. In step 1810, a speech prompt 1808 is played to ask the subscriber whether the story body segment should be played, and operation proceeds to the first and second execution branches.

In the first (e.g., left-hand in FIG. 18) execution path, step 1812 is performed, which temporarily suspends execution of the execution path for a predetermined period of time (e.g., 1-2 seconds), and enables the "Play More" command to be received from a subscriber. After the wait delay has expired, operation proceeds to step 1818. In the second (e.g., right-hand in FIG. 18) execution path, a decision block 1814 is performed, where the "Play More" command is awaited. When decision block 1814 determines that the "Play More" command is received, operation proceeds to step 1816. In step 1816, the return value of flowchart 1800 is set to "true," and operation proceeds to step 1818. If decision block 1814 determines that the "Play More" command is not received by the time the wait delay of step 1812 expires, execution of the right-hand path terminates, and operation proceeds from step 1818 back to flowchart 1400.

D.17. Presentation Device Executive "Handle Played Audio Content Item" Process FIG. 19 depicts a flowchart 1900 for an example "Handle Played Audio Content Item" process, according to an example embodiment. Flowchart 1900 may be performed by presentation device executive logic 1002 of FIG. 10, for example. In an embodiment, flowchart 1900 may be performed in process 1484 of flowchart 1400 (FIG. 14B). Flowchart 1900 may be entered when a story body segment of an audio content item has finished playing (see FIG. 14B). Flowchart 1900 enables a subscriber to set the "tracked" and/or "tagged" status flags of the played audio content item (see section D.2).

Flowchart 1900 is entered at entry step 1902, and operation proceeds to step 1904. In step 1904, the played audio content item is indicated as having entered the "played" state, and operation proceeds to step 1908. In step 1908, a speech prompt 1906 is played to the subscriber announcing that presentation of the current audio content item has completed, and operation proceeds to decision block 1910. In decision block 1910, it is determined whether speech prompts are enabled in the runtime preferences. If it is determined that speech prompts are enabled, operation proceeds to step 1916, and if not, operation proceeds to step 1912. In step 1912, execution of flowchart 1900 is temporarily suspended for a predetermined period of time (e.g., 1-2 seconds), and operation proceeds to step 1930. In step 1916, a speech prompt 1914 is played to the subscriber asking whether the audio content item should be tagged, and operation proceeds to decision block 1918. In decision block 1918, it is determined whether the subscriber indicated that the audio content item should be tagged. If the subscriber indicated that the audio content item should be tagged, operation proceeds to step 1920, and if not, operation proceeds to step 1924. In step 1920, the audio content item's "tagged" status flag is set, and operation proceeds to step 1924. In step 1924, a speech prompt 1922 is played to the subscriber asking whether the audio content item should be tracked, and operation proceeds to decision block 1926. In decision block 1926, it is determined whether the subscriber indicated that the audio content item should be tracked. If it is determined that the subscriber indicated that the audio content item should be tracked, operation proceeds to step 1928, and if not, operation proceeds to step 1930. In step 1928, the audio content item's "tracked" status flag is set, and operation proceeds to step 1930. In step 1930, operation proceeds back to flowchart 1400.

Example Commands

Table 6 shown below lists a number of commands that may be received from a user by a presentation device to select audio publications, to cause audio publications to be played, to navigate among and within audio publications, to modify the playing of audio publications, and to enable further functions. The commands shown in Table 6 are provided for purposes of illustration, and are not intended to be limiting. Additional and/or alternative commands may also be enabled in embodiments. Furthermore, each command may be provided by a subscriber in various ways, including by voice command, by manual entry (e.g., by pushing physical or virtual buttons, etc.), and/or by further techniques. For voice commands, optional command words are enclosed in brackets:

Example Interactive Audio Publication Presentation Embodiments

Figure 20:
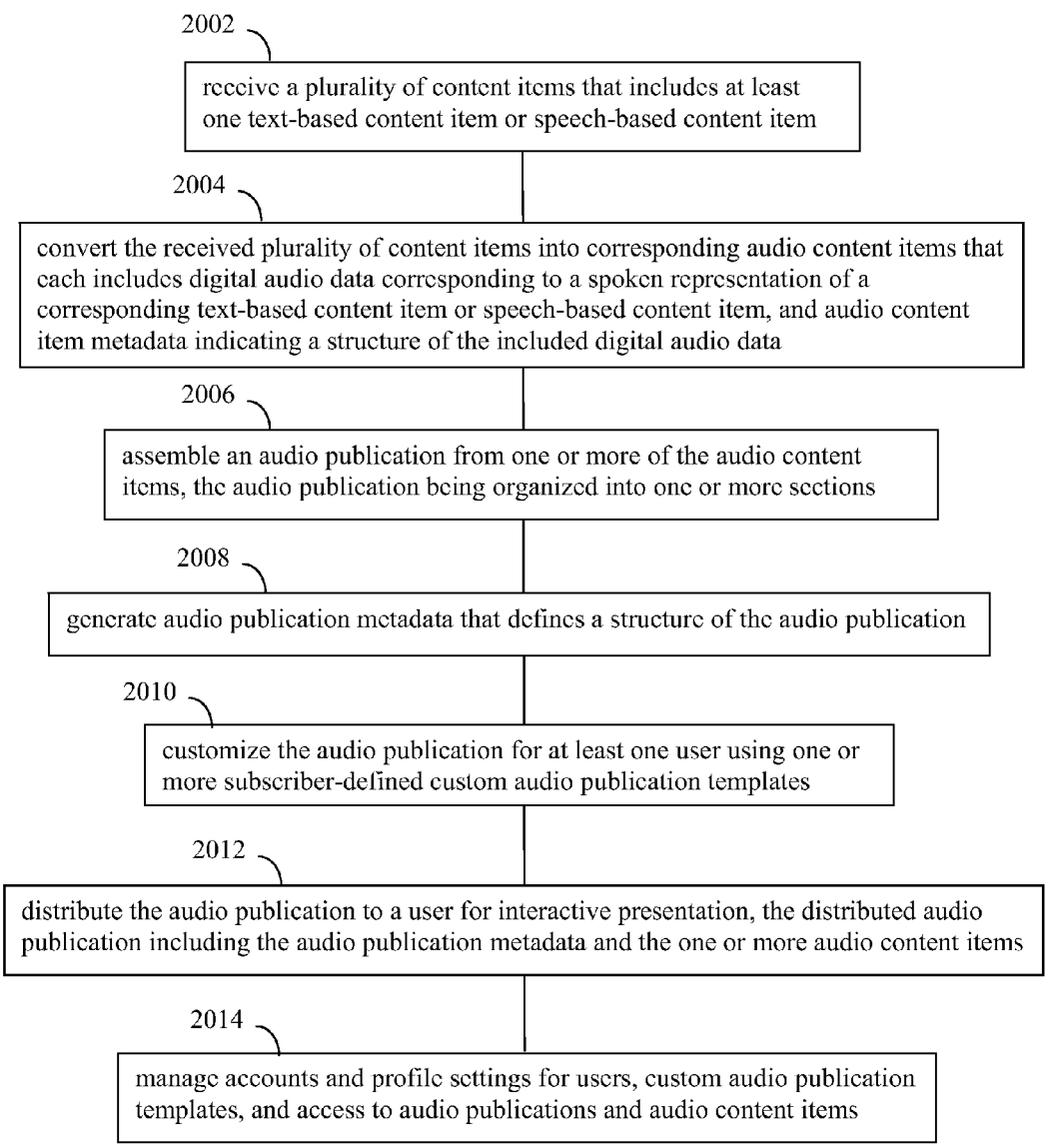
FIG. 20 shows a flowchart for presenting an interactive audio publication, according to an example embodiment.

Various embodiments for an interactive audio publication generation and presentation are described in the sections above. FIG. 20 shows a flowchart 2000 for audio publication generation, customization, distribution, and presentation, according to example embodiments. Flowchart 2000 may be performed by embodiments described above, including creation system 102, customization & distribution system 110, subscriber portal 124, and/or presentation system 136 of interactive audio publication system 100 of FIG. 1, and/or by the further embodiments and sub-features of these systems/portals described elsewhere herein and shown in the figures (e.g., presentation device 140, etc.). Further structural and operational embodiments will be apparent to persons skilled in the relevant art(s) based on the discussion regarding flowchart 2000. Embodiments for performing each of the steps of

TABLE 6

Presentation system commands and equivalent voice control commands.

| | Command | Voice Commands | Purpose |
|---|---|---|---|
| Navigation | Previous | previous [go] back | Fetches the previous audio content item |
| | Previous paragraph | previous paragraph | Navigates to the previous paragraph in an audio content item |
| | Next paragraph | next paragraph | Advances to the next paragraph in an audio content item |
| | Change section | [goto] section<name> | Jumps to section name |
| | Change audio publication | [goto] [audio] publication <name> | Jumps to audio publication name |
| | Search | search <keyword expression> | Searches for audio content items that match the provided keyword expression |
| Control | Play | play start resume | Starts/restarts playback |
| | Play more | more | Plays the audio content item's summary segment (title mode), or the story body segment (summary mode) |
| | Skip | skip next | Temporarily skips an audio content item and adds it to the "Skipped Content" section |
| | Discard | discard | Discards the current audio content item and moves to the next audio content item |
| | Stop/Pause | stop pause | Stops playback |
| | Undo | undo | Undo the last operation |
| | Redo | redo | Redo the last "undo" operation |
| Customization | Track audio content item | track | Sets/clears the audio content item's "tracked" flag |
| | Tag audio content item or advertisement | tag | Sets/clears the audio content item's or advertisement's "tagged" flag |
| | Switch mode | switch to mode | Switches the current operating mode (title, summary, or full story mode) |
| | Set playback order | play new [first] play old [first] | Sets the playback order so that either newer or older audio content items are played first |
| | Set preferences | [set] preferences | Enables runtime preferences to be configured |
| | Enable/disable voice control | start (stop) listening | Enables/disables the speech recognition module |
| Help | Get help | help | Access help |
| | Get status | [get] status | Get a real-time status report |
| | List | list [audio] publications list sections | Lists available audio publications or sections | flowchart 2000 are shown in FIGS. 1-13 and FIGS. 14A-19 (e.g., flowcharts 1400, 1500, 1600, 1700, 1800, and 1900) and described above. Flowchart 2000 is described as follows.

Referring to FIG. 20, at step 2002, a plurality of content items is received that includes at least one text-based content item or speech-based content item. For example, as described above, creation system 102 of FIG. 1 may receive a plurality of content items that includes one or more text-based content items and/or speech-based content items.

In step 2004, the received plurality of content items is converted into corresponding audio content items that each includes digital audio data corresponding to a spoken representation of a corresponding text-based content item or speech-based content item, and audio content item metadata indicating a structure of the included digital audio data. For example, as described above, audio content item creation module 104 of FIGS. 1, 2A, and/or 2B may be configured to convert content items into corresponding audio content items that each includes digital audio data corresponding to a spoken representation of a corresponding text-based content item or speech-based content item and audio content item metadata. For example, system 200 of FIG. 2A is an example of audio content item creation module 104 for generating audio content items 242 from text-based content items 204, and system 250 of FIG. 2B is an example of audio content item creation module 104 for generating audio content items 294 from speech-based content items 254. Audio content item metadata creation modules 236 (FIG. 2A) and 288 (FIG. 2B) are example modules for generating audio content item metadata. As described above, audio content item metadata may be generated that includes one or more markers designating boundaries of a title segment, a summary segment, and a story body segment of an audio content item in the form of time-based and/or word-based boundaries, references to files, etc. Additionally, audio content item metadata may contain scheduling details used to present associated visual content items and/or advertisements, as well as file references to one or more visual content item and/or advertisement files.

In step 2006, an audio publication is assembled from one or more of the audio content items, the audio publication being organized into one or more sections. For example, as described above, audio publication creation module 106 of FIG. 1 may be configured to assemble an audio publication from one or more audio content items. Example embodiments for audio publication module 106 are shown in FIGS. 3A and 3B, and described above.

In step 2008, audio publication metadata is generated that defines a structure of the audio publication. For example, as described above, audio publication assembly module 324 of FIG. 3A is configured to generate audio publication metadata for audio publications. Furthermore, ad hoc audio publication creation module 362 receives analyzed metadata details 360 and generates an ad hoc audio publication 368 that includes audio publication metadata.

In step 2010, the audio publication is customized for at least one user, using one or more subscriber-defined custom audio publication templates. An audio publication may be optionally customized. For example, as described above, audio publication customization module 112 of customization & distribution system 110 may transform audio publications 118 into custom audio publications 120. Embodiments of audio publication customization module 112 are shown in FIGS. 5A-5D.

In step 2012, the audio publication is distributed to a user for interactive presentation, the distributed audio publication including the audio publication metadata and the one or more audio content items. For example, as described above, customization & distribution system 110 of FIG. 1 is configured to enable audio publications to be distributed for interactive presentation, such as by presentation system 136. The audio publication may be presented by a presentation system in various ways, including according to one or more of the flowcharts of FIGS. 14A-19.

In step 2014, accounts and profile settings for users, custom audio publication templates, and access to audio publications and audio content items are managed. For example, as described above, subscriber portal 124 is configured to enable users to manage corresponding accounts and profile settings, to enable users to configure custom audio publication templates, and to enable users to access audio publications and audio content items.

Further Example Embodiments

Features shown in the figures and described herein may be implemented in various ways. For example, the modules, engines, and further features shown in the figures and described above may be implemented in hardware, software, firmware, or any combination thereof. For example, such modules, engines, and further features may be implemented as computer program code configured to be executed in one or more processors. Alternatively, such modules, engines, and further features may be implemented as hardware logic/electrical circuitry.

The search engines shown in the figures and described above may be implemented in hardware, software, firmware, or any combination thereof. Such search engines may use a ranking or relevance function, or other ranking/relevance functionality, to rank corresponding items/objects in an order of relevance (e.g., to a user), as would be known to persons skilled in the relevant art(s).

The databases shown in the figures and described above may be embodied in various ways, including as a data structure such as one or more text files, one or more tables, one or more data arrays, one or more databases, etc., capable of containing the corresponding data, items, objects, etc. Such databases may be stored in one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

Figure 21:
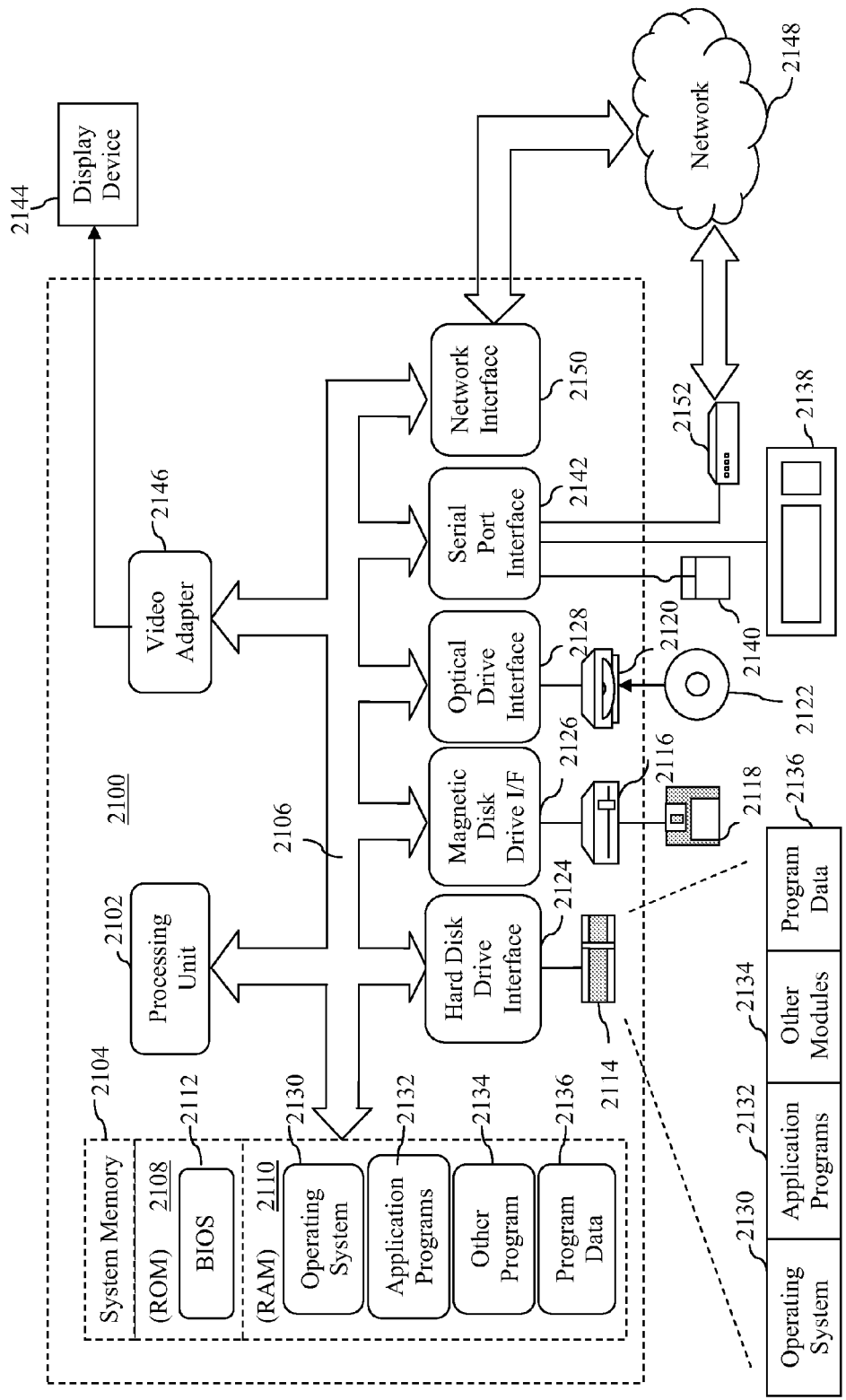
FIG. 21 shows a block diagram of an example computer that may be used to implement embodiments of the present invention, according to an example embodiment.

FIG. 21 depicts an exemplary implementation of an electronic device 2100 in which embodiments of the present invention may be implemented. Electronic device 2100 may be a general-purpose computing device in the form of a conventional personal computer, a work station, a mobile computer, a handheld music player (e.g., an Apple® iPod®, etc.), a mobile phone or smart phone (e.g., an Apple® iPhone®, etc.) or electronic device 2100 may be a special purpose computing device. The description of electronic device 2100 provided herein is provided for purposes of illustration, and is not intended to be limiting. Embodiments of the present invention may be implemented in further types of electronic devices, as would be known to persons skilled in the relevant art(s).

As shown in FIG. 21, electronic device 2100 includes a processing unit 2102, a system memory 2104, and a bus 2106 that couples various system components including system memory 2104 to processing unit 2102. Bus 2106 represents one or more of any of several types of bus structures, including a memory bus or memory controller, a peripheral bus, an accelerated graphics port, and a processor or local bus using any of a variety of bus architectures. System memory 2104 includes read only memory (ROM) 2108 and random access memory (RAM) 2110. A basic input/output system 2112 (BIOS) is stored in ROM 2108.

Electronic device 2100 also has one or more of the following drives: a hard disk drive 2114 for reading from and writing to a hard disk, a magnetic disk drive 2116 for reading from or writing to a removable magnetic disk 2118, and an optical disk drive 2120 for reading from or writing to a removable optical disk 2122 such as a CD ROM, DVD ROM, or other optical media. Hard disk drive 2114, magnetic disk drive 2116, and optical disk drive 2120 are connected to bus 2106 by a hard disk drive interface 2124, a magnetic disk drive interface 2126, and an optical drive interface 2128, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 2130, one or more application programs 2132, other program modules 2134, and program data 2136. Application programs 2132 or program modules 2134 may include, for example, computer program logic for implementing one or more of the elements shown in FIGS. 1-13, and any one or more steps/decision blocks/processes shown in the flowcharts of FIGS. 14A-19, as described above.

A user may enter commands and information into the electronic device 2100 through input devices such as keyboard 2138 and pointing device 2140. Other input devices (not shown) may include a microphone, touchscreen, control buttons, joystick, game pad, satellite dish, scanner, or the like. These and other input devices are often connected to the processing unit 2102 through a serial port interface 2142 that is coupled to bus 2106, but may be connected by other interfaces, such as a parallel port, game port, or a universal serial bus (USB). Keyboard 2138 and other input devices may be external to electronic device 2100 (e.g., when electronic device 2100 is a desktop computer) or may be mounted in a surface of electronic device 2100 (e.g., when electronic device 2100 is a mobile device, such as a laptop computer, handheld computing device, mobile phone, portable music player, etc.).

A display 2144 is also connected to bus 2106 via an interface, such as a video adapter 2146. In addition to the monitor, electronic device 2100 may include other peripheral output devices (not shown) such as speakers and printers. Display 2144 may be external to electronic device 2100 or may be mounted in a surface of electronic device 2100. One or more loudspeakers may be connected to bus 2106 via an interface, such as an audio adaptor of electronic device 2100. The loudspeakers may be built into a body of electronic device 2100, or may be external loudspeakers, such as a pair of headphones or external speakers connected to electronic device 2100.

Electronic device 2100 may be connected to a network 2148 (e.g., the Internet, a telecommunications network, a cellular network, etc.) through a network interface or adapter 2150, a modem 2152, or other means for establishing communications over the network. Modem 2152, which may be internal or external, is connected to bus 2106 via serial port interface 2142.

As used herein, the terms "computer program medium" and "computer-readable medium" are used to generally refer to media such as the hard disk associated with hard disk drive 2114, removable magnetic disk 2118, removable optical disk 2122, as well as other media such as flash memory cards, digital video disks, random access memories (RAMs), read only memories (ROM), and the like.

As noted above, computer programs and modules (including application programs 2132 and other program modules 2134) may be stored on the hard disk, magnetic disk, optical disk, ROM, or RAM. Such computer programs may also be received via network interface 2150 or serial port interface 2142. Such computer programs, when executed or loaded by an application, enable electronic device 2100 to implement features of embodiments of the present invention discussed herein. Accordingly, such computer programs represent controllers of the electronic device 2100.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

Example Advantages

The interactive audio publication system embodiments described herein includes advantages over conventional techniques. Embodiments of the interactive audio publication system may include one or more of the following advantages, including:

Providing a complete end-to-end system that handles the generation, customization, distribution, and presentation of an interactive audio publication;

Enabling both text and speech-based content (e.g., podcasts, etc.) to be transformed into interactive "audio content items," that are further organized into navigable audio publications;

Featuring a novel presentation system that includes an apparatus that utilizes subscriber input to present audio content interactively and dynamically;

Enabling audio content items to appear in multiple sections within an audio publication, while ensuring that previously presented audio content items are not repeated to subscribers;

Enabling subscribers to customize preexisting audio publications and to generate new custom audio publications according to their preferences and interests;

Enabling sequencing of visual content (e.g., images and movies) for display to subscribers during presentation of an audio content item;

Enabling targeted audio and/or visual advertisements to be selected by a publisher and delivered to subscribers, with the ability to provide publishers with playback confirmation; and Providing automatic adaptation of audio publications for playback on various presentation device embodiments.

Embodiments of the presentation device may provide one or more of the following advantages over conventional implementations, including:

a robust hands-free speech recognition interface enabling subscribers to interact with audio publications using simple voice commands;

an intuitive button interface enabling subscribers to navigate interactive audio publications easily and discreetly;

an ability for a subscriber to choose the desired level of presentation detail on-the-fly for selected audio content (e.g., title only, title and summary, full story, etc.);

nonlinear subscriber navigation through interactive audio publications and audio content items, with the ability to navigate between available audio publications and audio publication sections, and to skip forward or backward by whole paragraphs of text;

automatic monitoring and reporting of a subscriber's progress through the audio publication, ensuring that previously played audio content items are not replayed;

an ability for a subscriber to prioritize content and temporarily skip audio content items for playback at a later time;

on-demand subscriber audio content item "tracking" such that new audio content items with high relevance are added to a special "Tracked Content" section automatically over time (i.e., a work day, week, month, etc.);

audio content item "tagging" and sharing via a subscriber's email or online social networking sites;

advertisement "tagging," enabling review of presented advertisements at a later time;

audio content item searching via subscriber-typed or subscriber-dictated keyword search expressions;

a preferences mode enabling subscribers to configure their presentation system runtime preferences; and speech prompts that assist the subscriber if they want help.

Conclusion

While various embodiments of the present invention have been described above, it should be understood that they have been presented by way of example only and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for presenting an interactive audio publication to a user, the method comprising:

enabling a subscriber to access a subscriber portal to generate a custom audio publication template used to generate an audio publication for the subscriber, the subscriber being a subscriber to the audio publication, said enabling comprising enabling the subscriber to define one or more custom audio publication templates, the custom audio publication templates being configured to be used to generate one or more custom audio publications from one or more source audio publications, and the custom audio publication templates including one or more custom sections, such that each custom section contains one or more audio content item assignment rules;

receiving a plurality of content items that includes at least one text-based content item or speech-based content item;

converting the received plurality of content items into corresponding audio content items that each include digital audio data corresponding to a spoken representation of a corresponding text-based content item or speech-based content item, and audio content item metadata indicating a structure of the included digital audio data, the audio content item metadata including a plurality of markers designating boundaries of a title segment, a summary segment, and a story body segment of an audio content item;

assembling the audio publication from one or more of the audio content items according to the custom audio publication template, the audio publication being organized into one or more sections;

generating audio publication metadata that defines a structure of the audio publication, said generating comprising customizing the audio publication metadata for at least one user; and distributing the audio publication to the subscriber for interactive presentation, the distributed audio publication including the audio publication metadata and the one or more audio content items.

2. The method of claim 1, wherein said converting comprises:

determining markers that designate word, sentence, and paragraph boundaries in a received content item; and including the determined markers in the audio content item metadata corresponding to the received content item.

3. The method of claim 2, wherein said determining comprises:

using an automatic speech recognition (ASR) system to locate the word, sentence, and paragraph boundary markers within a received content item.

4. The method of claim 1 wherein said converting comprises:

performing said converting prior to said assembling, after said assembling and prior to the interactive presentation, or in a plurality of stages in which one or more portions of a first audio content item are generated prior to said assembling and remaining portions of the first audio content item are generated after said assembling and prior to the interactive presentation.

5. The method of claim 1, further comprising:

enabling a user to indicate a summary segment length by specifying a number of audio content item introductory paragraphs.

6. The method of claim 1, wherein said converting comprises:

using at least one of human voice talent or computerized text-to-speech (TTS) to convert a text-based content item into a corresponding audio content item.

7. The method of claim 1, further comprising:

selecting one or more visual content items; and embedding scheduling details for display of the selected one or more visual content items during presentation of a corresponding audio content item in audio content item metadata of the corresponding audio content item.

8. The method of claim 1, further comprising:

enabling a publisher to specify a default ordering of sections within the audio publication; and enabling the publisher to specify a default ordering of audio content items within each section within the audio publication.

9. The method of claim 1, wherein a single audio content item is associated with a plurality of audio publication sections.

10. The method of claim 1, further comprising:

selecting a plurality of prerecorded speech prompts to be played in response to one or more predesignated actions performed by the subscriber during presentation of the audio publication.

11. The method of claim 1, further comprising:

automatically generating an ad hoc audio publication based a plurality of audio content items received from a content source.

12. The method of claim 1, further comprising:
performing the assignment rule, including
selecting one or more audio content items from one or more of the source audio publications, and
assigning the selected one or more audio content items to one or more of the custom sections.

13. The method of claim 1, further comprising:
performing the assignment rule, including
using a search engine to locate audio content items from one or more of the source audio publications that match a keyword search expression, and
adding the matching audio content items to a custom section of the one or more custom sections.

14. The method of claim 1, further comprising:
performing the assignment rule, including
using a search engine to locate audio content items from one or more of the source audio publications that are relevant to at least one user-designated audio content item, and
including the located audio content items in a custom section of the one or more custom sections.

15. The method of claim 1, further comprising
selecting at least one audio and/or visual advertisement; and
embedding scheduling details in audio publication metadata or audio content item metadata for the advertisement that is to be provided during presentation of the audio publication prior to or following presentation of the title segment, the summary segment, or the story body segment of an audio content item.

16. The method of claim 15, wherein the advertisement is targeted to a user by utilizing information derived from at least one of an audio content item contained in a custom audio publication of the user, the custom audio publication template of the user, an audio content item and advertisement presentation history of the user, or a profile of the user;
the history of the user indicating audio content items and advertisements previously presented to the user, audio content items and advertisements marked "tagged" by the user, and audio content items marked "tracked" by the user.

17. The method of claim 15 further comprising:
performing advertisement selection on-demand as a result of analyzing the content of a requested audio content item.

18. The method of claim 15, further comprising:
enabling the subscriber to tag the advertisement to enable the subscriber to review the advertisement at a later time.

19. The method of claim 18, wherein an email is transmitted to the subscriber as a result of the subscriber tagging the advertisement, the email including at least one of a Web hyperlink to the advertisement, a digital media file associated with the advertisement, or an alternative presentation of the advertisement that includes at least one of text, an image, or audio.

20. The method of claim 1, further comprising:
transferring audio publications that include a plurality of referenced audio content items, visual content items, speech prompts, and advertisements over a data communications network to a presentation system of the subscriber.

21. The method of claim 1, further comprising:
streaming one or more requested audio publication components over a data communications network to a presentation system of the subscriber for presentation on-demand.

22. The method of claim 1, further comprising:
issuing a notification to the subscriber when a new or updated audio publication is available for download.

23. The method of claim 1, further comprising:
transmitting a time-sensitive audio content item over a data communications network to a presentation system of a user for immediate presentation.

24. The method of claim 1, wherein said distributing comprises:
distributing the audio publication to a presentation device to be presented on the presentation device, the presentation device configured to enable a user to interact with the audio publication using at least one of voice commands or a physical interface that includes one or more of a keyboard, a touchscreen, or a set of control buttons.

25. The method of claim 1, further comprising:
performing at least one of said receiving, said converting, said assembling, said generating, or said distributing locally on a presentation device immediately prior to presentation of the audio publication to the user.

26. A system for generating, customizing, distributing, and presenting an interactive audio publication to a user, comprising:
at least one computer that includes
a subscriber portal configured to enable subscribers to generate custom audio publication templates used to generate one or more custom audio publications from one or more source audio publications, the custom audio publication templates including one or more custom sections, such that each custom section contains one or more audio content item assignment rules, the subscriber portal configured to enable a subscriber to generate a custom audio publication template used to generate an audio publication for the subscriber, the subscriber being a subscriber to the audio publication;
a creation system configured to at least generate audio content items; and
a customization and distribution system configured to generate one or more custom audio publications according to one or more user-defined custom audio publication templates, and configured to enable distribution of audio publications to user, the customization and distribution system configured to generate an audio publication for the subscriber based on the custom audio publication template, and to distribute the generated audio publication to the subscriber for interactive presentation, the distributed audio publication including the audio publication metadata and one or more audio content items;
the subscriber portal configured to enable users to manage corresponding accounts and profile settings, and to enable users to access audio publications and audio content items.

* * * * *